US012338671B2

(12) United States Patent
Zeabari et al.

(10) Patent No.: US 12,338,671 B2
(45) Date of Patent: Jun. 24, 2025

(54) DISTRIBUTED CONTROL SYSTEM FOR SERVO CONTROLLED POWERED DOOR ACTUATOR

(71) Applicant: MAGNA CLOSURES INC., Newmarket (CA)

(72) Inventors: John G. Zeabari, Newmarket (CA); Martin Dannemann, Newmarket (CA); Roman Paerschke, Newmarket (CA); Sebastian Prengel, Newmarket (CA)

(73) Assignee: MAGNA CLOSURES INC, Newmarket (CA)

( * ) Notice: Subject to any disclaimer, the term of this patent is extended or adjusted under 35 U.S.C. 154(b) by 0 days.

(21) Appl. No.: 18/113,274

(22) Filed: Feb. 23, 2023

(65) Prior Publication Data

US 2023/0265704 A1 Aug. 24, 2023

Related U.S. Application Data

(60) Provisional application No. 63/313,342, filed on Feb. 24, 2022.

(51) Int. Cl.
*E05F 15/622* (2015.01)
*E05F 15/48* (2015.01)

(52) U.S. Cl.
CPC ............ *E05F 15/622* (2015.01); *E05F 15/48* (2015.01); *E05Y 2400/31* (2013.01); *E05Y 2900/531* (2013.01)

(58) Field of Classification Search
CPC ....... E05F 15/622; E05F 15/48; E05F 15/659; E05Y 2400/31; E05Y 2900/531; F16H 2025/2087
USPC ........................................................ 74/89.38
See application file for complete search history.

(56) References Cited

U.S. PATENT DOCUMENTS

| | | | | |
|---|---|---|---|---|
| 5,770,934 | A | 6/1998 | Theile | |
| 5,804,937 | A * | 9/1998 | Sasajima | E05F 15/632 318/432 |
| 6,178,699 | B1 | 1/2001 | Kawanobe et al. | |
| 6,636,197 | B1 | 10/2003 | Goldenberg et al. | |
| 6,729,071 | B1 | 5/2004 | Kawanobe et al. | |

(Continued)

FOREIGN PATENT DOCUMENTS

| | | | | |
|---|---|---|---|---|
| CN | 113027285 | B * | 1/2023 | E05F 15/611 |
| DE | 19927871 | A1 | 11/1999 | |

(Continued)

*Primary Examiner* — T. Scott Fix
(74) *Attorney, Agent, or Firm* — Dickinson Wright PLLC

(57) ABSTRACT

A power door actuation system for a door of a vehicle is provided. The system includes a housing mounted to the door and an actuator mounted within the housing that includes an electric motor configured to output a motor force. The actuator also includes a geartrain with a geartrain input coupled to an output of the electric motor for receiving the motor force and a geartrain output for applying an output force to the door. An extendible member is configured for extension and retraction in response to actuation by the geartrain output for moving the door. The system determines the output force to compensate for external forces affecting the motion of the door, adjusts the output force determined to an adjusted output force to compensate for internal forces affecting the operation of the actuator, and controls the electric motor to move the door at the adjusted output force.

16 Claims, 70 Drawing Sheets

(56) References Cited

U.S. PATENT DOCUMENTS

| | | | | |
|---|---|---|---|---|
| 6,877,791 | B2 | 4/2005 | Greuel et al. | |
| 7,093,887 | B2 | 8/2006 | Mrkovic et al. | |
| 7,175,228 | B2 | 2/2007 | Mrkovic et al. | |
| 7,294,986 | B2 | 11/2007 | Marentette | |
| 7,690,156 | B2 | 4/2010 | Imai et al. | |
| 8,405,337 | B2 | 3/2013 | Gebhart et al. | |
| 8,567,129 | B2 | 10/2013 | Suzuki et al. | |
| 9,080,363 | B2 | 7/2015 | Reed et al. | |
| 9,174,517 | B2 | 11/2015 | Scheuring et al. | |
| 9,461,521 | B2 | 10/2016 | Pribisic | |
| 9,522,590 | B2 | 12/2016 | Fujimoto et al. | |
| 9,564,850 | B2 | 2/2017 | Fujimoto et al. | |
| 9,650,824 | B2 | 5/2017 | Sauerwein et al. | |
| 9,708,845 | B2 | 7/2017 | Tehranchi | |
| 9,822,577 | B2 | 11/2017 | Fujimoto et al. | |
| 10,094,159 | B2 | 10/2018 | Grudzinski et al. | |
| 10,132,112 | B2 | 11/2018 | Yu et al. | |
| 10,145,165 | B2 | 12/2018 | Elie et al. | |
| 10,161,175 | B2 | 12/2018 | Elie et al. | |
| 10,180,025 | B2 * | 1/2019 | Conner | E05F 15/622 |
| 10,240,386 | B2 | 3/2019 | Wise | |
| 10,378,263 | B2 | 8/2019 | Podkopayev | |
| 10,584,526 | B2 | 3/2020 | Linden et al. | |
| 10,774,571 | B2 | 9/2020 | Zeabari et al. | |
| 2004/0124662 | A1 | 7/2004 | Cleland et al. | |
| 2009/0217596 | A1 | 9/2009 | Neundorf et al. | |
| 2014/0150581 | A1 * | 6/2014 | Scheuring | B60J 5/047 74/89.38 |
| 2014/0303852 | A1 | 10/2014 | Seki et al. | |
| 2015/0057895 | A1 | 2/2015 | Yamada et al. | |
| 2015/0275563 | A1 | 10/2015 | Fujimoto et al. | |
| 2017/0028966 | A1 | 2/2017 | Elie et al. | |
| 2017/0335617 | A1 | 11/2017 | Herrmann et al. | |
| 2018/0080271 | A1 | 3/2018 | Oster et al. | |
| 2018/0100331 | A1 | 4/2018 | Cumbo | |
| 2018/0154728 | A1 | 6/2018 | Giovanardi et al. | |
| 2018/0223583 | A1 | 8/2018 | Podkopayev | |
| 2018/0238099 | A1 | 8/2018 | Schatz et al. | |
| 2018/0258682 | A1 * | 9/2018 | Schatz | E05F 15/614 |
| 2018/0334841 | A1 | 11/2018 | Langenberg et al. | |
| 2018/0363353 | A1 * | 12/2018 | Ghannam | E05F 15/72 |
| 2018/0371822 | A1 | 12/2018 | Rrumbullaku et al. | |
| 2019/0211604 | A1 * | 7/2019 | Scheuring | E05F 15/70 |
| 2020/0235695 | A1 | 7/2020 | Asano | |
| 2022/0243521 | A1 | 8/2022 | Herman et al. | |

FOREIGN PATENT DOCUMENTS

| | | | | | |
|---|---|---|---|---|---|
| DE | 102007062472 | A1 | | 6/2009 | |
| DE | 102007062473 | A1 | | 7/2009 | |
| EP | 1900559 | A1 | | 3/2008 | |
| EP | 2055881 | A2 | | 5/2009 | |
| EP | 2787157 | A1 | | 10/2014 | |
| GB | 2541549 | A | | 2/2017 | |
| JP | 2001246936 | A | * | 9/2001 | |
| WO | 2007004416 | A1 | | 1/2007 | |
| WO | 2013013313 | A1 | | 1/2013 | |
| WO | WO-2016072168 | A1 | * | 5/2016 | B60J 5/06 |
| WO | 2017029229 | A1 | | 2/2017 | |
| WO | 2017083706 | A1 | | 5/2017 | |
| WO | 2017211567 | A1 | | 12/2017 | |
| WO | 2019017729 | A1 | | 1/2019 | |
| WO | 2020011307 | A1 | | 1/2020 | |
| WO | WO-2021023766 | A1 | * | 2/2021 | E05F 15/611 |

* cited by examiner $$I_{motor} = (F/k_t) * \eta_{system} * R_{system} + I_{friction}$$

- $I_{motor}$ ... motor set current
- $F$ ... force set values from all haptic modules
- $k_t$ ... motor torque constant (DriveUnit_user_calibration_t.force2current_gain, DriveUnit_user_calibration_t.force2current_scale)
- $R_{system}$ ... overall system ratio (including rotation -> linear translation see DriveUnit_user_calibration_t.kinematic_scale_lut and DriveUnit_user_calibration_t.position_lut)
- $\eta_{system}$ ... overall system efficiency
- $I_{friction}$ ... friction current of the motor to compensate brushes and bearings (DriveUnit_user_calibration_t.friction_current, DriveUnit_factory_calibration_t.pid_para_friction)

FIG. 63A

DISTRIBUTED CONTROL SYSTEM FOR SERVO CONTROLLED POWERED DOOR ACTUATOR

CROSS-REFERENCE TO RELATED APPLICATION

This utility application claims the benefit of U.S. Provisional Application No. 63/313,342 filed Feb. 24, 2022. The entire disclosure of the above application is incorporated herein by reference.

FIELD

The present disclosure relates to a power actuator for a vehicle closure. More specifically, the present disclosure relates to a distributed control system for a power actuator assembly for a vehicle side door.

BACKGROUND

This section provides background information related to the present disclosure which is not necessarily prior art.

Closure members of motor vehicles may be mounted by one or more hinges to the vehicle body. For example, passenger doors may be oriented and attached to the vehicle body by the one or more hinges for swinging movement about a generally vertical pivot axis. In such an arrangement, each door hinge typically includes a door hinge strap connected to the passenger door, a body hinge strap connected to the vehicle body, and a pivot pin arranged to pivotably connect the door hinge strap to the body hinge strap and define a pivot axis. Such swinging passenger doors ("swing doors") may be moveable by power closure member actuation systems. Specifically, the power closure member system can function to automatically swing the passenger door about its pivot axis between the open and closed positions, to assist the user as he or she moves the passenger door, and/or to automatically move the passenger door in between closed and open positions for the user.

Typically, power closure member actuation systems include a power-operated device such as, for example, an electric motor and a rotary-to-linear conversion device that are operable for converting the rotary output of the electric motor into translational movement of an extensible member. In many arrangements, the electric motor and the conversion device are mounted to the passenger door and the distal end of the extensible member is fixedly secured to the vehicle body. One example of a power closure member actuation system for a passenger door is shown in commonly-owned International Publication No. WO2013/013313 to Scheuring et al. which discloses use of a rotary-to-linear conversion device having an externally-threaded leadscrew rotatively driven by the electric motor and an internally-threaded drive nut meshingly engaged with the leadscrew and to which the extensible member is attached. Accordingly, control over the speed and direction of rotation of the leadscrew results in control over the speed and direction of translational movement of the drive nut and the extensible member for controlling swinging movement of the passenger door between its open and closed positions.

A high-resolution position sensor, such as a magnet wheel and a Hall effect sensor, may be used to accurately measure a position in a power closure actuation sensor. However, such high-resolution sensors can be adversely affected by electromagnetic (EM) interference, such as may be generated by an EM brake. Furthermore, various discrepancies in actuator operation can adversely affect operation of the power closure member actuation system.

In view of the above, there remains a need to develop power closure member actuation systems which address and overcome limitations and drawbacks associated with known power closure member actuation systems as well as to provide increased convenience and enhanced operational capabilities.

SUMMARY

This section provides a general summary of the disclosure, and is not a comprehensive disclosure of its full scope or all of its features.

It is an object of the present disclosure to provide a power door actuation system for a door of a vehicle that is moveable relative to a vehicle body about a hinge axis between a closed position and a fully-open position. The power door actuation system includes a housing mounted to the door and an actuator mounted within the housing. The actuator includes an electric motor supported by the housing. The electric motor is configured to output a motor force. The actuator also includes a geartrain supported by the housing and having a geartrain input coupled to an output of the electric motor for receiving the motor force and a geartrain output for applying an output force to the door. An extendible member is coupled to the geartrain output and is configured for extension and retraction relative to the housing in response actuation by the geartrain output for moving the door relative to the vehicle body. The system is adapted to determine the output force to compensate for external forces affecting the motion of the door, adjust the output force determined to an adjusted output force to compensate for internal forces affecting the operation of the actuator, and control the electric motor to move the door at the adjusted output force.

In another aspect, the power door actuation system further comprises a controller. The controller is adapted to determine the output force to compensate for external forces affecting the motion of the door, and adjust the output force determined to the adjusted output force to compensate for internal forces affecting the operation of the actuator.

In another aspect, the controller is configured to select a current to be supplied to the electric motor such that such that the output force to the door substantially matches the output force determined.

In another aspect, the power door actuation system further comprises a sensor for detecting one of a motion of the electric motor and geartrain. The controller is configured to select the current when no motion of the electric motor or geartrain is detected.

In another aspect, the geartrain is moveable in a forward drive direction and in a backdrive direction. The controller is configured to select the current such that the geartrain is operated in a balanced state.

In another aspect, the geartrain operated in a balanced state is driven in one of the forward drive direction and backdrive direction without causing motion of the actuator.

In another aspect, the geartrain is moveable in a forward drive direction and in a backdrive direction. The controller is configured to select the current such that a force applied to the geartrain output by the door to move the geartrain in the forward drive direction is substantially similar to the force required to move the geartrain in the forward drive direction.

In another aspect, the controller ceases to adjust the determined output when motion of one the electric motor and geartrain is detected.

In another aspect, the controller includes a haptic control algorithm configured to determine a compensation force for compensating for external forces affecting the motion of the door. The controller also includes a drive unit configured to receive the compensation force compensation force and determine a current to be supplied to the electric motor. The current is adjusted when no motion of the electric motor or geartrain is detected so as to drive the geartrain in one of a drive direction and backdrive direction without causing motion of the geartrain.

In another aspect, the extendible member is a linear strut.

According to another aspect, a method of controlling a power-assisted vehicle door of a vehicle with an actuator is provided. The method includes the step of determining an output force of the actuator to compensate for external forces affecting the motion of the door. The next step of the method is adjusting the output force to and adjusted output force to compensate for internal forces affecting the motion of the actuator. The method also includes the step of operating an electric motor of the actuator using the adjusted output force.

In another aspect, the method includes sensing a motion of the actuator in one of a drive direction or a backdrive direction and when no motion is detected, adjusting the output force to compensate for internal forces affecting the motion actuator without causing motion of the actuator.

In another aspect, the method includes selecting a current to supply to the electric motor when no motion is detected, wherein the current supplied causes the actuator to operate in a balanced state.

In another aspect, when the actuator is operated in the balanced state, the force required to move the actuator in the backdrive direction is substantially similar to the force required to move the drive direction.

According to yet another aspect, another power door actuation system for a door of a vehicle that is moveable relative to a vehicle body about a hinge axis between a closed position and a fully-open position. The system includes a housing mounted to the door and an actuator mounted within the housing. The actuator includes an electric motor supported by the housing and having a motor output. The actuator also includes a geartrain supported by the housing and having a geartrain input coupled to the motor output for receiving a motor force from the electric motor and further having a geartrain output. The geartrain is moveable in a forward drive direction and in a backdrive direction. The actuator also includes a linear strut coupled to the geartrain output and configured for extension and retraction relative to the housing in response actuation by the geartrain output. The linear strut is coupled to the vehicle body at a connection point on the vehicle body distanced from the hinge axis such that a moment arm is defined by a perpendicular line extending from a line of force applied by the linear strut on the connection point to the hinge axis. The electric motor is adapted to apply a force on the geartrain to operate the geartrain in a balanced state such that when the geartrain is in a balanced state, the motor force applied to the geartrain input to cause the geartrain to be driven in the forward drive direction is substantially similar to the motor force applied to the geartrain to cause the geartrain to be driven in the backdriven direction.

In another aspect, an efficiency of the geartrain driven in the forward drive direction is greater than the efficiency of the geartrain driven in the backdrive direction.

In another aspect, the force applied on the geartrain by the electric motor is sufficient to operate the geartrain in the balanced state without causing the door to move.

In another aspect, the power door actuation system further comprises a controller for controlling the electric motor. The controller is configured to adjust a current supplied to the electric motor to operate the actuator in the balanced state.

In another aspect, the power door actuation system further comprises a sensor coupled to the controller and configured to sense motion of one of the geartrain input and the motor output.

In another aspect, when the controller detects no motion of the geartrain input, the controller adjusts the current supplied to the load the actuator without causing motion of the actuator.

In another aspect, the controller adjusts the current when the actuator is operating in the balanced state such that a force applied to the geartrain output to forward drive the geartrain and to back drive the geartrain are substantially the same.

In another aspect, the controller is adapted to control the electric motor to compensate for external forces affecting the motion of the door.

In another aspect, the linear strut is a spindle drive mechanism including a leadscrew and a lead nut in threaded engagement with the leadscrew such that rotation of one of the leadscrew and the lead nut causes pivoting of the door.

In another aspect, a moment arm is defined as a perpendicular line extending from the hinge axis of the door to a connection point of the linear strut and the other one of the vehicle body and the door.

According to yet a further aspect, a power assisted automotive door system for a door of a vehicle moveable between an open and closed position is provided. The system includes an actuator comprising an electric motor and a geartrain configured to apply a force to an extensible member for pivoting the door. The actuator has a forward drive direction and a backdrive direction each associated with moving the door towards one of the open position and the closed position. The electric motor is adapted to produce a balancing torque to preload the geartrain in one of the forward drive direction and backdrive direction such that the resistance felt by a user manually moving the door in either one of the backdrive direction or forward drive direction is substantially the same.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 61:
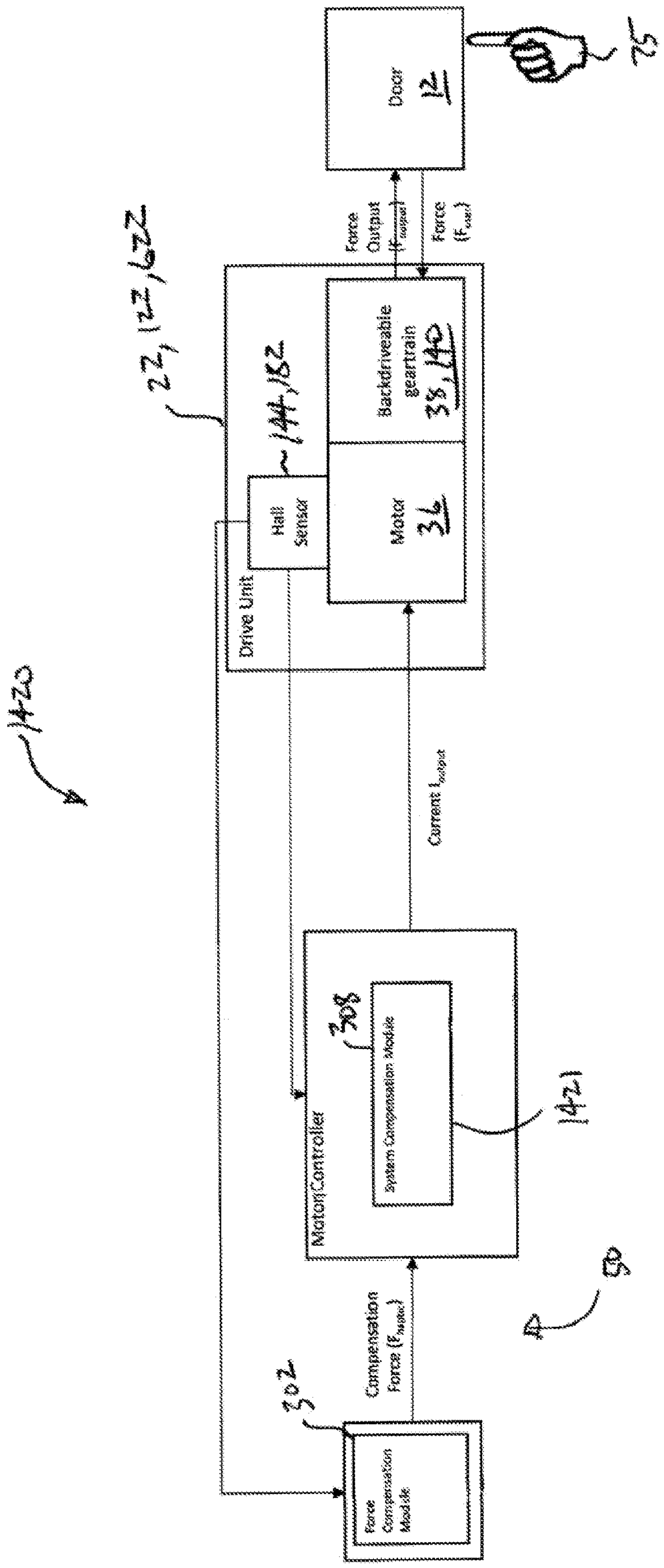
Figure 62:
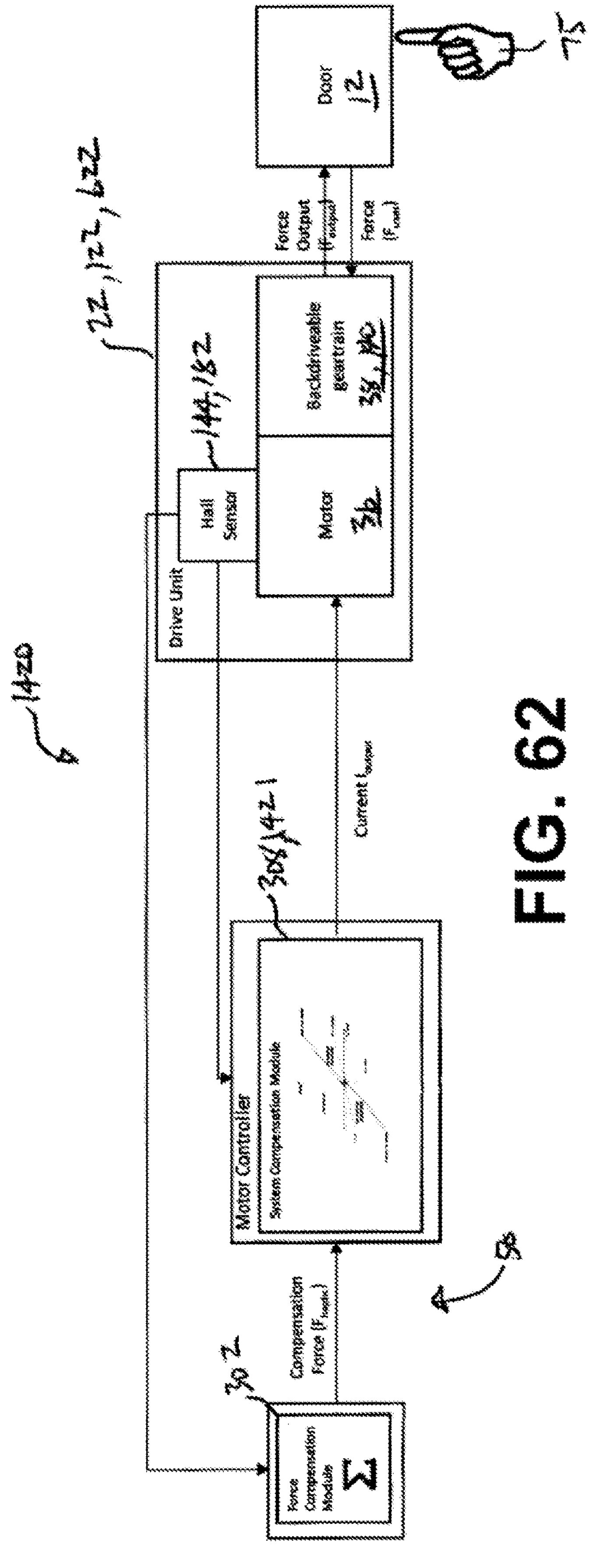
Figure 63:
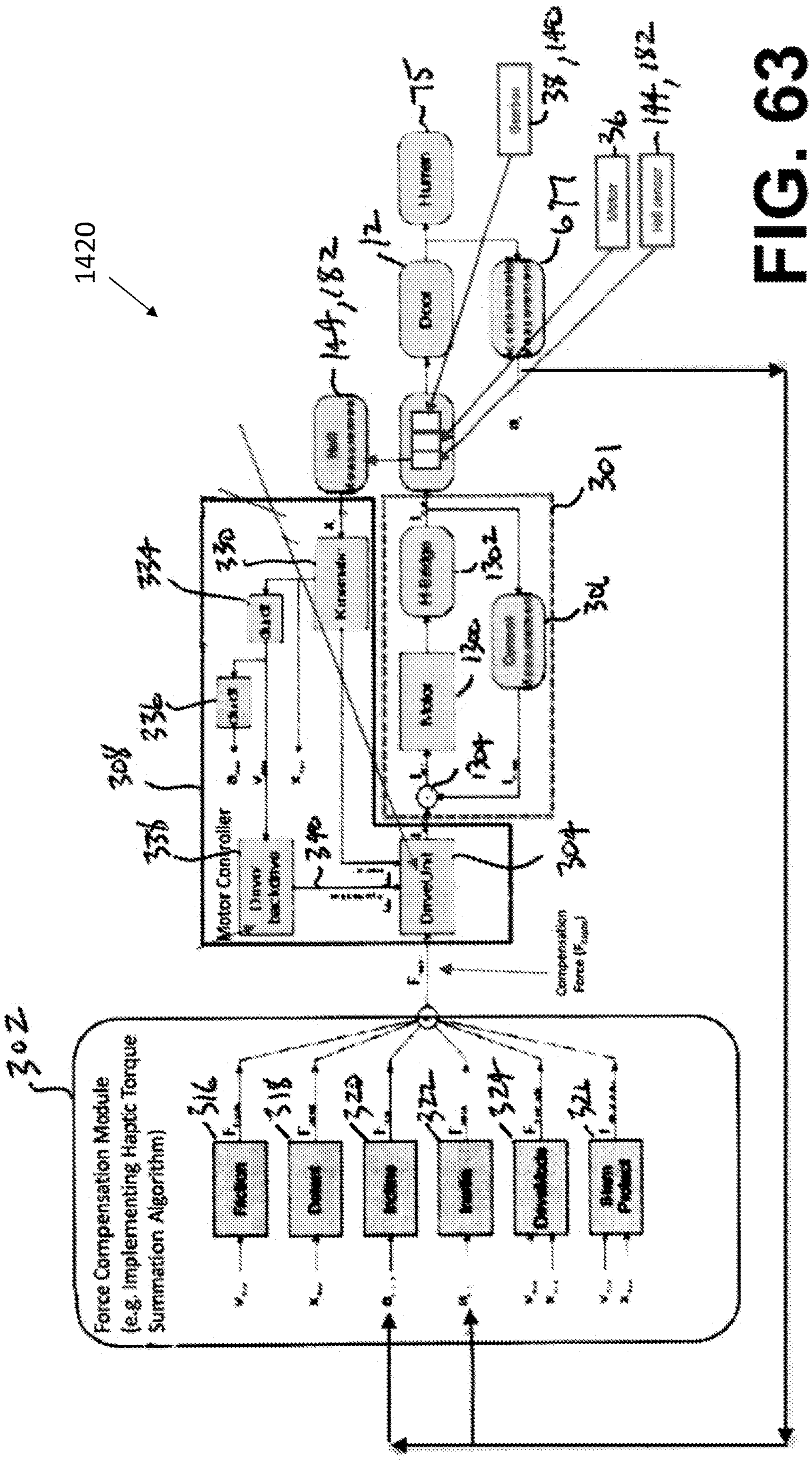
Figure 73:
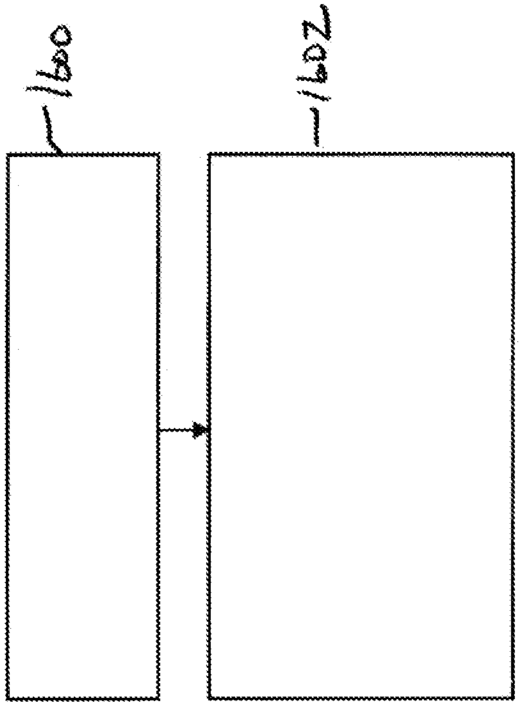
Figure 72:
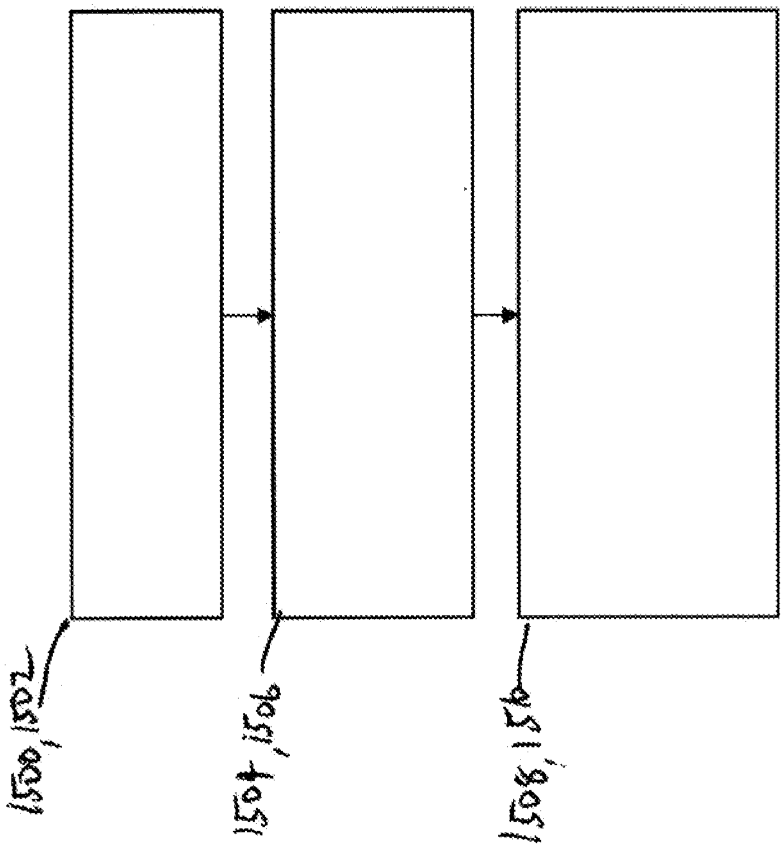

FIGS. 57-60 show the door 12 pivotally mounted on the hinges 16, 18 connected to the vehicle body 14 (not shown in its entirety) for rotation about the hinge axis AA along with corresponding torque, moment arm, and speed plots, according to aspects of the disclosure;

FIGS. 61-63 are block diagrams of a motor control system for controlling motion of the door, according to aspects of the disclosure;

FIG. 63A shows a function performed by the drive unit, according to aspects of the disclosure;

FIGS. 64-71 show examples of operation of the system of FIGS. 61-63 with and without balancing, according to aspects of the disclosure;

FIG. 72 illustrates steps of a method of controlling a power-assisted vehicle door of a vehicle, according to aspects of the disclosure; and FIG. 73 illustrates steps of a method of compensating the actuator, according to aspects of the disclosure.

Corresponding reference numerals indicate corresponding parts throughout the several views of the drawings.

DETAILED DESCRIPTION

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
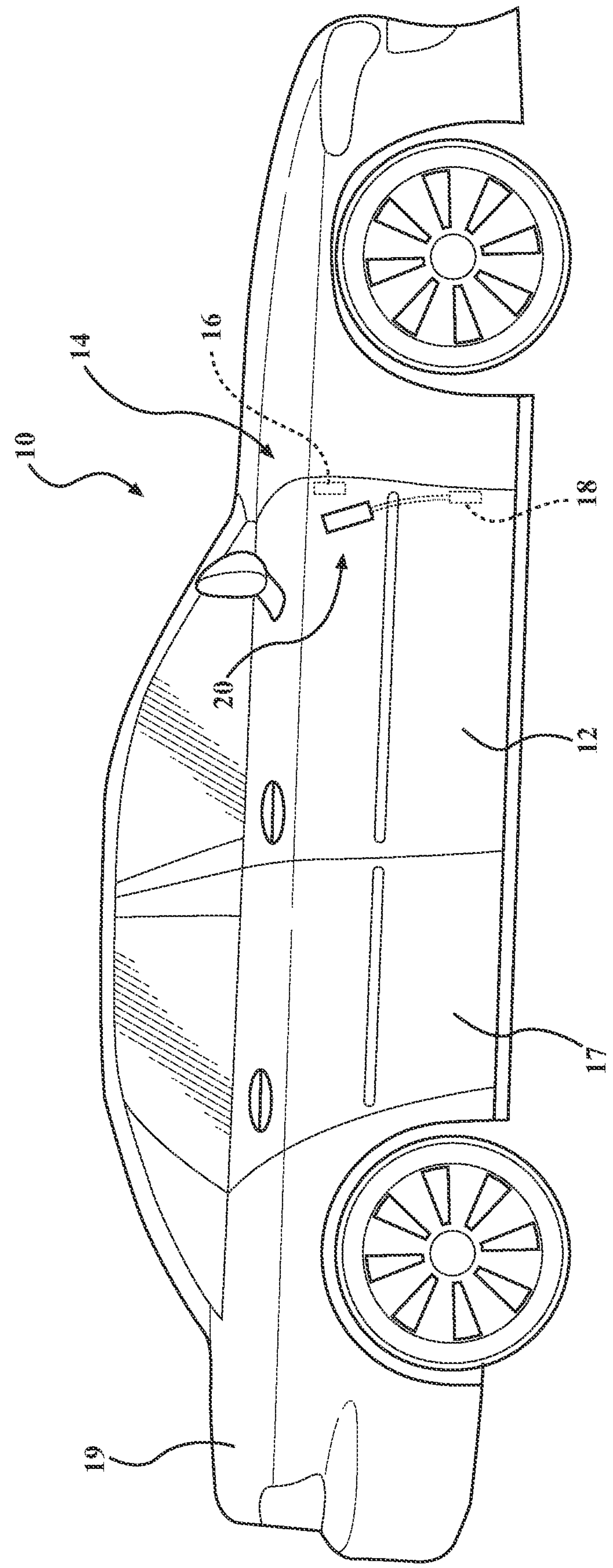
FIG. 1 is a perspective view of an example motor vehicle equipped with a power closure member actuation system situated between the front passenger swing door and a vehicle body, according to aspects of the disclosure.

Referring initially to FIG. 1, an example motor vehicle 10 is shown to include a first passenger door 12 pivotally mounted to a vehicle body 14 via an upper door hinge 16 and a lower door hinge 18 which are shown in phantom lines. In accordance with the present disclosure, a power closure member actuation system 20 is integrated into the pivotal connection between first passenger door 12 and a vehicle body 14. In accordance with a preferred configuration, power closure member actuation system 20 generally includes a power-operated actuator mechanism or actuator 22 secured within an internal cavity of passenger door 12, and a rotary drive mechanism that is driven by the power-operated actuator mechanism 22 and is drivingly coupled to a hinge component associated with lower door hinge 18. Driven rotation of the rotary drive mechanism causes controlled pivotal movement of passenger door 12 relative to vehicle body 14. In accordance with this preferred configuration, the power-operated actuator mechanism 22 is rigidly coupled in close proximity to a door-mounted hinge component of upper door hinge 16 while the rotary drive mechanism is coupled to a vehicle-mounted hinge component of lower door hinge 18. However, those skilled in the art will recognize that alternative packaging configurations for power closure member actuation system 20 are available to accommodate available packaging space. One such alternative packaging configuration may include mounting the power-operated actuator mechanism to vehicle body 14 and drivingly interconnecting the rotary drive mechanism to a door-mounted hinge component associated with one of upper door hinge 16 and lower door hinge 18.

Each of upper door hinge 16 and lower door hinge 18 include a door-mounting hinge component and a body-mounted hinge component that are pivotably interconnected by a hinge pin or post. The door-mounted hinge component is hereinafter referred to a door hinge strap while the body-mounted hinge component is hereinafter referred to as a body hinge strap. While power closure member actuation system 20 is only shown in association with front passenger door 12, those skilled in the art will recognize that the power closure member actuation system can also be associated with any other closure member (e.g., door or liftgate) of vehicle 10 such as rear passenger doors 17 and decklid 19.

Figure 2:
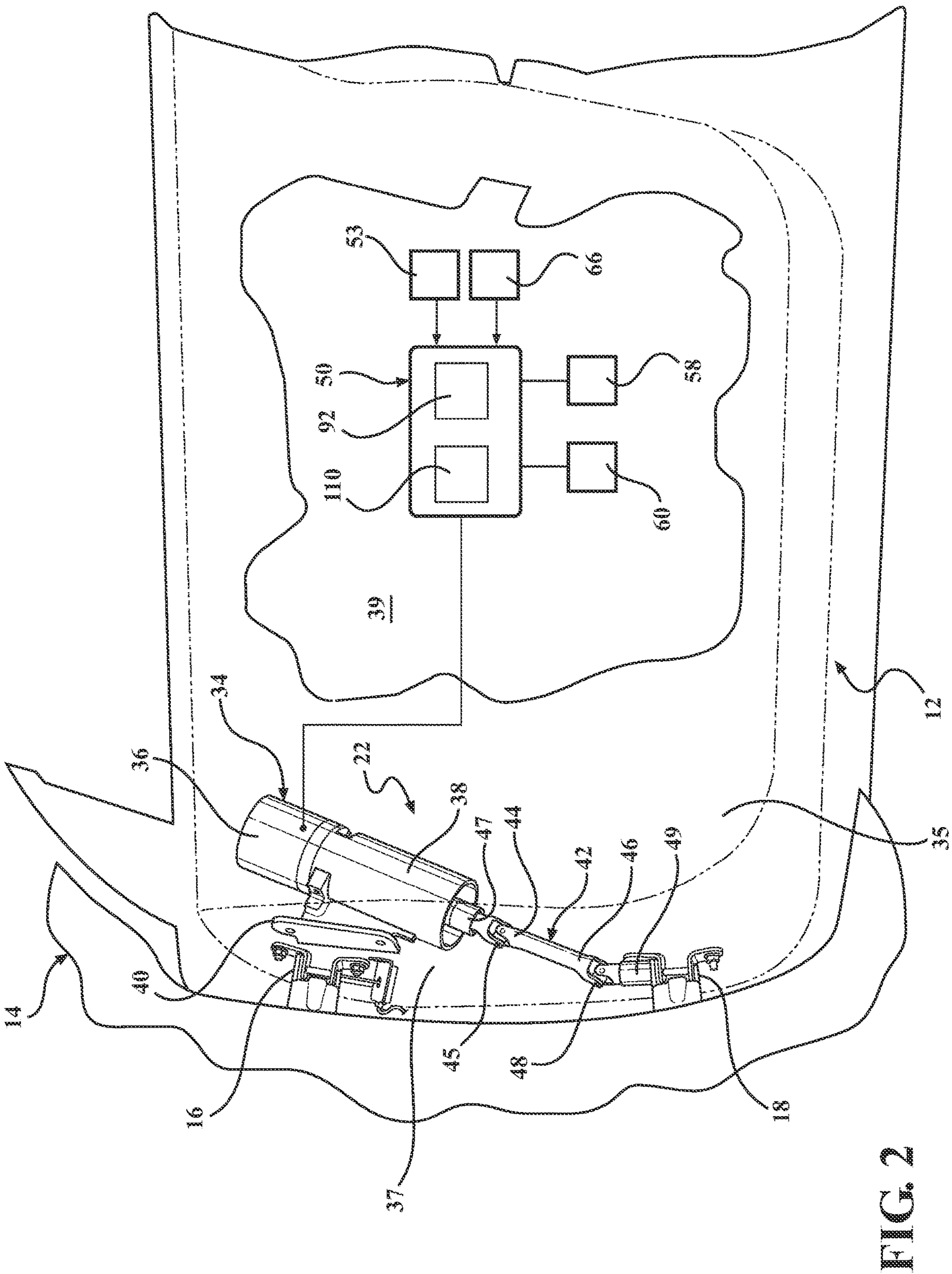
FIG. 2 is a perspective inner side view of a closure member shown in FIG. 1, with various components removed for clarity purposes only, in relation to a portion of the vehicle body and which is equipped with the power closure member actuation system, according to aspects of the disclosure.

Power closure member actuation system 20 is generally shown in FIG. 2 and, as mentioned, is operable for controllably pivoting vehicle door 12 relative to vehicle body 14 between an open position and a closed position. Lower hinge 18 of power closure member actuation system 20 includes a door hinge strap connected to vehicle door 12 and a body hinge strap connected to vehicle body 14. Door hinge strap and body hinge strap of lower door hinge 18 are interconnected along a generally vertically-aligned pivot axis via a hinge pin to establish the pivotable interconnection between door hinge strap and body hinge strap. However, any other mechanism or device can be used to establish the pivotable interconnection between door hinge strap and body hinge strap without departing from the scope of the subject disclosure.

As best shown in FIG. 2, power closure member actuation system 20 includes a power-operated actuator mechanism 22 having a motor and geartrain assembly 34 that is rigidly connectable to vehicle door 12. Motor and geartrain assembly 34 is configured to generate a rotational force. In the preferred embodiment, motor and geartrain assembly 34 includes an electric motor 36 that is operatively coupled to a speed reducing/torque multiplying assembly, such as a high gear ratio planetary gearbox 38. The high gear ratio planetary gearbox 38 may include multiple stages, thus allowing motor and geartrain assembly 34 to generate a rotational force having a high torque output by way of a very low rotational speed of electric motor 36. However, any other arrangement of motor and geartrain assembly 34 can be used to establish the required rotational force without departing from the scope of the subject disclosure.

Motor and geartrain assembly 34 includes a mounting bracket 40 for establishing the connectable relationship with vehicle door 12. Mounting bracket 40 is configured to be connectable to vehicle door 12 adjacent to the door-mounted door hinge strap associated with upper door hinge 16. As further shown in FIG. 2, this mounting of motor assembly 34 adjacent to upper door hinge 16 of vehicle door 12 disposes the power-operated actuator mechanism 22 of power closure member actuation system 20 in close proximity to the pivot axis of the door 12. The mounting of motor and geartrain assembly 34 adjacent to upper door hinge 16 of vehicle door 12 minimizes the effect that power closure member actuation system 20 may have on a mass moment of inertia (i.e., pivot axis) of vehicle door 12, thus improving or easing movement of vehicle door 12 between its open and closed positions. In addition, as also shown in FIG. 2, the mounting of motor and geartrain assembly 34 adjacent to upper door hinge 16 of vehicle door 12 allows power closure member actuation system 20 to be packaged in front of an A-pillar glass run channel 35 associated with vehicle door 12 and thus avoids any interference with a glass window function of vehicle door 12. Put another way, power closure member actuation system 20 can be packaged in a portion 37 of an internal door cavity 39 within vehicle door 12 that is not being used, and therefore reduces or eliminates impingement on existing hardware/mechanisms within vehicle door 12. Although power closure member actuation system 20 is illustrated as being mounted adjacent to upper door hinge 16 of vehicle door 12, power closure member actuation system 20 can, as an alternative, also be mounted elsewhere within vehicle door 12 or even on vehicle body 14 without departing from the scope of the subject disclosure.

Power closure member actuation system 20 further includes a rotary drive mechanism that is rotatively driven by the power-operated actuator mechanism 22. As shown in FIG. 2, the rotary drive mechanism includes a drive shaft 42 interconnected to an output member of gearbox 38 of motor and geartrain assembly 34 and which extends from a first end 44 disposed adjacent gearbox 38 to a second end 46. The rotary output component of motor and geartrain assembly 34 can include a first adapter 47, such as a square female socket or the like, for drivingly interconnecting first end 44 of drive shaft 42 directly to the rotary output of gearbox 38 In addition, although not expressly shown, a disconnect clutch can be disposed between the rotary output of gearbox 38 and first end 44 of drive shaft 42. In one configuration, the clutch would normally be engaged without power (i.e., power-off engagement) and could be selectively energized (i.e., power-on release) to disengage. Put another way, the optional clutch drivingly would couple drive shaft 42 to motor and geartrain assembly 34 without the application of electrical power while the clutch would require the application of electrical power to uncouple drive shaft 42 from driven connection with gearbox 38. As an alternative, the clutch could be configured in a power-on engagement and power-off release arrangement. The clutch may engage and disengage using any suitable type of clutching mechanism such as, for example, a set of sprags, rollers, a wrap-spring, friction plates, or any other suitable mechanism. The clutch is provided to permit door 12 to be manually moved by the user between its open and closed positions relative to vehicle body 14. Such a disconnect clutch could, for example, be located between the output of electric motor 36 and the input to gearbox 38. The location of this optional clutch may be dependent based on, among other things, whether or not gearbox 38 includes "back-drivable" gearing.

Second end 46 of drive shaft 42 is coupled to body hinge strap of lower door hinge 18 for directly transferring the rotational force from motor and geartrain assembly 34 to door 12 via body hinge strap. To accommodate angular motion due to swinging movement of door 12 relative to vehicle body 14, the rotary drive mechanism further includes a first universal joint or U-joint 45 disposed between first adapter 47 and first end 44 of drive shaft 42 and a second universal joint or U-joint 48 disposed between a second adapter 49 and second end 46 of drive shaft 42. Alternatively, constant velocity joints could be used in place of the U-joints 45, 48. The second adapter 49 may also be a square female socket or the like configured for rigid attachment to body hinge strap of lower door hinge 18. However, other means of establishing the drive attachment can be used without departing from the scope of the disclosure. Rotation of drive shaft 42 via operation of motor and geartrain assembly 34 functions to actuate lower door hinge 18 by rotating body hinge strap about its pivot axis to which drive shaft 42 is attached and relative to door hinge strap. As a result, power closure member actuation system 20 is able to effectuate movement of vehicle door 12 between its open and closed positions by "directly" transferring a rotational force directly to body hinge strap of lower door hinge 18. With motor and geartrain assembly 34 connected to vehicle door 12 adjacent to upper door hinge 16, second end 46 of drive shaft 42 is attached to body hinge strap of lower door hinge 18. Based on available space within door cavity 39, it may be possible to mount motor and geartrain assembly 34 adjacent to the door-mounted hinge component of lower door hinge 18 and directly connect second end 46 of drive shaft 42 to the vehicle-mounted hinge component of upper door hinge 16. In the alternative, if motor and geartrain assembly 34 is connected to vehicle body 14, second end 46 of drive shaft 42 would be attached to door hinge strap.

Figure 3:
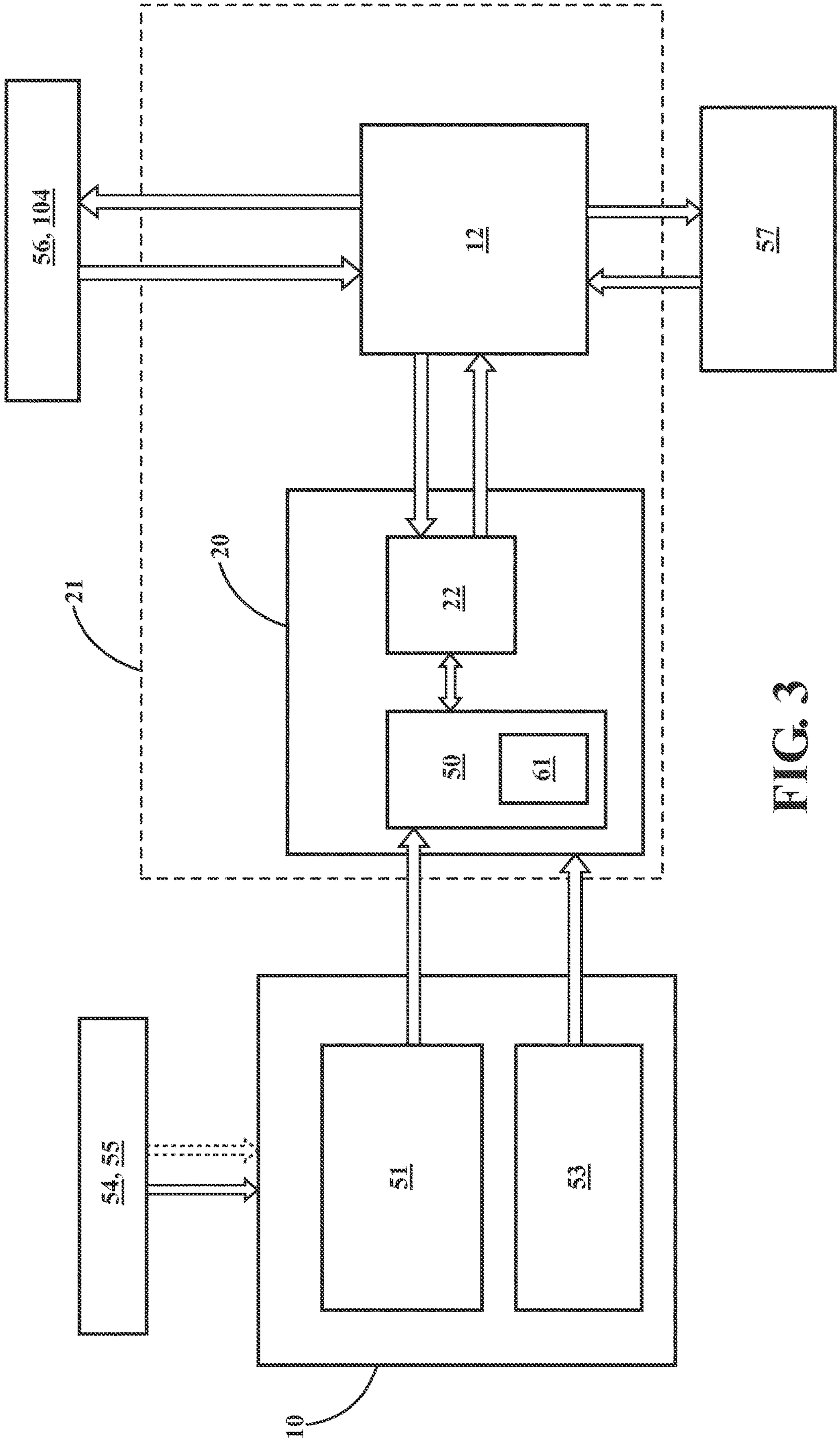
FIG. 3 illustrates a block diagram of the power closure member actuation system, according to aspects of the disclosure.

FIG. 3 illustrates a block diagram of the power closure member actuation system 20 of a power door system 21 for moving the closure member (e.g., vehicle door 12) of the vehicle 10 between open and closed positions relative to the vehicle body 14. As discussed above, the power closure member actuation system 20 includes the actuator 22 that is coupled to the closure member (e.g., vehicle door 12) and the vehicle body 14. The actuator 22 is configured to move the closure member 12 relative to the vehicle body 14. The power closure member actuation system 20 also includes an actuator controller 50 that is coupled to the actuator 22 and in communication with other vehicle systems (e.g., a door node control module 52 or a body control module (BCM)) and also receives vehicle power from the vehicle 10 (e.g., from a vehicle battery 53).

The actuator controller 50 is operable in at least one of an automatic mode (in response to an automatic mode initiation input 54) and a powered assist mode (in response to a motion input 56). In the automatic mode, the actuator controller 50 commands movement of the closure member through a predetermined motion profile (e.g., to open the closure member). The powered assist mode is different than the automatic mode in that the motion input 56 from the user 75 may be continuous to move the closure member, as opposed to a singular input by the user 75 in automatic mode. Actuator controller 50 may therefore be configured as a servo controller which may for example receive electrical signals indicative of the position of the door from the closure member actuation system 20, such as a high position count sensor as will be described in more details herein below as an illustrative example, and in response send electrical signals to the actuator 22 based on the received high position count signals to move the door closure member 12. No separate button or switch activations by a user are needed to move the closure member 12, the user only requires to directly move the closure member 12. Commands 51 from the vehicle systems may, for example, include instructions the actuator controller 50 to open the closure member, close the closure member, or stop motion of the closure member. Such control inputs, such as inputs 54, 56 may also include other types of inputs 55, such as an input from a body control module, which may receive a wireless command to control the door opening based on a signal such as a wireless signal received from the key fob 60, or other wireless device such as a cellular smart phone, or from a sensor assembly provided on the vehicle, such as a radar or optical sensor assembly detecting an approach of a user, such as a gesture or gait e.g. walk of the user 75 upon approach of the user 75 to the vehicle. Also shown are other components that may have an impact on the operation of the power closure member actuation system 20, such as door seals 57 of the vehicle door 12, for example. In addition, environmental conditions 59 (rain, cold, heat, etc.) may be monitored by the vehicle 10 (e.g., by the body control module 52) and/or the actuator controller 50. The actuator controller 50 also includes an artificial intelligence learning algorithm 61 (e.g., series of nodes forming a neural network model), discussed in more detail below.

Figure 4:
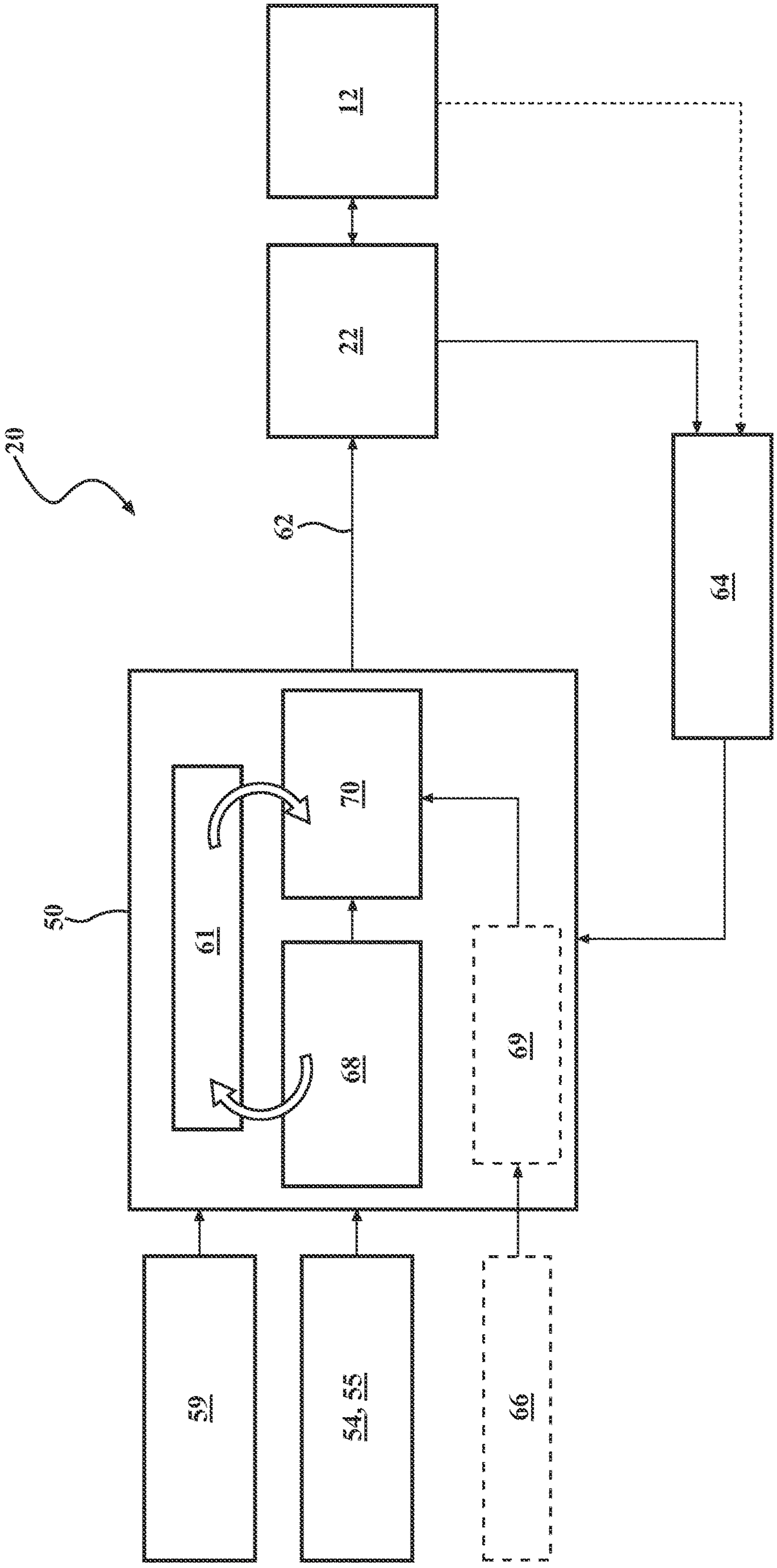
FIG. 4 illustrates another block diagram of the power closure member actuation system for moving the closure member in an automatic mode, according to aspects of the disclosure.

Referring now to FIG. 4, the actuator controller 50 is configured to receive the automatic mode initiation input 54 and enter the automatic mode to output a motion command 62 in response to receiving the automatic mode initiation input 54 or input motion command 62. The automatic mode initiation input 54 can be a manual input on the closure member itself or an indirect input to the vehicle (e.g., closure member switch 58 on the closure member, switch on a key fob 60, etc.). So, the automatic mode initiation input 54 may, for example, be a result of a user or operator operating a switch (e.g., the closure member switch 58), making a gesture near the vehicle 10, or possessing a key fob 60 near the vehicle 10, for example. It should also be appreciated that other automatic mode initiation inputs 54 are contemplated, such as, but not limited to a proximity of the user 75 detected by a proximity sensor.

In addition, the power closure member actuation system 20 includes at least one closure member feedback sensor 64 for determining at least one of a position and a speed and an attitude of the closure member. Thus, the at least one closure member feedback sensor 64 detects signals from either the actuator 22 by counting revolutions of the electric motor 36, absolute position of an extensible member (not shown), or from the door 12 (e.g., an absolute position sensor on a door check as an example) can provide position information to the actuator controller 50. Feedback sensor 64 in communication with actuator controller 50 is illustrative of part of a feedback system or motion sensing system for detecting motion of the door directly or indirectly, such as by detecting changes in speed and position of the closure member, or components coupled thereto. For example, the motion sensing system may be hardware based (e.g. a hall sensor unit an related circuitry) for detecting movement of a target on the closure member (e.g. on the hinge) or actuator 22 (e.g. on a motor shaft) as examples, and/or may also be software based (e.g. using code and logic for executing a ripple counting algorithm) executed by the actuator controller 50 for example. Other types of position, speed, and/or orientation detectors such as accelerometers and induction based sensors may be employed without limitation.

The power closure member actuation system 20 additionally includes at least one non-contact obstacle detection sensor 66 which may form part of a non-contact obstacle detection system coupled, such as electrically coupled, to the actuator controller 50. The actuator controller 50 is configured to determine whether an obstacle is detected using the at least one non-contact obstacle detection sensor 66 (e.g., using a non-contact obstacle detection algorithm 69) and may, for example, cease movement of the closure member in response to determining that the obstacle is detected. The non-contact obstacle detection system may also be configured to calculate distance from the closure member to the object or obstacle, or to a user as the object or obstacle, to the door 12. For example non-contact obstacle detection system may be configured to perform time of flight calculations to determine distance using a radar based sensor 66 or to characterize the object as a user or human as compared to an non-human object for example based on determining the reflectivity of the object using a radar based sensor 66 and system. The non-contact obstacle detection system may also be configured determine when an obstacle is detected, for example by detecting reflected waves of the object or obstacle or user of radar transmitted from the obstacle sensor 66. The non-contact obstacle detection system may also be configured determine when an obstacle is not detected, for example by not detecting reflected waves of the object or obstacle or user of radar transmitted from the obstacle sensor 66. The operation and example of the at least one non-contact obstacle detection sensor 66 and system are discussed in U.S. Patent Application No. 2018/0238099, incorporated herein by reference.

In the automatic mode, the actuator controller 50 can include one or more closure member motion profiles 68 that are utilized by the actuator controller 50 when generating the motion command 62 (e.g., using a motion command generator 70 of the actuator controller 50) in view of the obstacle detection by the at least one non-contact obstacle detection sensor 66. So, in the automatic mode, the motion command 62 has a specified motion profile 68 (e.g., acceleration curve, velocity curve, deceleration curve, and finally stops at an open position) and is continually optimized per user feedback (e.g., automatic mode initiation input 54).

Figure 5:
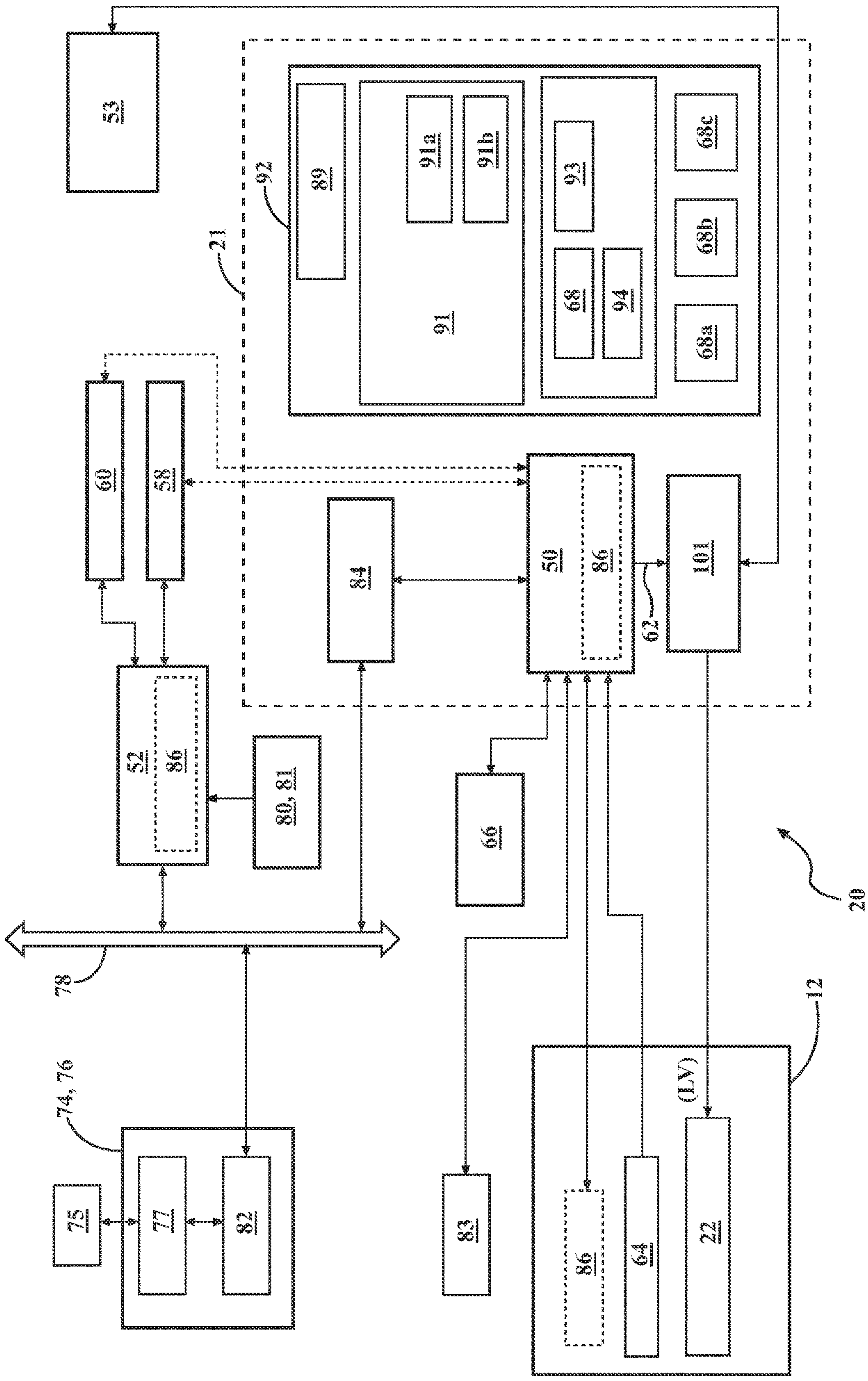
FIGS. 5 and 5A illustrates the power closure member actuation system shown as part of a vehicle system architecture, according to aspects of the disclosure.

In FIG. 5, the power closure member actuation system 20 is shown as part of a vehicle system architecture 72 corresponding to operation in the automatic mode. The power closure member actuation system 20 includes a user interface 74, 76 that is configured to detect a user interface input from a user 75 via an interface 77 (e.g., touchscreen) to modify at least one stored motion control parameter associated with the movement of the closure member. Thus, the actuator controller 50 of the power closure member actuation system 20 or user modifiable system is configured to present the at least one stored motion control parameter on the user interface 74, 76.

The body control module 52 is in communication with the actuator controller 50 via a vehicle bus 78 (e.g., a Local Interconnect Network or LIN bus). The body control module 52 can also be in communication with the key fob 60 (e.g., wirelessly) and a closure member switch 58 configured to output a closure member trigger signal through the body control module 52. Alternatively, the closure member switch 58 could be connected directly to the actuator controller 50 or otherwise communicated to the actuator controller 50. The body control module 52 may also be in communication with an environmental sensor (e.g., temperature sensor 80). The actuator controller 50 is also configured to modify the at least one stored motion control parameter in response to detecting the user interface input. A screen communications interface control unit 82 associated with the user interface 74, 76 can, for example, communicate with a closure communications interface control unit 84 associated with the actuator controller 50 via the vehicle bus 78. In other words, the closure communication interface control unit 84 is coupled to the vehicle bus 78 and to the actuator controller 50 to facilitate communication between the actuator controller 50 and the vehicle bus 78. Thus, the user interface input can be communicated from the user interface 74, 76 to the actuator controller 50.

A vehicle inclination sensor 86 (such as an accelerometer) is also coupled to the actuator controller 50 for detecting an inclination of the vehicle 10. The vehicle inclination sensor 86 outputs an inclination signal corresponding to the inclination of the vehicle 10 and the actuator controller 50 is further configured to receive the inclination signal and adjust the one of a force command 88 (FIG. 6) and the motion command 62 accordingly. While the vehicle inclination sensor 86 may be separate from the actuator controller 50, it should be understood that the vehicle inclination sensor 86 may also be integrated in the actuator controller 50 or in another control module, such as, but not limited to the body control module 52.

The actuator controller 50 is further configured to perform at least one of an initial boundary condition check prior to the generation of the command signal (e.g., the force command 88 or the motion command 62) and an in-process boundary check during the generation of the command signal. Such boundary checks prevent movement of the closure member and operation of the actuator 22 outside a plurality of predetermined operating limits or boundary conditions 91 and will be discussed in more detail below.

The actuator controller 50 can also be coupled to a vehicle latch 83. In addition, the actuator controller 50 is coupled to a memory device 92 having at least one memory location for storing at least one stored motion control parameter associated with controlling the movement of the closure member (e.g., door 12). The memory device 92 can also store one or more closure member motion profiles 68 (e.g., movement profile A 68*a*, movement profile B 68*b*, movement profile C 68*c*) and boundary conditions 91 (e.g., the plurality of predetermined operating limits such as minimum limits 91*a*, and maximum limits 91*b*). The memory device 92 also stores original equipment manufacturer (OEM) modifiable door motion parameters 89 (e.g., door check profiles and pop-out profiles).

The actuator controller 50 is configured to generate the motion command 62 using the at least one stored motion control parameter to control an actuator output force acting on the closure member to move the closure member. A pulse width modulation unit 101 is coupled to the actuator controller 50 and is configured to receive a pulse width control signal and output an actuator command signal corresponding to the pulse width control signal.

Figure 5A:
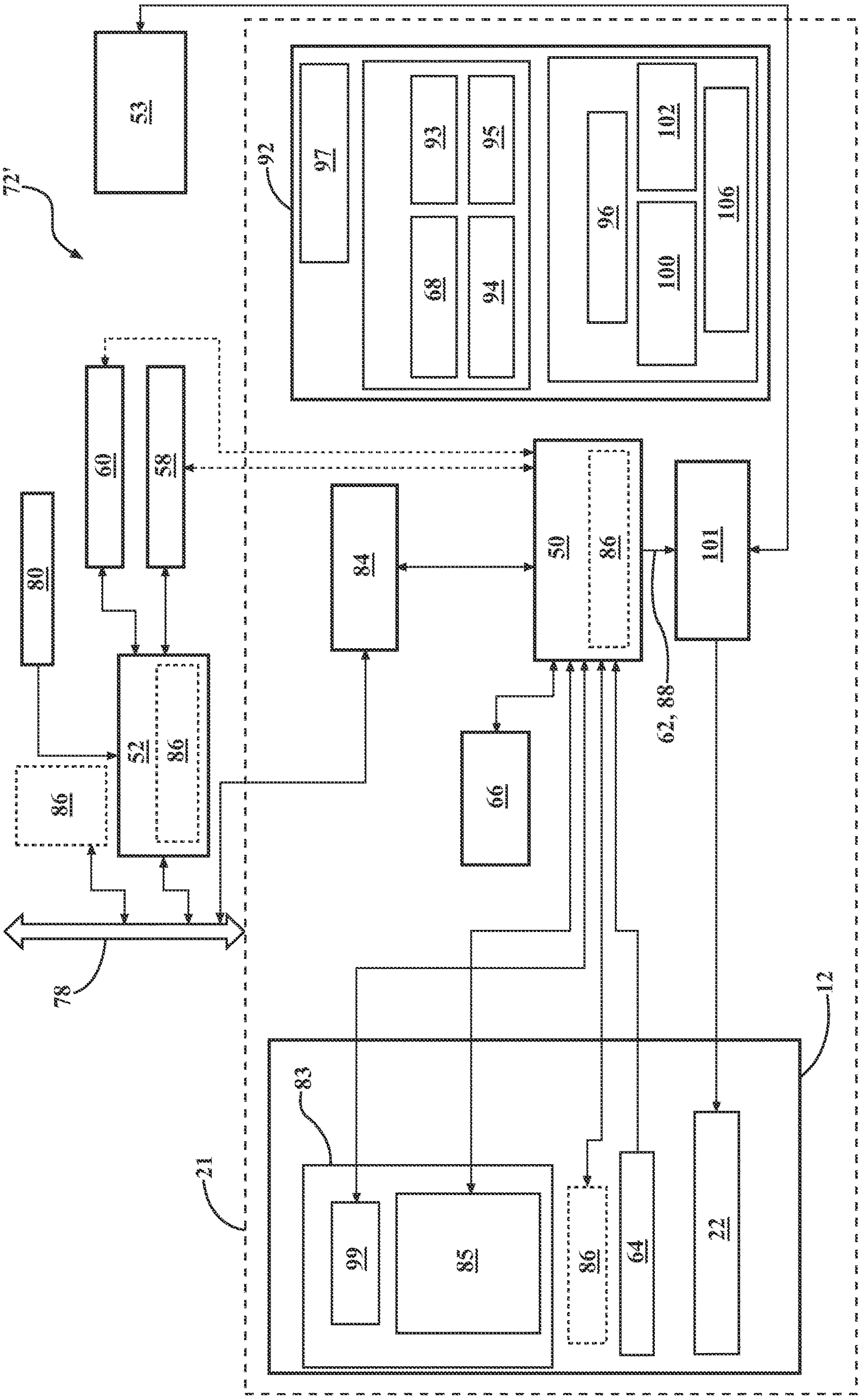

Similar to FIG. 5, FIG. 5A shows the power closure member actuation system 20 as part of another vehicle system architecture 72' operable in the automatic mode and the powered assist mode. The body control module 52 may also be in communication with at least one environmental sensor 80, 81 for sensing at least one environmental condition 59. Specifically, the at least one environmental sensor 80, 81 can be at least one of a temperature sensor 80 or a rain sensor 81. While the temperature sensor 80 and rain sensor 81 may be connected to the body control module 52, they may alternatively be integrated in the body control module 52 and/or integrated in another unit such as, but not limited to the actuator controller 50. In addition, other environmental sensors 80, 81 are contemplated.

The controller is also coupled with the latch 83 that includes a cinch motor 99 (for cinching the closure member 12 into the closed position). The latch 83 also includes a plurality of primary and secondary ratchet position sensors or switches 85 that provide feedback to the actuator controller 50 regarding whether the latch 83 is in a latch primary position or a latch secondary position, for example.

Again, the vehicle inclination sensor 86 (such as an accelerometer or inclinometer) is also coupled to the actuator controller 50 for detecting the inclination of the vehicle 10. The vehicle inclination sensor 86 outputs an inclination signal corresponding to the inclination of the vehicle 10 and the actuator controller 50 is further configured to receive the inclination signal and adjust the one of the force command 88 (FIG. 6) and the motion command 62 accordingly. Accordingly may be for example adjusting the motion command 62 such that door 12 moves at the same speed and motion profile as compared to the door 12 being moved by a motion command as if on a level terrain. As a result, the actuator 22 may move the door 12 such that the motion profile (e.g. speed versus door position) when on an incline is the same as or is tracking to the motion profile as if the vehicle was not on an incline. In other words the user detects no visual difference in the door motion appearance of speed versus position as when the vehicle 10 is on an incline or not. Or for example accordingly may be adjusting the force command 88 such that door 12 is moved applying the similar resistance force detected by a user as compared to the door being moved by a force command as if on level terrain. As a result, the actuator 22 may move the door such that the force required to move the door 12 by a user when on an incline is the same as the force required by a user to move the door as if the vehicle was not on an incline. In other words, the user experiences the same reactionary resistive force of the door acting against the input force of the user when the vehicle 10 is on an incline or not.

A pulse width modulation unit 101 is also coupled to the actuator controller 50 and is configured to receive a pulse width control signal and output an actuator command signal corresponding to the pulse width control signal. The actuator controller 50 includes a processor or other computing unit 110 in communication with the memory device 92. So, the actuator controller 50 is coupled to the memory device 92 for storing a plurality of automatic closure member motion parameters 68, 93, 94, 95 for the automatic mode and a plurality of powered closure member motion parameters 96, 100, 102, 106 for the powered assist mode and used by the actuator controller 50 for controlling the movement of the closure member (e.g., door 12 or 17). Specifically, the plurality of automatic closure member motion parameters 68, 93, 94, 95 includes at least one of closure member motion profiles 68 (e.g., plurality of closure member velocity and acceleration profiles), a plurality of closure member stop positions 93, a closure member check sensitivity 94, and a plurality of closure member check profiles 95. The plurality of powered closure member motion parameters 96, 100, 102, 106 includes at least one of a plurality of fixed closure member model parameters 96 and a force command generator algorithm 100 and a closure member model 102 and a plurality of closure member component profiles 106. In addition, the memory device 92 stores a date and mileage and cycle count 97. The memory device 92 may also store boundary conditions (e.g., plurality of predetermined operating limits) used for a boundary check to prevent movement of the closure member and operation of the actuator 22 outside a plurality of predetermined operating limits or boundary conditions.

Consequently, the actuator controller 50 is configured to receive one of the motion input 56 associated with the powered assist mode and the automatic mode initiation input 54 associated with the automatic mode. The actuator controller 50 is then configured to send the actuator 22 one of a motion command 62 based on the plurality of automatic closure member motion parameters 68, 93, 94, 95 in the automatic mode and the force command 88 based on the plurality of powered closure member motion parameters 96, 100, 102, 106 in the powered assist mode to vary the actuator output force acting on the closure member 12 to move the closure member 12. The actuator controller 50 additionally monitors and analyzes historical operation of the power closure member actuation system 20 using the artificial intelligence learning algorithm 61 and adjusts the plurality of automatic closure member motion parameters 68, 93, 94, 95 and the plurality of powered closure member motion parameters 96, 100, 102, 106 accordingly.

As discussed above, the power closure member actuation system 20 can include an environmental sensor 80, 81 in communication with the actuator controller 50 and configured to sense at least one environmental condition of the vehicle 10. Thus, the historical operation monitored and analyzed by the actuator controller 50 using the artificial intelligence learning algorithm 61 can include the at least one environmental condition of the vehicle 10. So, the controller is further configured to adjust the plurality of automatic closure member motion parameters 68, 93, 94, 95 and the plurality of powered closure member motion parameters 96, 100, 102, 106 based on the at least one environmental condition of the vehicle 10.

Figure 6:
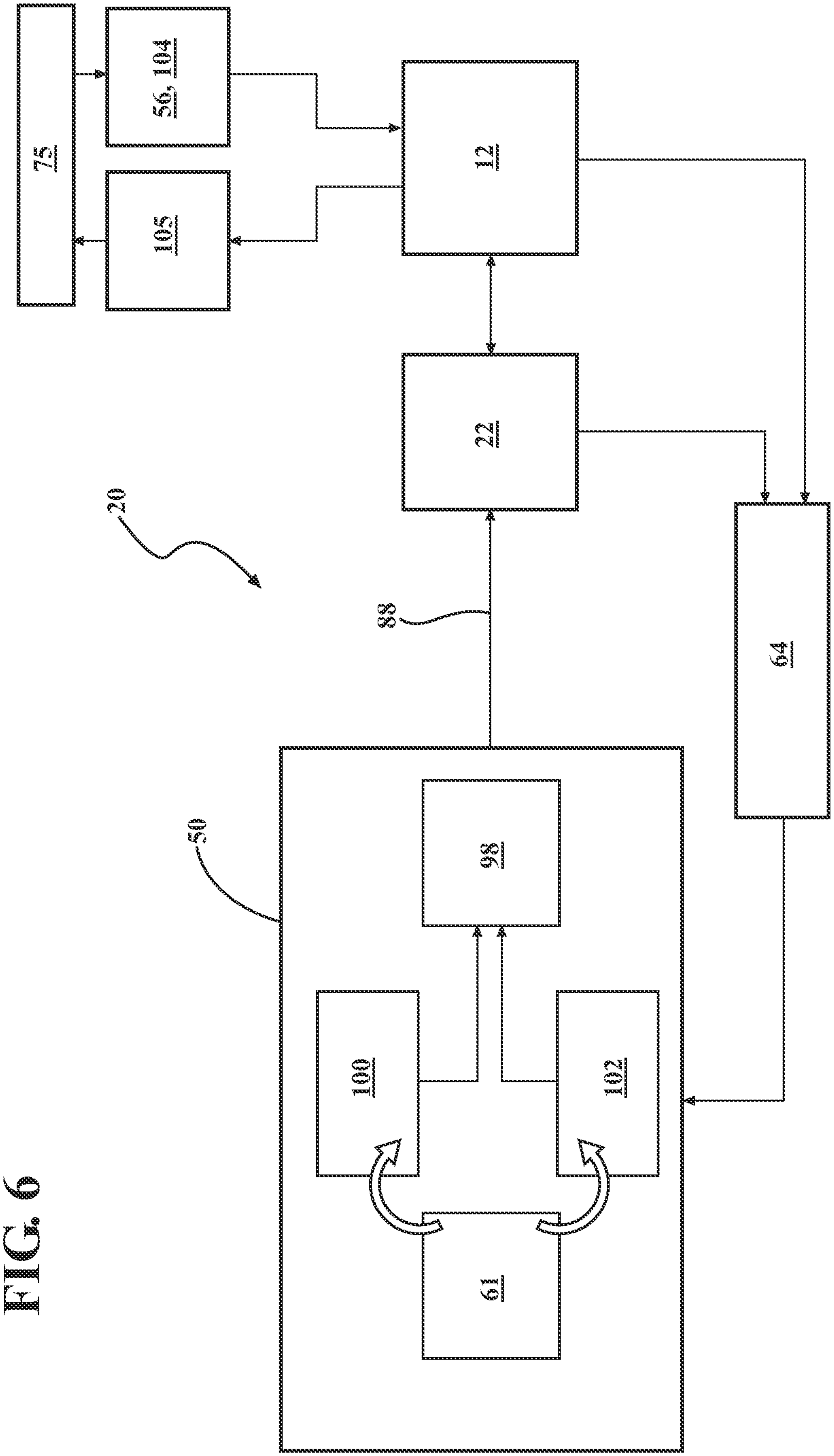
FIG. 6 illustrates another block diagram of the power closure member actuation system for moving the closure member in a powered assist mode, according to aspects of the disclosure.

As best shown in FIG. 6, the actuator controller 50 is also configured to receive the motion input 56 and enter the powered assist mode to output the force command 88 (e.g., using a force command generator 98 of the actuator controller 50 as a function of a force command algorithm 100, door model 102, boundary conditions 91, a plurality of closure member component profiles 106 as discussed in more detail below) as modified by the artificial intelligence learning algorithm 61. The actuator controller 50 is also configured to generate the force command 88 to control an actuator output force acting on the closure member to move the closure member. So, the actuator controller 50 varies an actuator output force acting on the closure member to move the closure member in response to receiving the motion input 56. In the powered assist mode, the force command 88 has a specified force profile (e.g., that may be altered to change the user experience with the closure member, such as by making it lighter or heavier, or based on changes in the environmental condition and modified by the artificial intelligence learning algorithm 61, such as by increasing or decreasing the force assist provided to the user 75). The force command 88 is continually optimized per current user feedback, for example. A user movement sensor 104 is coupled to the actuator controller 50 and is configured to sense the motion input 56 from the user 75 on the closure member to move the closure member. Door motion feedback 105 is also provided from the closure member (e.g., door 12) back to the user 75. Again, the power closure member actuation system 20 further includes at least one closure member feedback sensor 64 for determining at least one of a position and speed of the closure member. The at least one closure member feedback sensor 64 detects the position and/or speed of the closure member, as described above for the automatic mode, and can provide corresponding position/motion information or signals to the actuator controller 50 concerning how the user 75 is interacting with the closure member. For example, the at least one closure member feedback sensor 64 determine how fast the user 75 is moving the closure member (e.g., door 12). The attitude or inclination sensor 86 may also determine the angle or inclination of the closure member and the power closure member actuation system 20 may compensate for such an angle to assist the user 75 and negate any effects on the closure member motion that the change in angle causes (e.g., for example changes regarding how gravity may influence the closure member differently based on the angle of the closure member relative to a ground plane).

Figure 7:
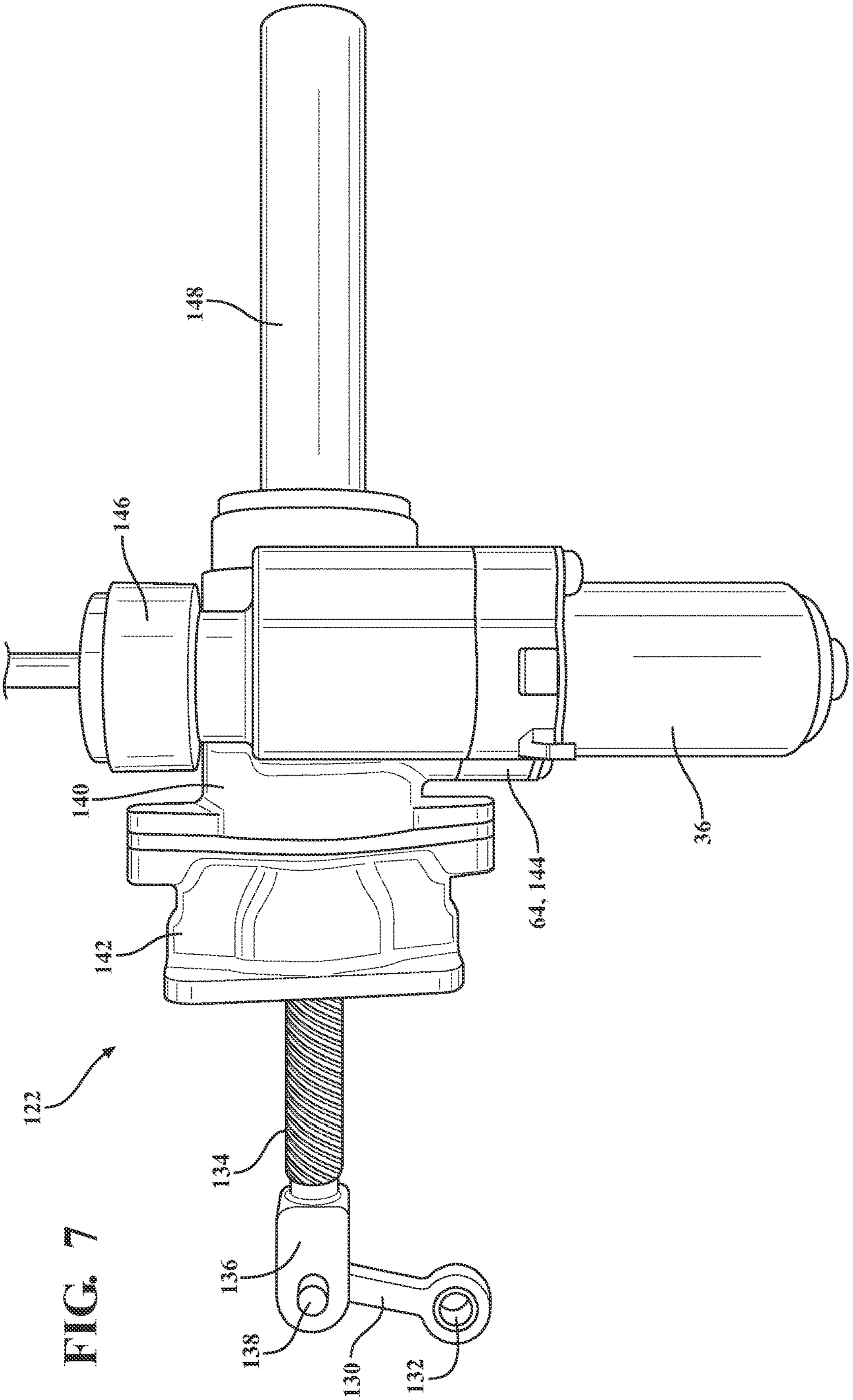
FIG. 7 illustrates a first powered actuator according to aspects of the disclosure.

Referring now to FIG. 7, a first powered actuator 122 is disclosed. The first powered actuator 122 includes a link bar 130 defining a distal hole 132. The distal hole 132 is configured to be connected to the vehicle body 14 in some embodiments where the first powered actuator 122 is disposed within the closure, for example as shown in FIG. 2. Alternatively, the distal hole 132 may be configured to be connected to the closure, such as a vehicle side door 12, 17 in embodiments where the first powered actuator is disposed outside of the closure, for example within a structure of the vehicle body 14. The link bar 130 is connected to an extensible member 134 via a linkage 136 having a pin 138 pivotably supporting the link bar 130. Thus, the extensible member 134 is configured to be coupled to the vehicle body 14 or the closure of the vehicle for opening or closing the closure. Linkage 136 may be directly pivotally coupled to vehicle body 14 for example, via the distal hole 132 provided rather on linkage 136 for facilitating connection of the linkage 136 to the vehicle body 14, without a link bar 130.

The first powered actuator 122 also includes a gearbox 140 configured to apply a force to the extensible member 134 for causing the extensible member 134 to move linearly. An adapter 142 is configured to mount the gearbox 140 to the closure or to the vehicle body 14. An electric motor 36 is coupled to the gearbox 140 for driving the first powered actuator 122. The electric motor 36 may be a standard DC motor such as a permanent magnet (e.g. ferrite) or a reluctance type motor. The electric motor 36 may be a brushless DC (BLDC) type motor such as a permanent magnet (e.g. ferrite) or a reluctance type motor. A closure member feedback sensor 64 in the form of a high-resolution position sensor 144 is disposed between the electric motor 36 and the gearbox 140. The high-resolution position sensor 144 may include a magnet wheel and a Hall effect sensor to provide speed, direction, and/or positional information regarding the extensible member 134 and the closure attached thereto. An electromagnetic (EM) brake 146 is coupled to the gearbox 140 on an opposite side from the electric motor 36. The EM brake 146 is optional and may not be included in all powered actuators. A cover 148 is attached to the gearbox 140 and is configured to enclose the extensible member 134. The cover 148 may help to prevent dust or dirt from fouling the extensible member 134 and/or to protect the extensible member 134 from contacting other components within the closure or the vehicle body 14. The cover 148 is formed as a hollow cylindrical tube, as shown on FIG. 7.

Figure 8:
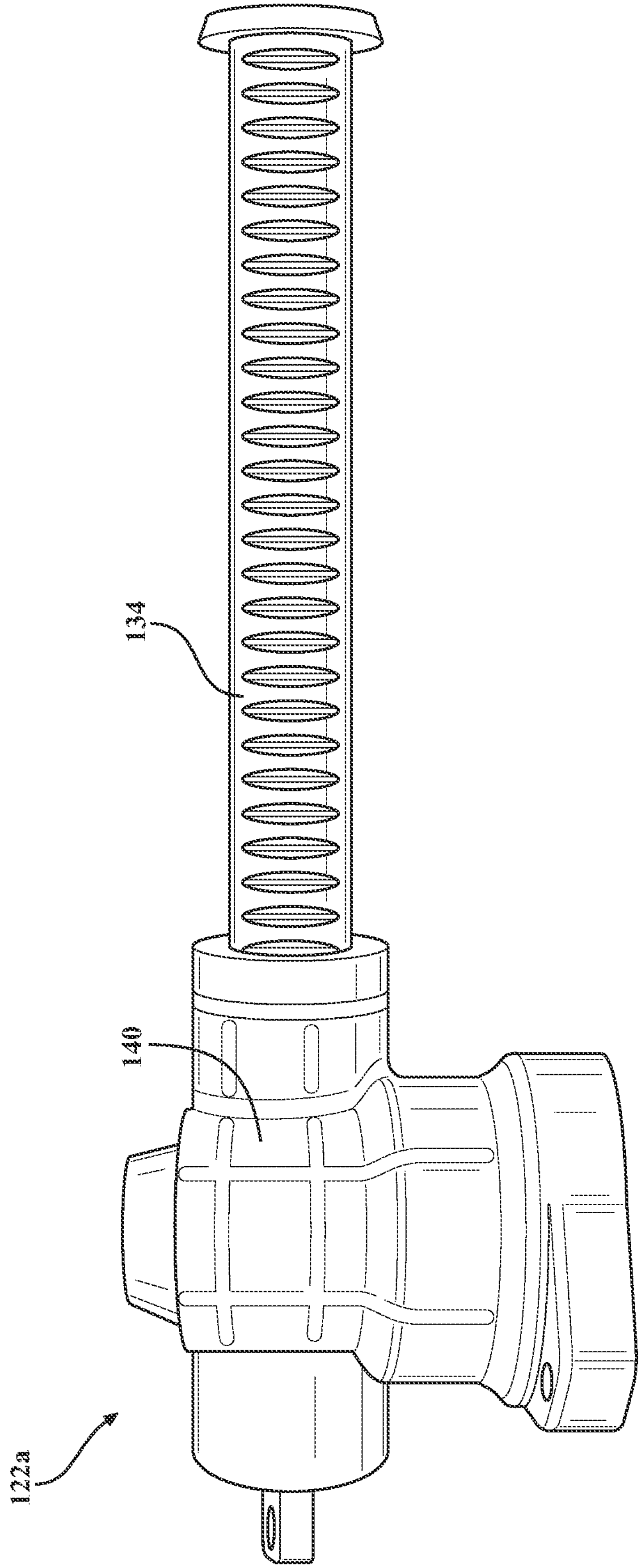
FIG. 8 illustrates a second powered actuator according to aspects of the disclosure.

In some embodiments, and as shown in the first powered actuator 122 of FIG. 7, the extensible member 134 includes a leadscrew having one or more helical threads extending thereabout. The extensible member 134 may have other configurations. For example, FIG. 8 shows a second powered actuator 122*a* in which the extensible member 134 is configured as a rack gear that is configured to be driven linearly by a corresponding gear, such as a pinion gear (not shown) in the gearbox 140. In some embodiments, the gearbox 140 of the second powered actuator 122*a* may include a planetary gear drive with a rack and pinion output.

Figure 9:
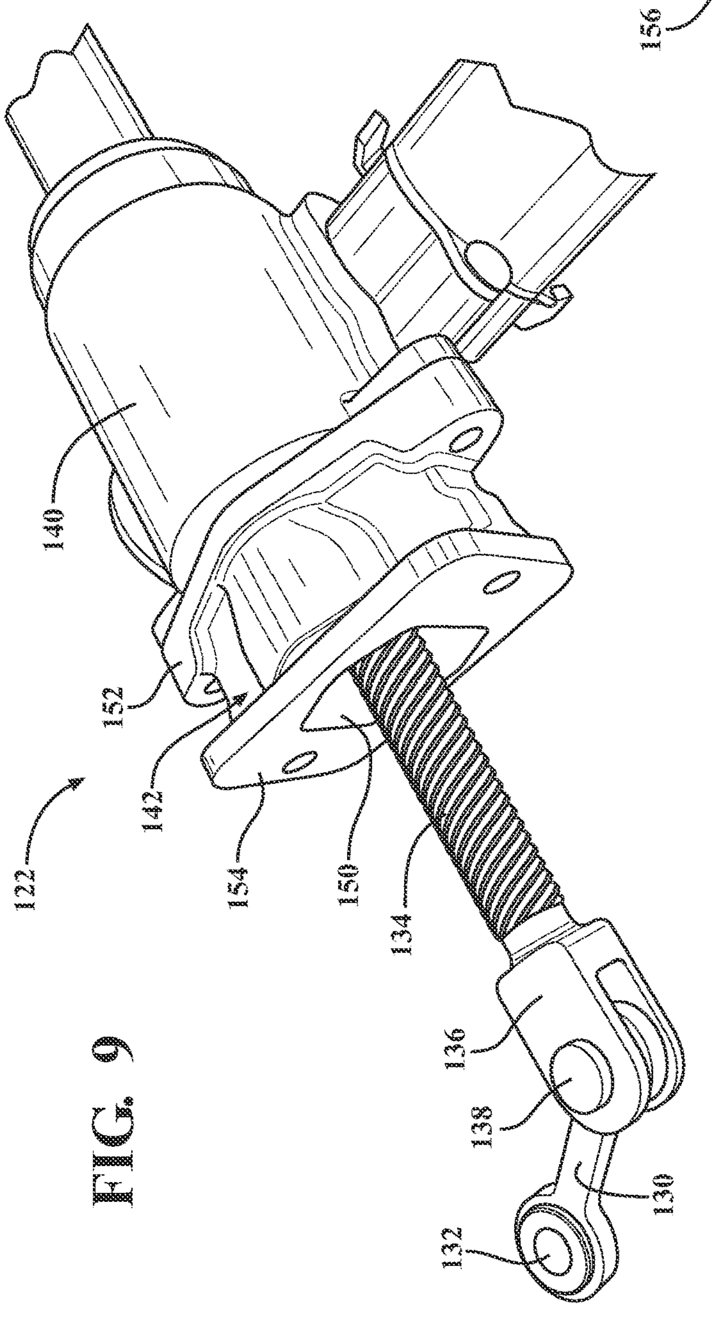
FIG. 9 illustrates the first powered actuator of FIG. 7, according to aspects of the disclosure.

FIG. 9 shows another view of the first powered actuator 122 showing details of the adapter 142. As shown in FIG. 9, the adapter 142 has a generally tubular shape defining a central bore 150 for the extensible member 134 pass through. The adapter 142 includes a first flange 152 that is configured to be fixed to the gearbox 140 using a pair of screws or bolts. The adapter 142 also includes a second flange 154 that is configured to be fixed to the closure. Different adapters 142 having different configurations may be used to adapt powered actuators of the present disclosure to different vehicular applications, such as for different vehicles or for different closures within a same vehicle.

Figure 10:
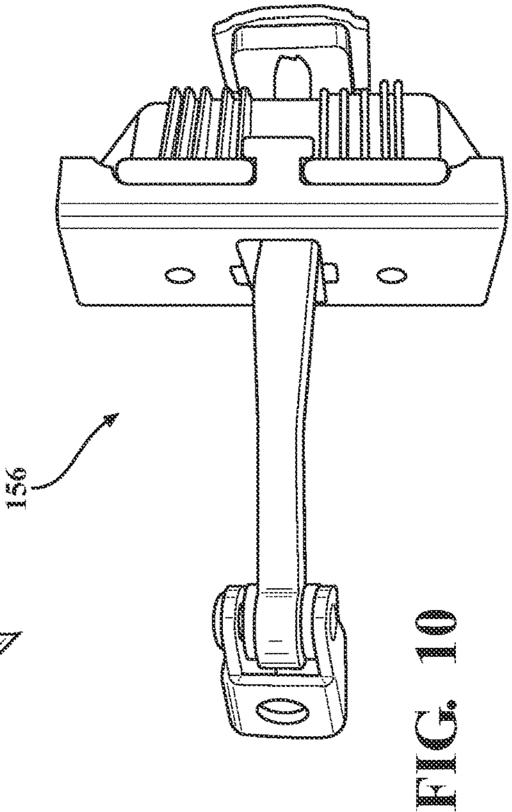
FIG. 10 illustrates a non-powered door check device.

In some embodiments, the adapter 142 is configured to allow the first powered actuator 122 to be a direct replacement for a non-powered door check device 156 for limiting rotational travel of the closure, such as the door check device 156 shown in FIG. 10.

Figure 11B:
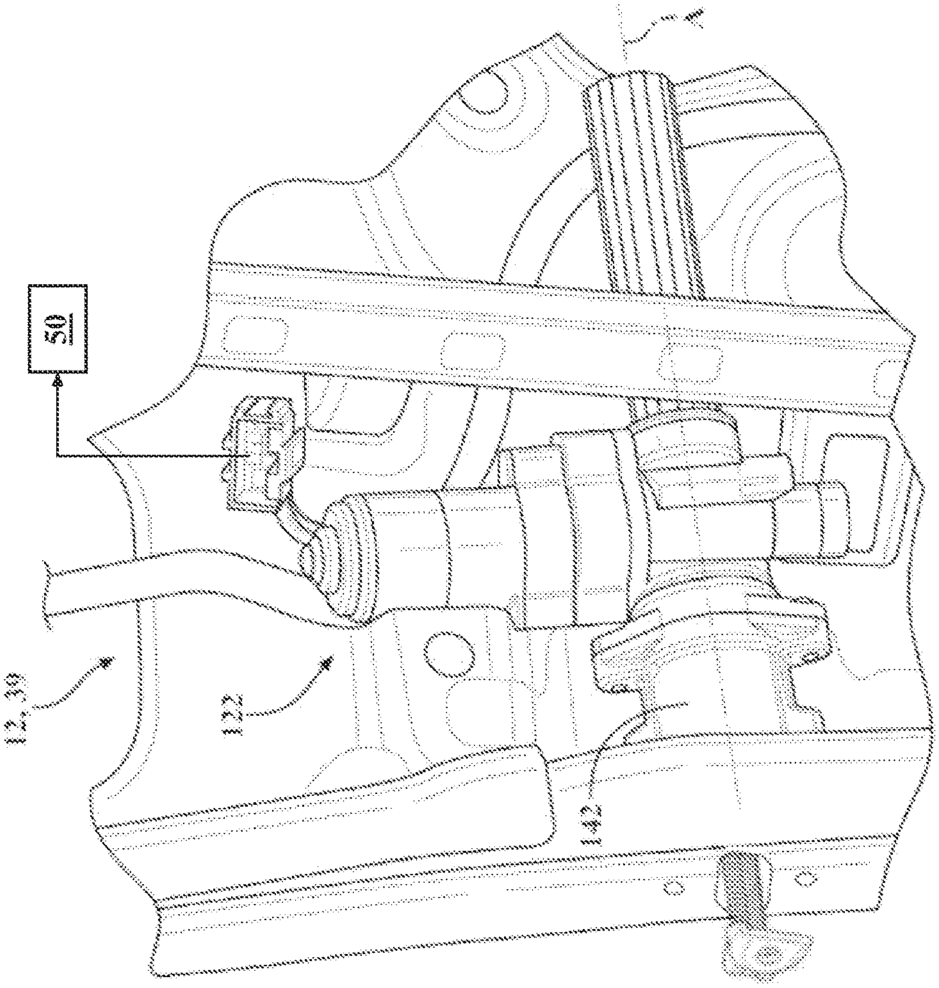
FIG. 11B illustrates the powered actuator of FIG. 11A disposed within the internal cavity of the passenger door.
Figure 11A:
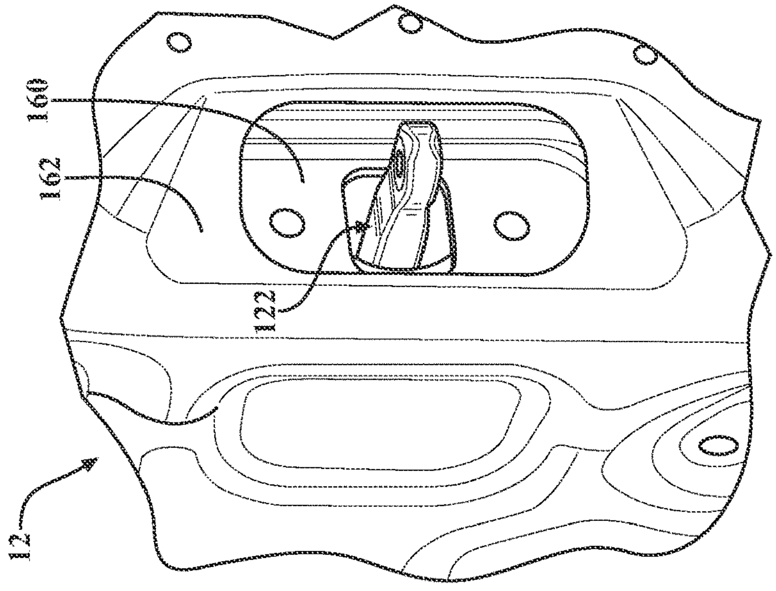
FIG. 11A illustrates a powered actuator protruding from an internal cavity of a passenger door according to aspects of the disclosure.

FIG. 11A illustrates the first powered actuator 122 protruding from an internal door cavity 39 of a front passenger door 12 according to aspects of the disclosure. The powered actuator 22, 122 of the present disclosure may be similarly within any vehicle closure, such as any swing door or a swing-type tailgate. Specifically, first powered actuator 122 is configured to mount to a preexisting mounting point 160 on the shut face 162 of the closure 12. The preexisting mounting point 160 is also configured to hold a door stopper, such as door check device 156 shown in FIG. 10.

FIG. 11B illustrates the powered actuator of FIG. 11A disposed within the internal cavity 39 of the passenger door 12. In some embodiments, the adapter 142 is configured to provide a rotational degree of freedom between the gearbox 140 and the shut face 162 of the closure for accommodating installation in a door cavity 39. For example, the powered actuator 122 may be rotated about a central axis A through the extensible member 134 and along which the extensible member 134 translates to open or close the door 12.

Figure 12B:
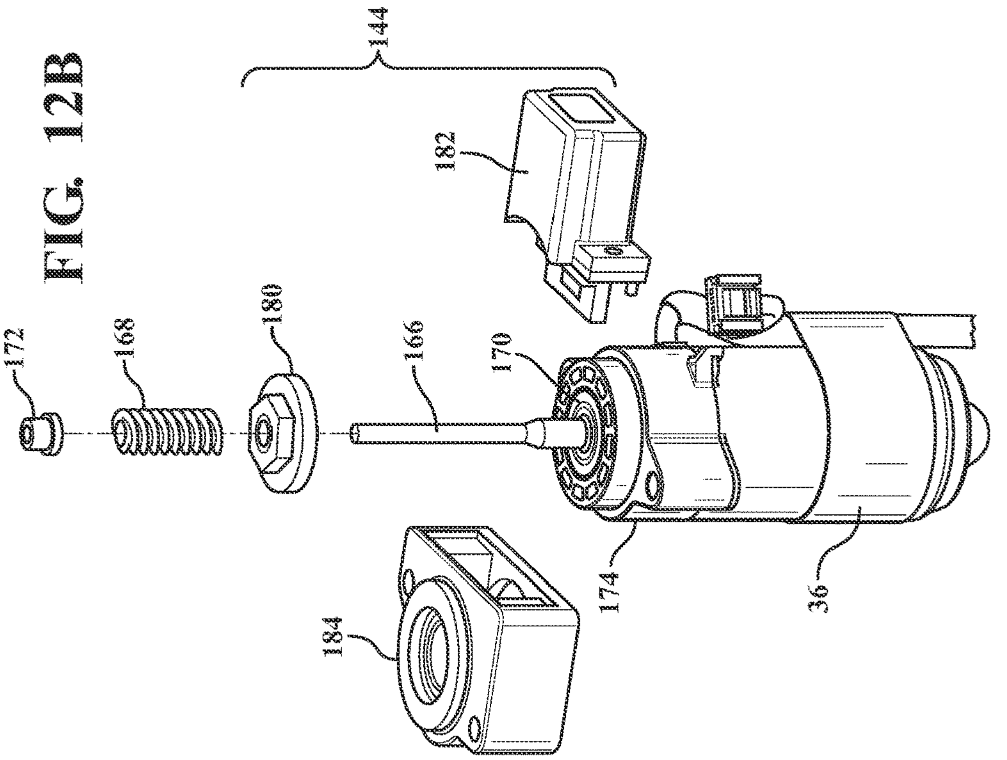
FIG. 12B illustrates an exploded view of components within the first powered actuator according to aspects of the disclosure.
Figure 12A:
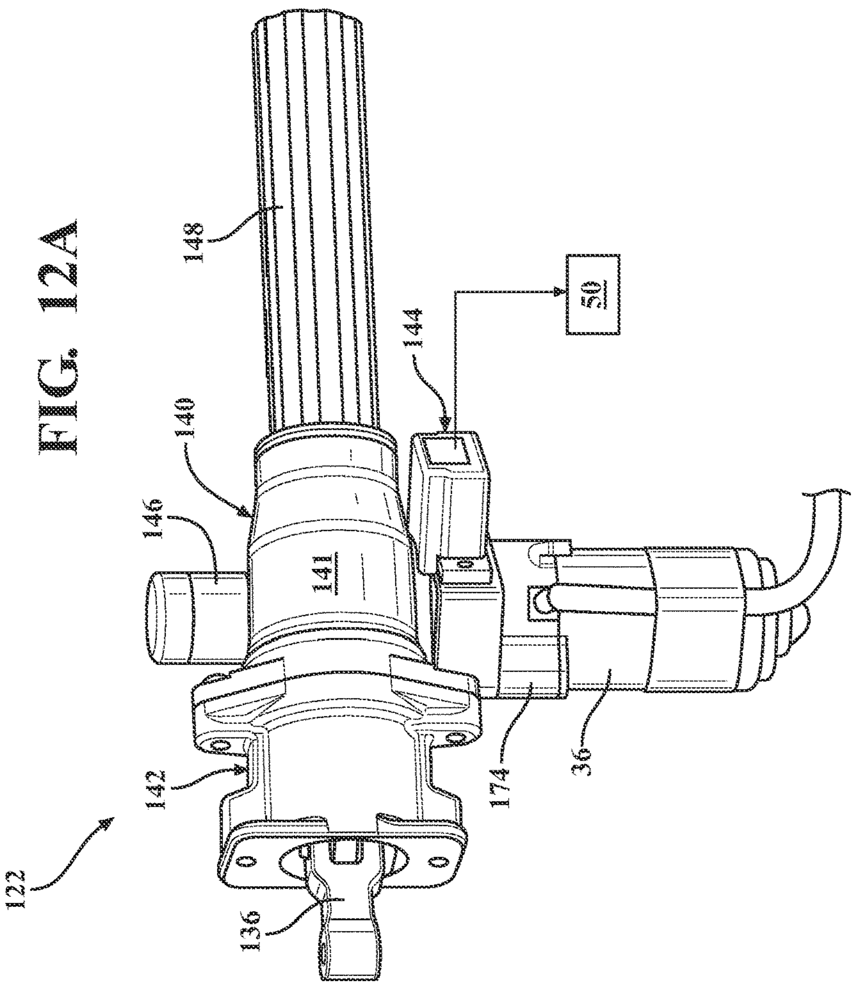
FIG. 12A illustrates the first powered actuator according to aspects of the disclosure.

FIGS. 12A-12B illustrate the first powered actuator 122 according to aspects of the disclosure. Specifically, FIG. 12B shows the electric motor 36 configured to rotate a driven shaft 166 for turning a worm gear 168. The driven shaft 166 is supported by a proximal bearing 170 and a distal bearing 172. The proximal bearing 170 is supported within a motor bracket 174 that is attached to an axial end of the electric motor 36. The proximal bearing 170 is shown as a ball bearing and the distal bearing 172 is shown as a plain bearing or a bushing. However, either of the bearings 170, 172 may be a different type of bearing, such as a plain bearing, a ball bearing, a roller bearing, or a needle bearing. FIG. 12B also shows internal components of the high-resolution position sensor 144, including a magnet wheel 180 that is coupled to rotate with the driven shaft 166 and which includes a plurality of permanent magnets. The magnet wheel 180 shown in FIG. 12B has six permanent magnets, but the magnet wheel 180 may include any number of magnets. The high-resolution position sensor 144 also includes a Hall-effect sensor 182 configured to detect a movement of the permanent magnets in the magnet wheel 180 thereby and to generate an electrical signal in response to rotary movement of the magnet wheel 180. The high-resolution position sensor 144 also includes a sensor housing 184 enclosing the magnet wheel 180 and all or part of the Hall-effect sensor 182.

Figure 13B:
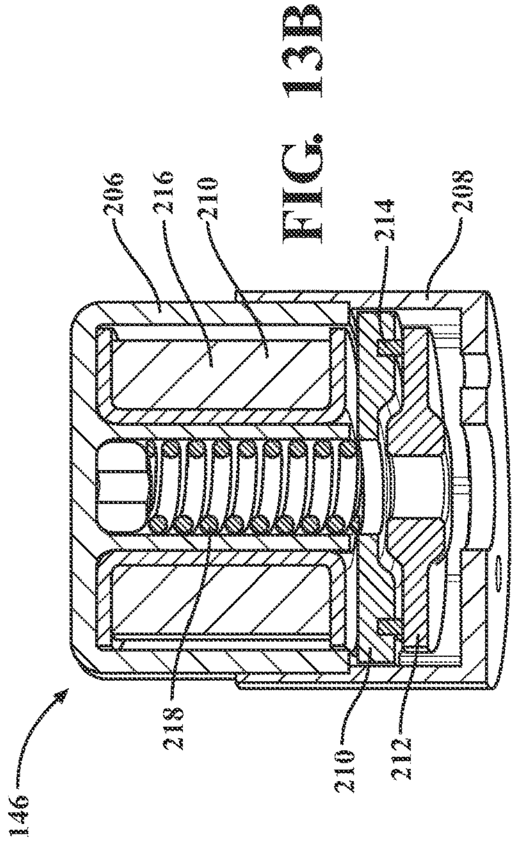
FIG. 13B illustrates cut-away view of an EM brake of the powered actuator according to aspects of the disclosure.
Figure 13A:
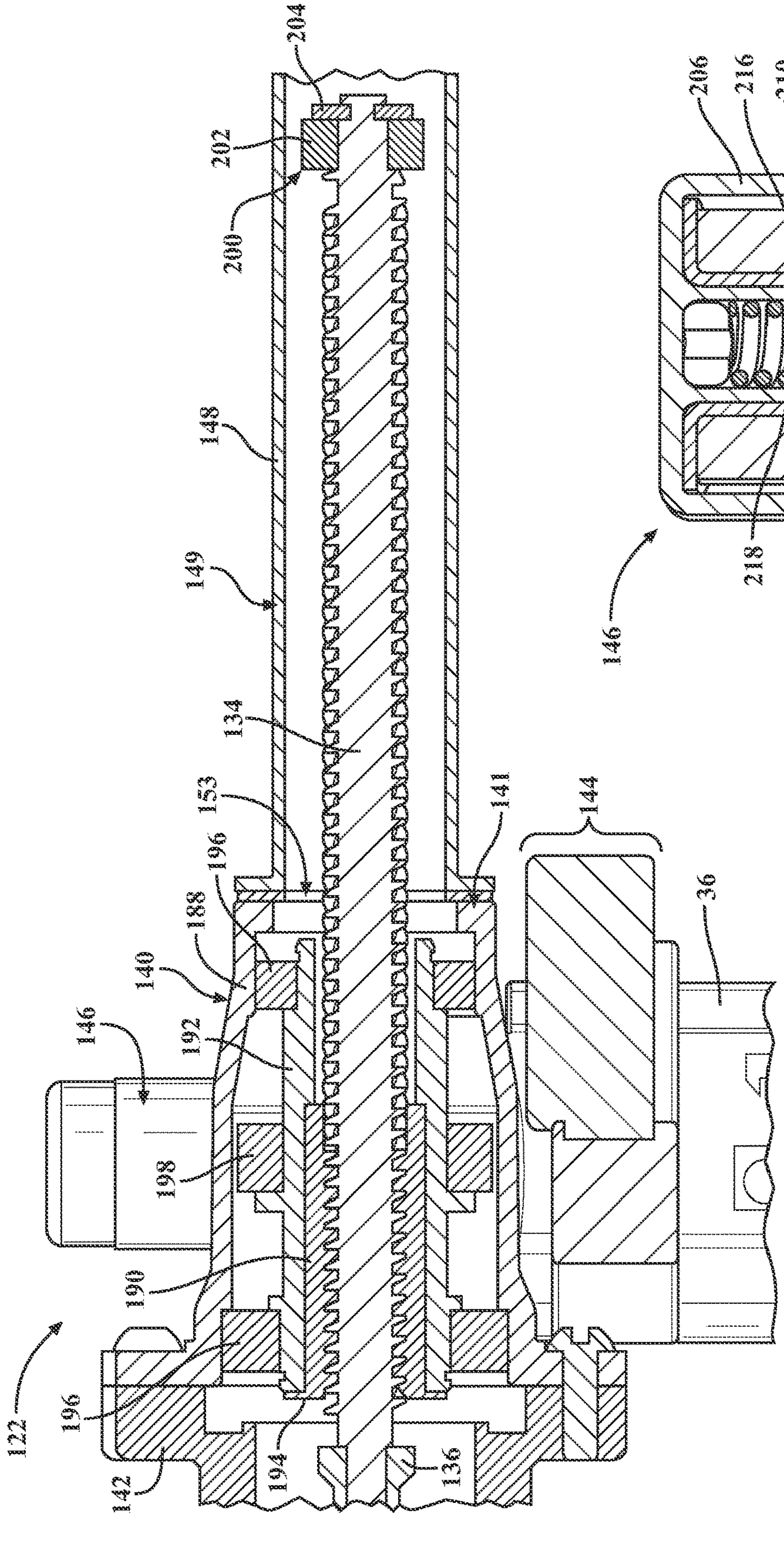
FIG. 13A illustrates a partial cut-away view of the first powered actuator according to aspects of the disclosure.

FIG. 13A illustrates a partial cut-away view of the first powered actuator 122 according to aspects of the disclosure. FIG. 13A shows the general arrangement of the gearbox 140, including a gearbox housing 141 extending between the adapter 142 and the cover 148 and between the electric motor 36 and the EM brake 146, with the electric motor 36 and the EM brake 146 being aligned with one another and disposed perpendicular to the extensible member 134.

FIG. 13A also shows the internal details of the gearbox 140, including a lead nut 190 disposed around in threaded engagement with the extensible member 134 that is formed as a leadscrew. The leadscrew and lead nut configuration shown in FIG. 13A may provide a relatively low amount of backlash, thereby improving correlation between the detected position by the high-resolution position sensor 144 and the actual position of the closure. Such high precision detection may improve servo control of the powered actuator 22, 122. For example, the high-resolution sensor 144 signal may be configured to output at least 41 Hall counts per motor revolution for use by the servo control system, for example as shown in the table below illustrating a 5000 minimum Hall count for a 100 mm leadscrew travel:

| Min Counts | Avg Travel (mm) | Lead (mm) | # of Turns | Counts/ turn | Gear Ratio | Counts/ Motor Rev |
|---|---|---|---|---|---|---|
| 5000 | 100 | 18 | 5.56 | 900 | 22 | 41 |

The high-resolution sensor 144 signal may be configured to output other Hall counts per motor revolution for use by the servo control system. For example, the Hall count output may be greater than 2 Hall counts per motor revolution.

The lead nut 190 is fixed within a torque tube 192 having a tubular shape. Specifically the lead nut 190 includes a flanged end 194 that protrudes radially outwardly and engages an axial end of the torque tube 192 at an end of the torque tube 192 adjacent to the adapter 142. The torque tube 192 is held within the gearbox housing 188 by a pair of tube supports 196, with each of the tube supports 196 disposed around the torque tube 192 at or near a corresponding axial end thereof. One or both of the tube supports 196 may include a bearing, such as a ball bearing or a roller bearing. A worm wheel gear 198 is disposed around the torque tube 192 between the tube supports 196 and is fixed to rotate with the torque tube 192. The worm wheel gear 198 is in meshing engagement with the worm gear 168 (shown on FIG. 12B), thus causing the torque tube 192 and the lead nut 190 to be rotated in response to the electric motor 36 driving the worm gear 168.

The first powered actuator 122 shown in FIG. 13A also includes a travel limiter 200 disposed on an axial end of the extensible member 134 opposite (i.e. farthest away from) the linkage 136. The travel limiter 200 is configured to engage a part of the gearbox 140, such as the torque tube 192, for limiting axial extension of the extensible member 134. Specifically, the travel limiter 200 includes a bumper 202 of resilient material, such as rubber, having a tubular shape extending around the extensible member 134 adjacent the axial end thereof. A retainer clip 204 holds the bumper 202 in place on the axial end of the extensible member 134. The retainer clip 204 may include any suitable hardware including, for example, a washer, a nut, a cotter pin, an E-Clip, or a C-clip such as a snap ring.

FIG. 13B illustrates cut-away view of the EM brake 146 of the powered actuator according to aspects of the disclosure. The EM brake 146 is coupled to the driven shaft 166 and configured to apply a braking force to oppose rotation of the driven shaft 166. Specifically, the EM brake 146 includes a cup-shaped inner housing 206 at least partially disposed within a cup-shaped outer housing 208. An armature plate 210 is fixed to rotate with the driven shaft 166, and a fixed plate 212 is fixed to the outer housing 208 and prevented from rotating. An annular band 214 of friction material is fixed to the armature plate 210 adjacent to the fixed plate 212. The EM brake 146 includes a solenoid coil 216 disposed within the inner housing 206 and configured to be energized by an electrical current for causing the armature plate 210 to move away from the fixed plate 212. A coil spring 218 extends through a central bore of the inner housing 206 and biases the armature plate 210 toward the fixed plate 212. A detailed description of the EM brake 146 and its operation are provided in applicant's U.S. Pat. No. 10,280,674, which is hereby incorporated by reference in its entirety.

Figure 14:
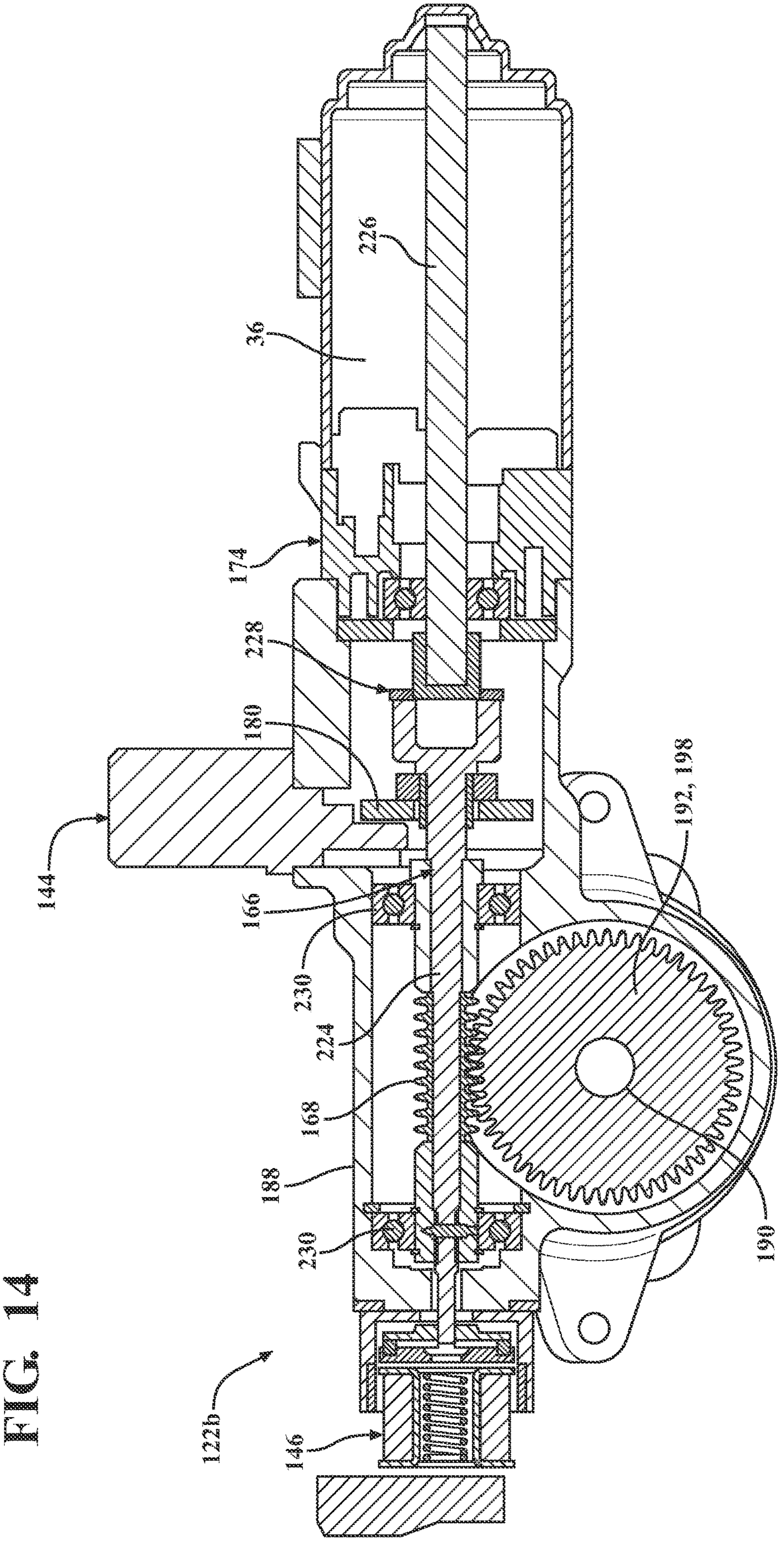
FIG. 14 illustrates a cut-away view of a third powered actuator according to aspects of the disclosure.

FIG. 14 illustrates a cut-away view of a third powered actuator 122*b* according to aspects of the disclosure. Specifically, the plane of the cut-away view shown in FIG. 14 extends through the driven shaft and a plane of the worm wheel 198. As shown in FIG. 14, the driven shaft 166 comprises a gearbox input shaft 224 that is coupled to a motor shaft 226 of the electric motor 36 via a coupling 228. The coupling 228 may be a fixed coupling, such as a splined connection, causing the gearbox input shaft 224 to rotate with the motor shaft 226. In some embodiments, the coupling 228 may be a flex coupling, allowing some degree of relative rotation between the gearbox input shaft 224 and the motor shaft 226. In some embodiments, the coupling 228 may include a clutch for selectively fixing the gearbox input shaft 224 to rotate with the motor shaft 226. A set of input bearings 230 holds the gearbox input shaft 224 on either side of the worm gear 168. Either or both of the input bearings 230 may be any type of bearing, such as a ball bearing, a roller bearing, etc.

In some embodiments, and as shown in FIG. 14, the torque tube 192 and the worm wheel 198 are formed as an integrated unit, with gear teeth formed on an outer perimeter, and with the lead nut 190 formed on an inner bore. In some embodiments, the torque tube 192 and the worm wheel 198 are formed as an integrated unit, and the lead nut 190 is a separate piece that is fixed to rotate therewith.

The third powered actuator 122*b* shown in FIG. 14 includes the EM brake 146 spaced away from the high-resolution position sensor 144, with the gearbox 140 disposed therebetween.

Figure 15:
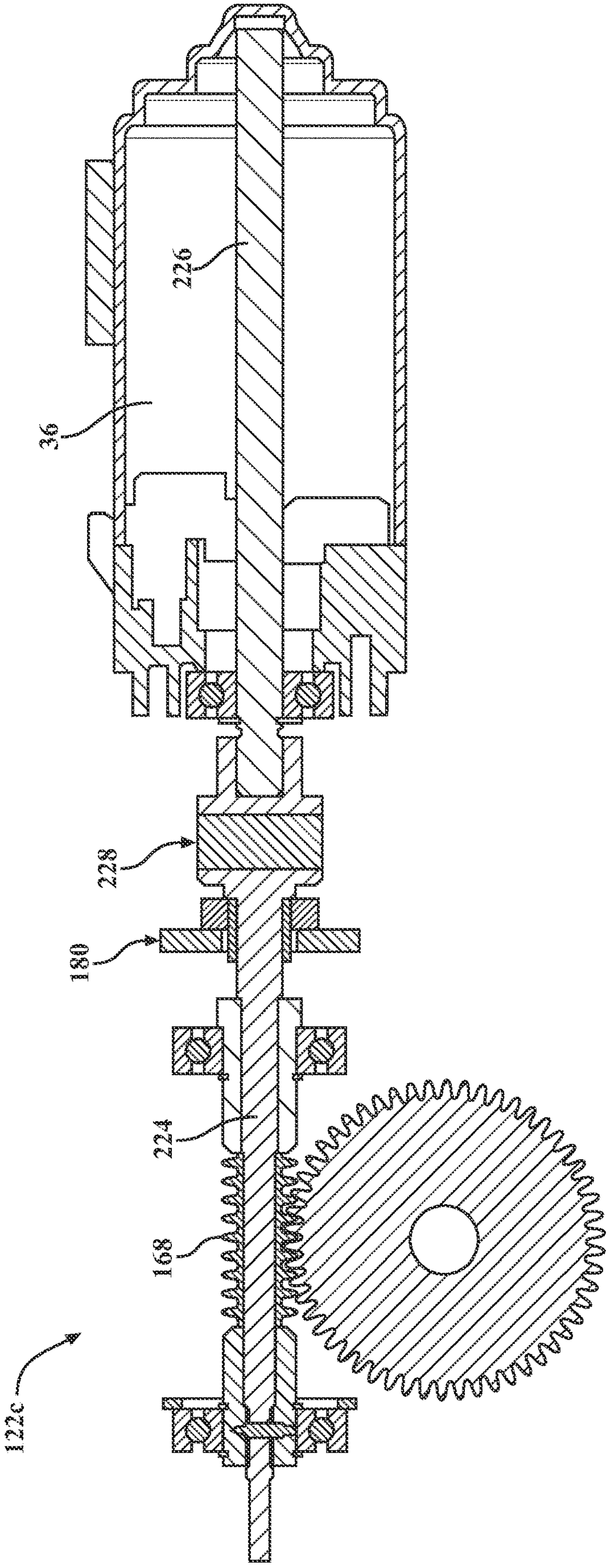
FIG. 15 illustrates a cut-away view of a fourth powered actuator according to aspects of the disclosure.

FIG. 15 illustrates a cut-away view of a fourth powered actuator 122*c* according to aspects of the disclosure. Specifically, the fourth powered actuator 122*c* is similar to the third powered actuator 122*b* shown in FIG. 14, in which the coupling 228 includes a clutch for selectively fixing the gearbox input shaft 224 to rotate with the motor shaft 226. In this case, the magnet wheel 180 is fixed to rotate with the gearbox input shaft 224, thus providing an indication of the extensible member 134 and the vehicle door coupled thereto. In all configurations of the powered actuator 122 described herein, the power actuator 122 may be configured without a clutch, having a permanent coupling between the motor 26 and the extensible member 134 connection with the vehicle body 14.

Figure 16A:
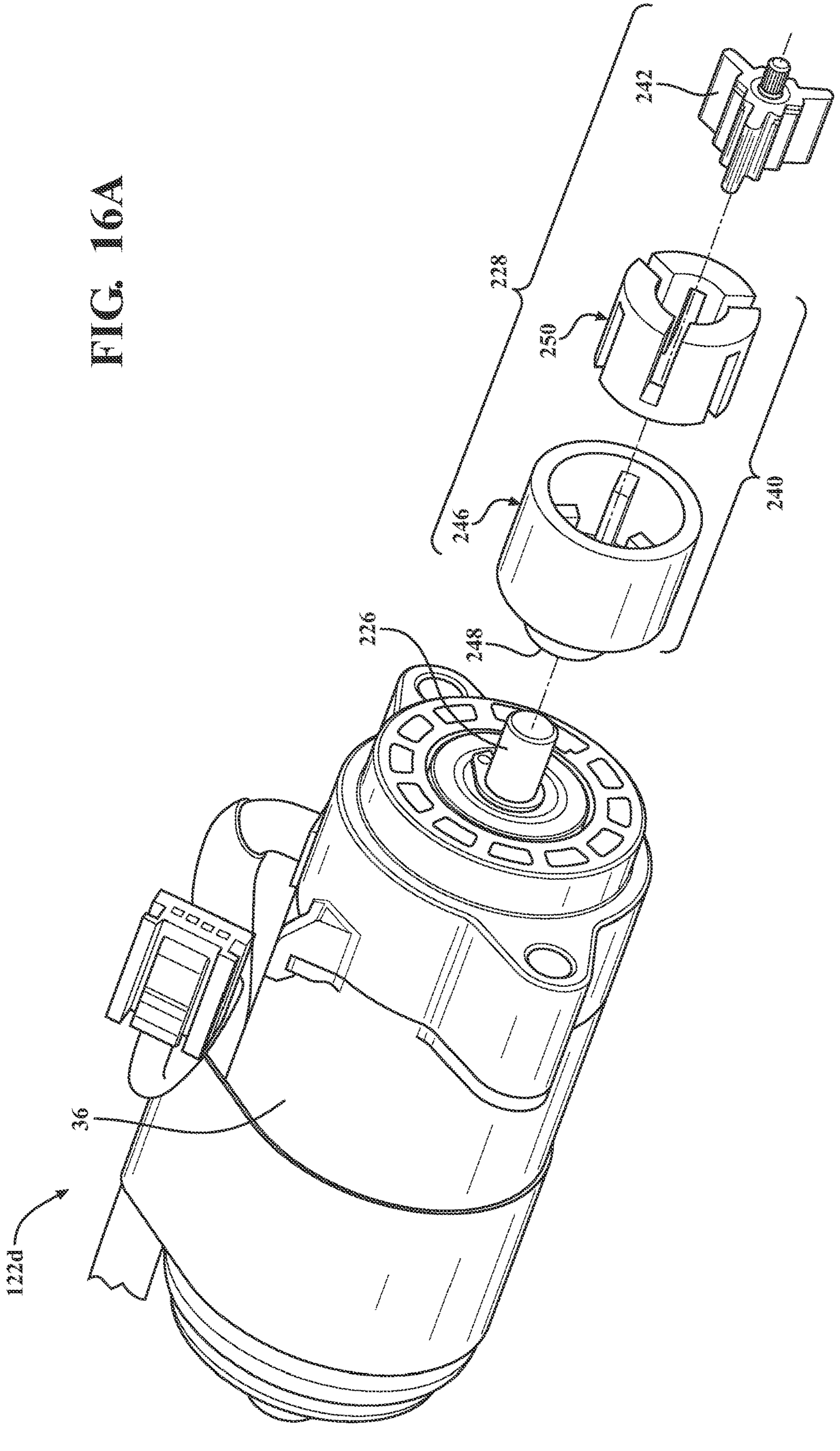
FIG. 16A illustrates an exploded perspective view of a motor and coupling of a fifth powered actuator according to aspects of the disclosure.
Figures 16B, 16C:
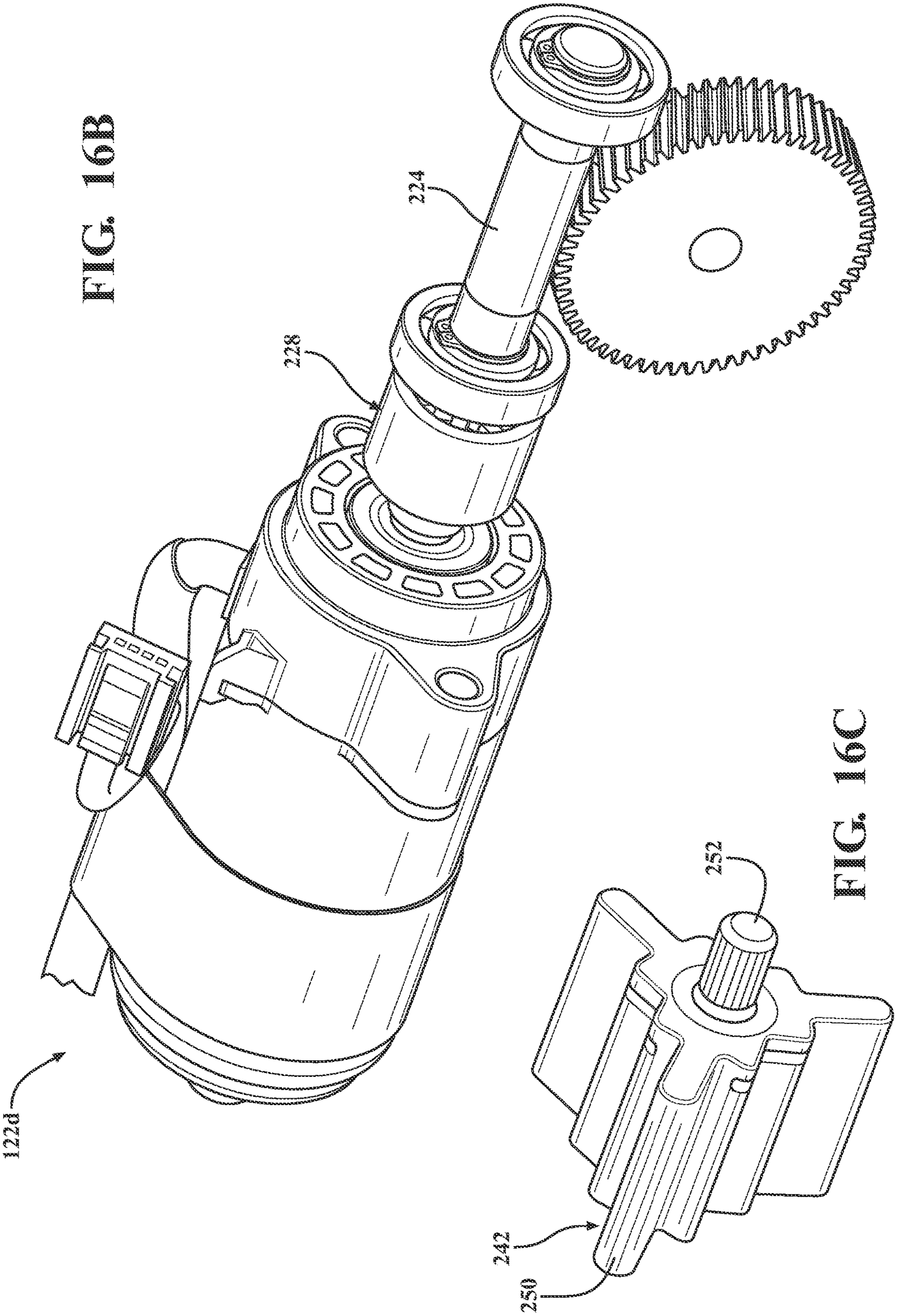
FIG. 16B illustrates a perspective view of the motor and a partial drive assembly within the fifth powered actuator according to aspects of the disclosure.
FIG. 16C illustrates a slip device of the coupling of the fifth powered actuator according to aspects of the disclosure.

FIGS. 16A-16B show an electric motor 36 and coupling 228 of a fifth powered actuator 122*d* according to aspects of the disclosure. Specifically, FIG. 16A shows an exploded view of the coupling 228 which includes a flex coupling 240 and a slip device 242. The flex coupling 240 couples the motor shaft 226 of the electric motor 36 to the slip device 242 and allows some limited rotation therebetween. The flex coupling 240 may, for example, transmit driving torque from the motor shaft 226 to the slip device 242 while limiting the transmission of vibration therebetween. The flex coupling 240 shown in FIG. 16A includes an input member 246 having a cup-shape extending from a base 248 that is configured to rotate with the motor shaft 226. The base 248 may be keyed or splined or otherwise fixed to rotate with the motor shaft 226. The input member 246 is configured to turn the slip device 242, with an output member 250 of resilient material, such as rubber, disposed between the input member 246 and the slip device 242 for allowing some degree of rotation therebetween. As shown in FIG. 16C, the slip device 242 includes a triangular body 250 surrounding a shaft stub 252 that is splined and coupled to turn the gearbox input shaft 224. The slip device 242 is configured to provide some slip, or relative rotation between the input member 246 and the gearbox input shaft 224 if a torque therebetween exceeds a predetermined value.

Figure 17:
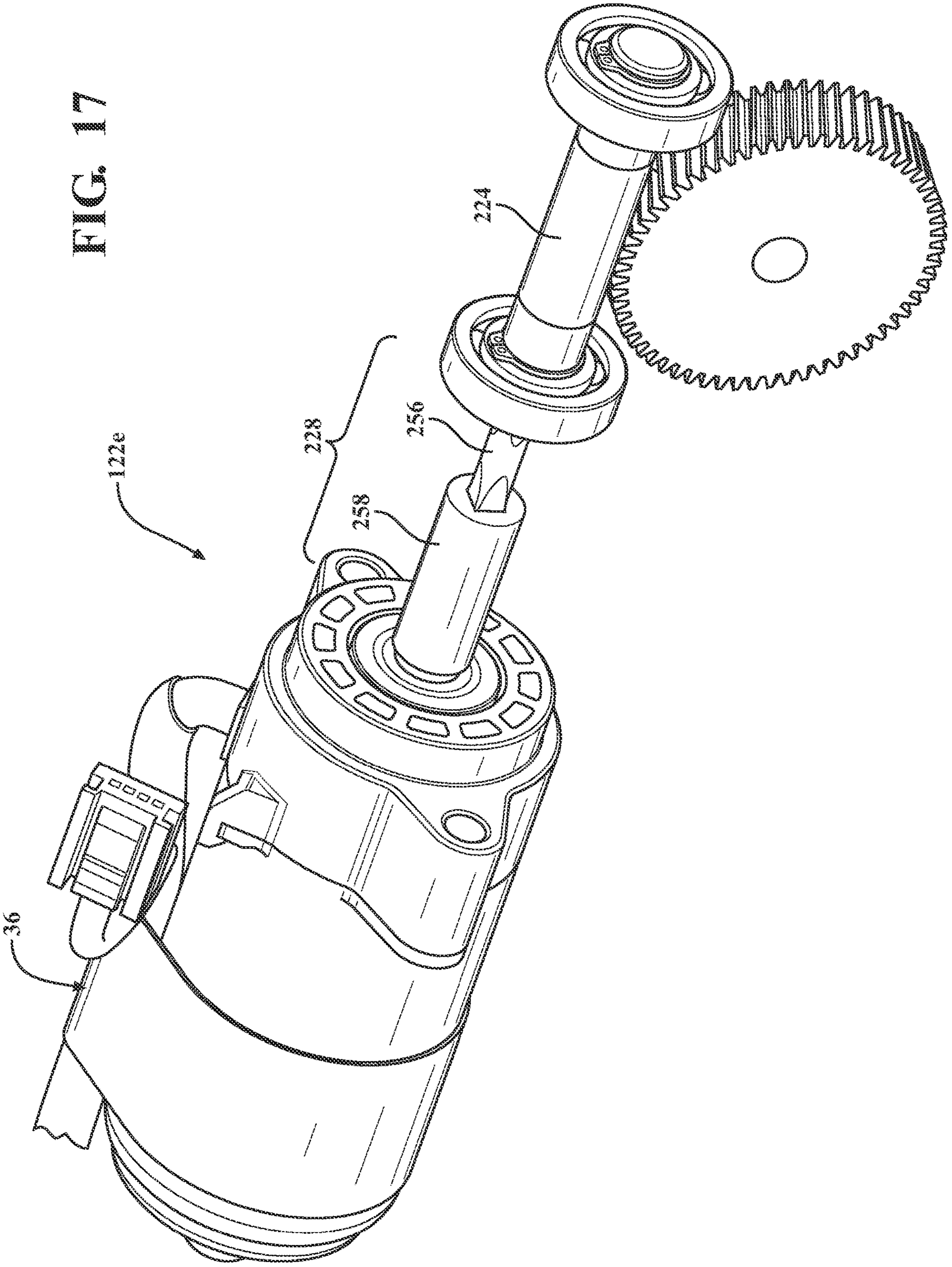
FIG. 17 illustrates a perspective view of a motor and a partial drive assembly within a sixth powered actuator according to aspects of the disclosure.

FIG. 17 shows an electric motor 36 and coupling 228 of a sixth powered actuator 122*e* according to aspects of the disclosure. Specifically, the coupling 228 shown in FIG. 17 includes a flex shaft 256 that is configured to twist by a predetermined amount in response to application of torque between two opposite ends thereof. One end of the flex shaft 256 is coupled to the gearbox input shaft 224, and the other end of the flex shaft 256 is coupled to the motor shaft 226 of the electric motor 36 via a shaft adapter 258. The shaft adapter 258 may be keyed or splined or otherwise fixed to rotate with the motor shaft 226. Thus, the flex shaft 256 provides for rotational flex between the motor shaft 226 and the gearbox input shaft 224.

Figure 18:
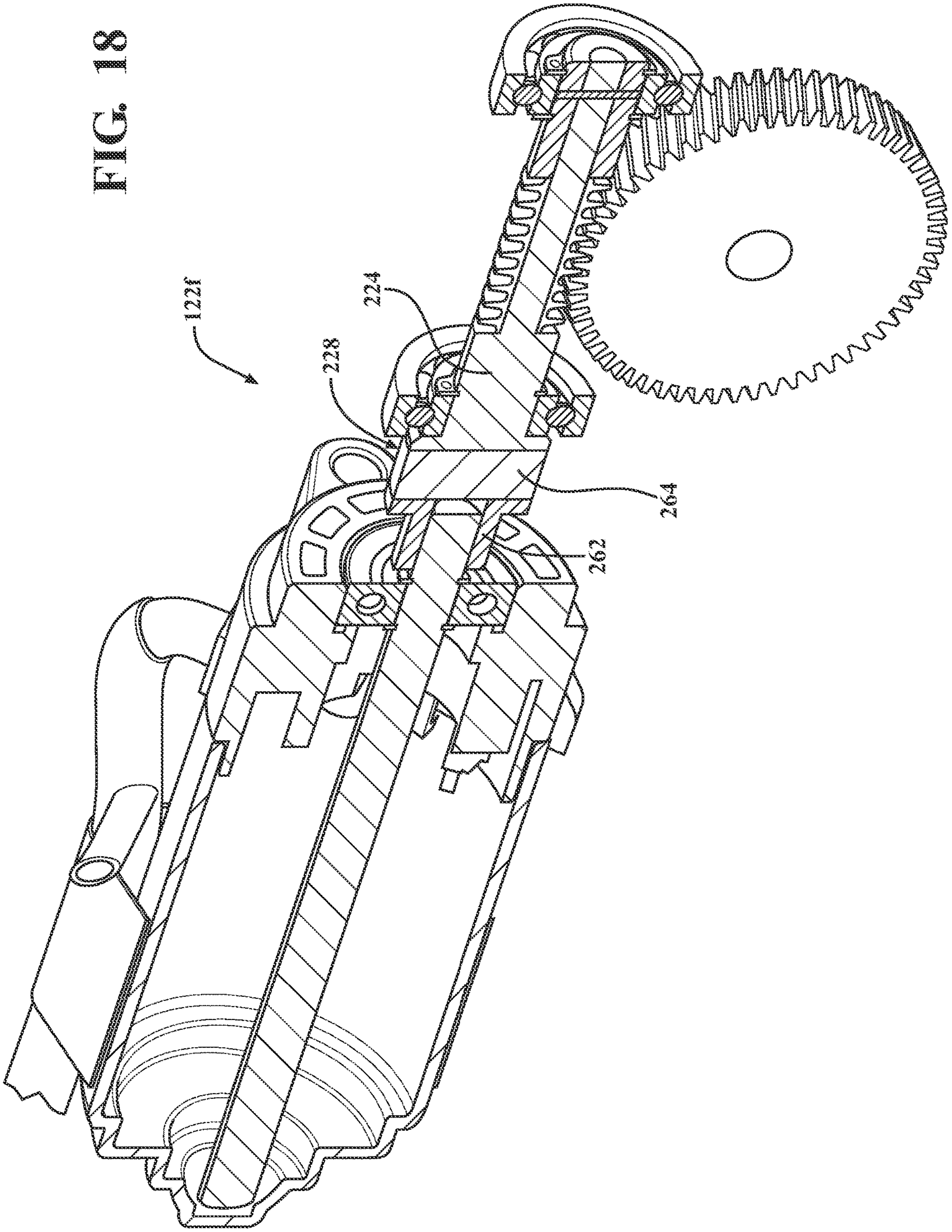
FIG. 18 illustrates a cut-away perspective view of a motor and a partial drive assembly within a seventh powered actuator according to aspects of the disclosure.

FIG. 18 shows an electric motor 36 and coupling 228 of a seventh powered actuator 122*f* according to aspects of the disclosure. Specifically, the coupling 228 shown in FIG. 18 is a flex coupling, which may be a high-speed flex coupling, which may be available off the shelf. The coupling 228 includes an input adapter 262 that is coupled to the motor shaft 226 of the electric motor 36. The input adapter 262 may be keyed or splined or otherwise fixed to rotate with the motor shaft 226. The coupling 228 also includes a resilient layer 264 of a resilient material, such as rubber, which is fixed to rotate with the input adapter 262 and which is also fixed to turn the gearbox input shaft 224. The coupling 228, thus functions as a flex coupling, allowing some limited relative rotation, less than one rotation, between the motor shaft 226 the gearbox input shaft 224. The seventh powered actuator 122*f* does not include any slip device and does not provide for any relative rotation between the motor shaft 226 the gearbox input shaft 224 beyond what is provided by the resilient layer 264 of the coupling 228.

Figure 19:
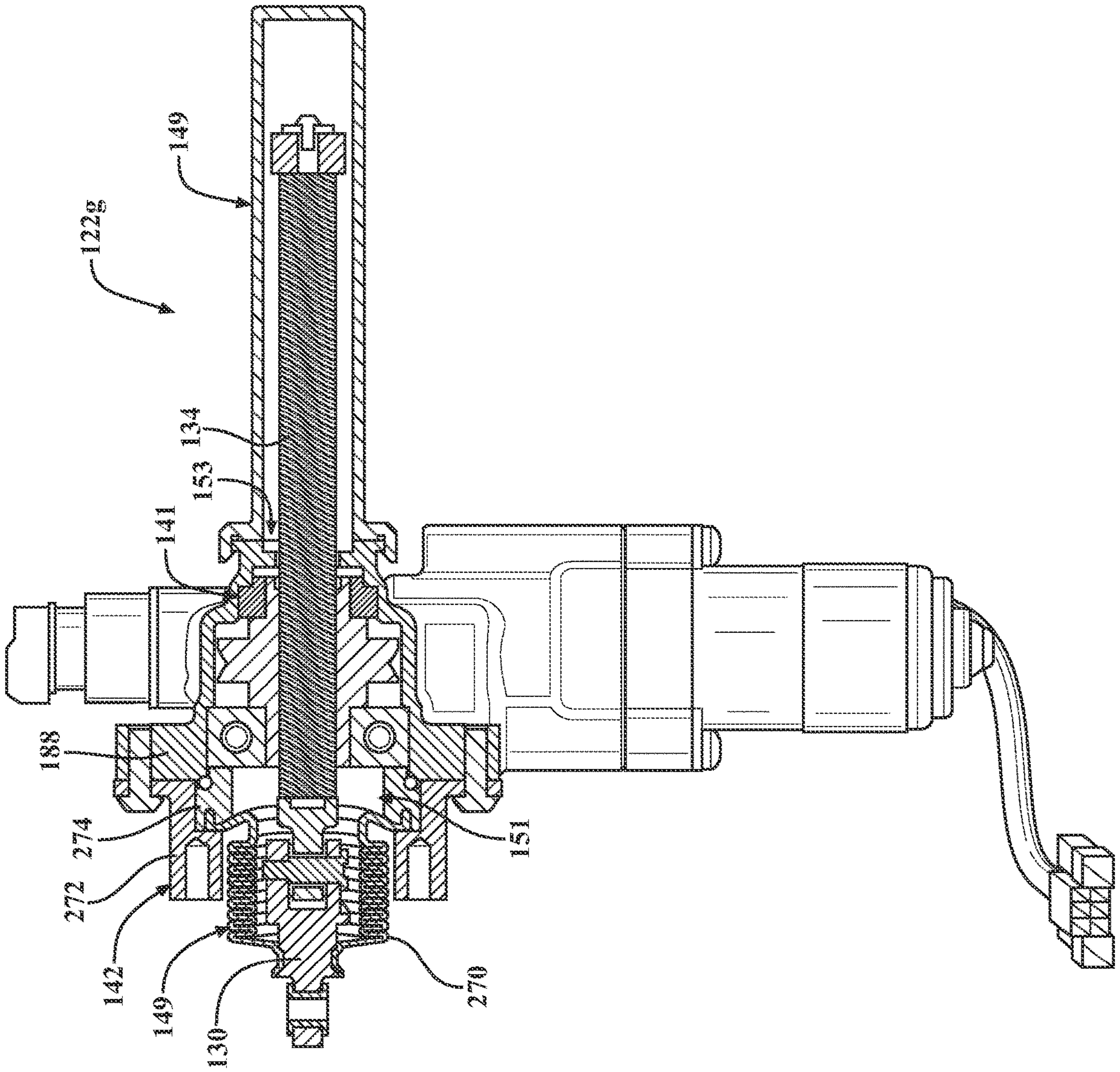
FIG. 19 illustrates a cut-away perspective view of an eighth powered actuator according to aspects of the disclosure.

FIG. 19 shows an eighth powered actuator 122*g* according to aspects of the disclosure. The eighth powered actuator 122*g* may be similar or identical to other powered actuators disclosed herein, but with some additional protective equipment. Specifically, a boot 270 is configured to cover the extensible member 134 and to move with the extensible member 134 as it extends out of the adapter 142. The boot 270 may have a tubular and ribbed construction, similar to a covering of a shock absorber, to prevent contaminants from contacting the extensible member 134. The boot 270 may also prevent wires or other items from being caught in the extensible member 134 as it extends or retracts from the adapter 142. One end of the boot 270 (for example an outer end) is fixed to the link bar 130, and the other end of the boot 270 (for example an inner end) is fixed to the adapter 142. In some embodiments, and as shown in FIG. 19, the adapter 142 is a two-piece design, including an outer member 272 receiving and surrounding an inner member 274, with the boot 270 (in particular the inner end) sandwiched therebetween. As the extensible member 134 extends outward from the adapter 142, the boot 270 will lengthen and extend away from the adapter 142. The inner and outer members 272, 274 may be held together by the screws or bolts that hold the adapter 142 to the gearbox housing 188.

Figure 20:
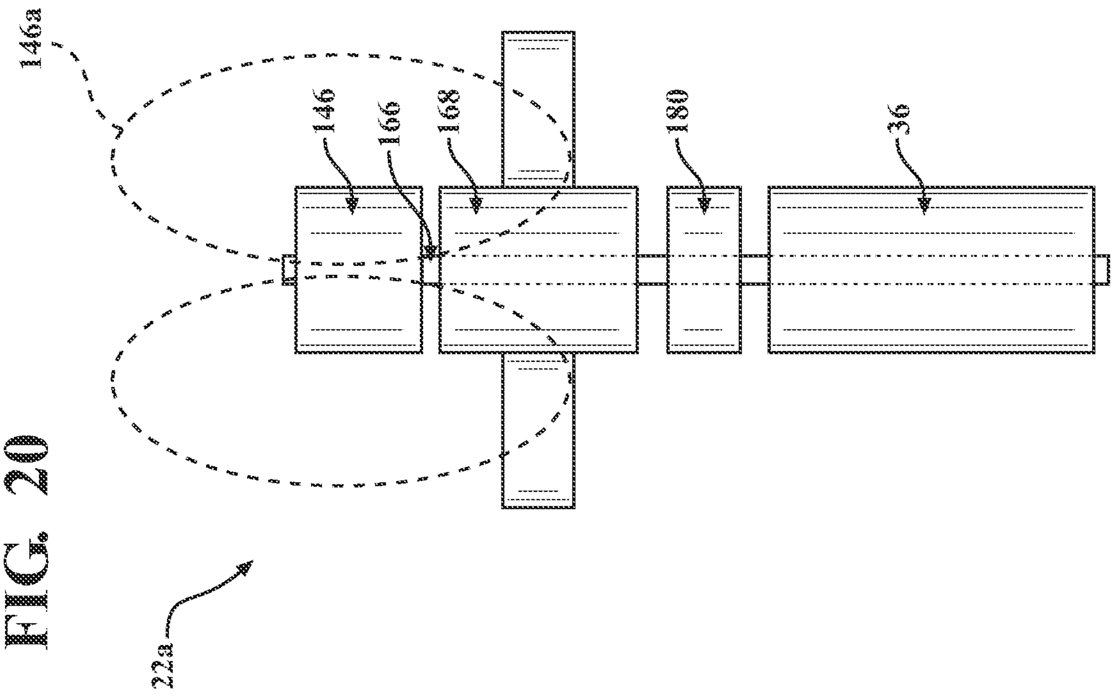
FIG. 20 illustrates a schematic diagram of components within a powered actuator in a first configuration according to aspects of the disclosure.

FIG. 20 illustrates a schematic block diagram of components within a powered actuator having a first configuration 22*a* according to aspects of the disclosure. Specifically, FIG. 20 shows the magnet wheel 180 being spaced apart from the EM brake 146 by a direct drive coupling (e.g. the worm gear 168), thus reducing or eliminating electromagnetic interference (i.e. the EM Brake Field 146*a*) from interfering with the high-resolution position sensor. More specifically, the first configuration 22*a* includes the EM brake 146, the direct drive coupling (168), the magnet wheel 180, and the electric motor 36 are all disposed along the driven shaft 166 in that given order.

Figure 21:
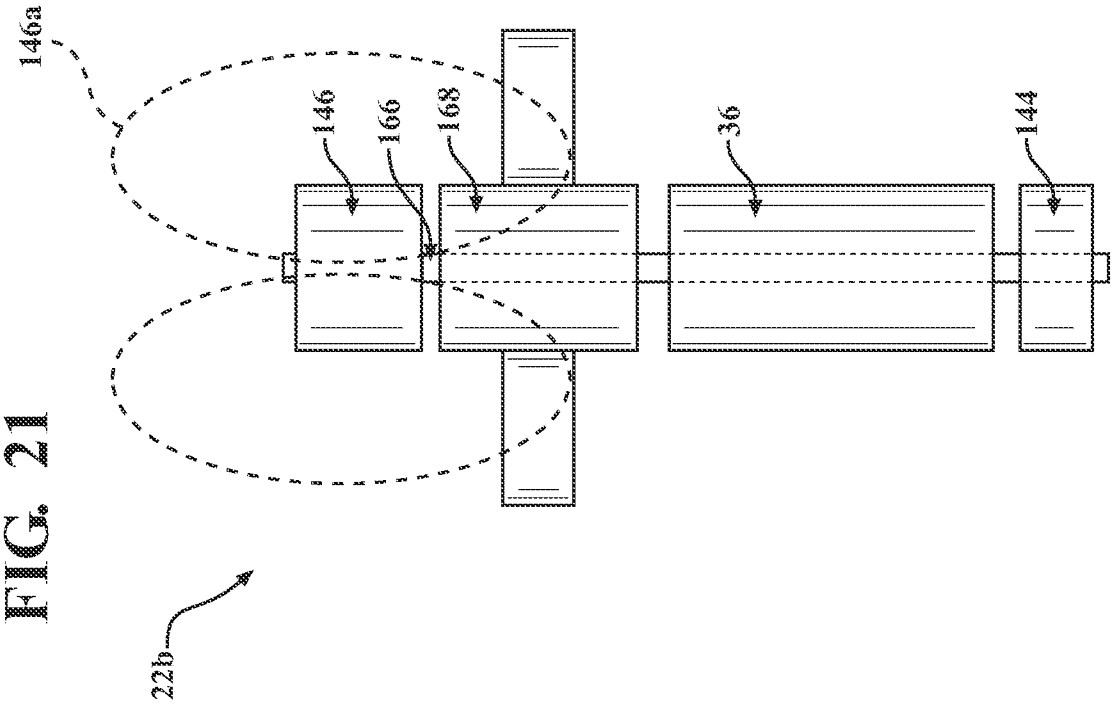
FIG. 21 illustrates a schematic diagram of components within a powered actuator in a second configuration according to aspects of the disclosure.

FIG. 21 illustrates a schematic block diagram of components within a powered actuator having a second configuration 22*b* according to aspects of the disclosure. Specifically, FIG. 21 shows the magnet wheel 180 being spaced apart from the EM brake 146 by the electric motor 36 and the direct drive coupling (e.g. the worm gear 168), thus reducing or eliminating electromagnetic interference from interfering with the high-resolution position sensor. More specifically, the second configuration 22*b* includes the EM brake 146, the direct drive coupling (worm gear 168), the electric motor 36, and the magnet wheel 180 all disposed along the driven shaft 166 in that given order.

In each of the above configurations 22*a* and 22*b*, the magnet wheel 180 is disposed outside of the electromagnetic field of the EM brake 146. In each of the above cases, the worm gear 168 is disposed adjacent the EM brake 146 and overlaps with the magnetic field of the EM brake 146. The worm gear 168 is generally not susceptible to interference caused by the EM brake 146.

Figure 22:
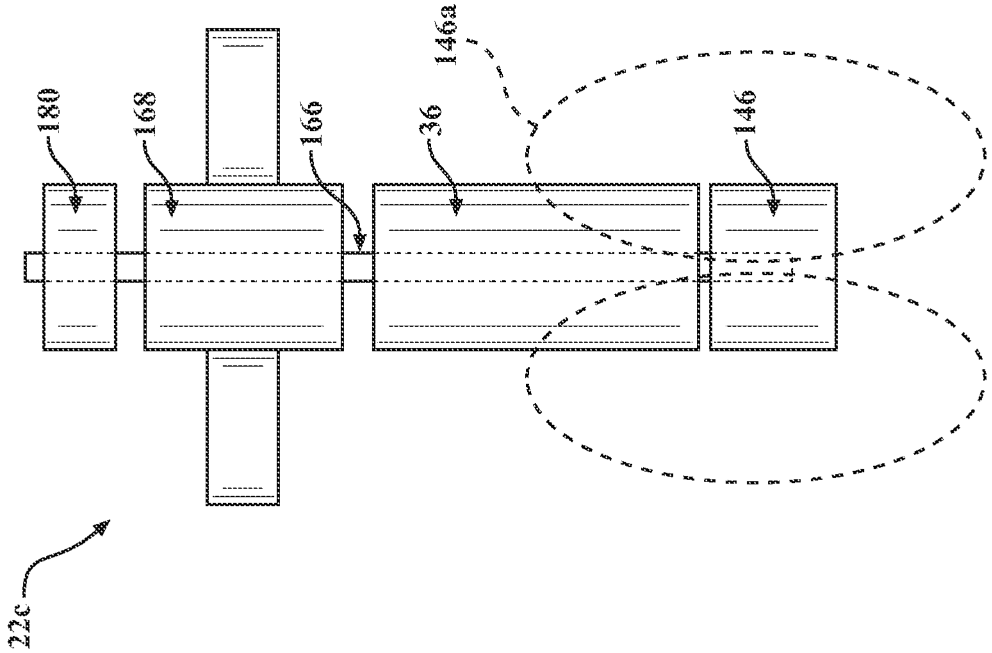
FIG. 22 illustrates a schematic diagram of components within a powered actuator in a third configuration according to aspects of the disclosure.

FIG. 22 illustrates a schematic block diagram of components within a powered actuator having a third configuration 22*c* according to aspects of the disclosure. Specifically, FIG. 22 shows the magnet wheel 180 being spaced apart from the EM brake 146 by the electric motor 36 and the direct drive coupling (e.g. the worm gear 168), thus reducing or eliminating electromagnetic interference from interfering with the high-resolution position sensor. More specifically, the third configuration 22*c* includes the magnet wheel 180, the direct drive coupling (168), the electric motor 36, and the EM brake 146 all disposed along the driven shaft 166 in that given order.

Figure 23:
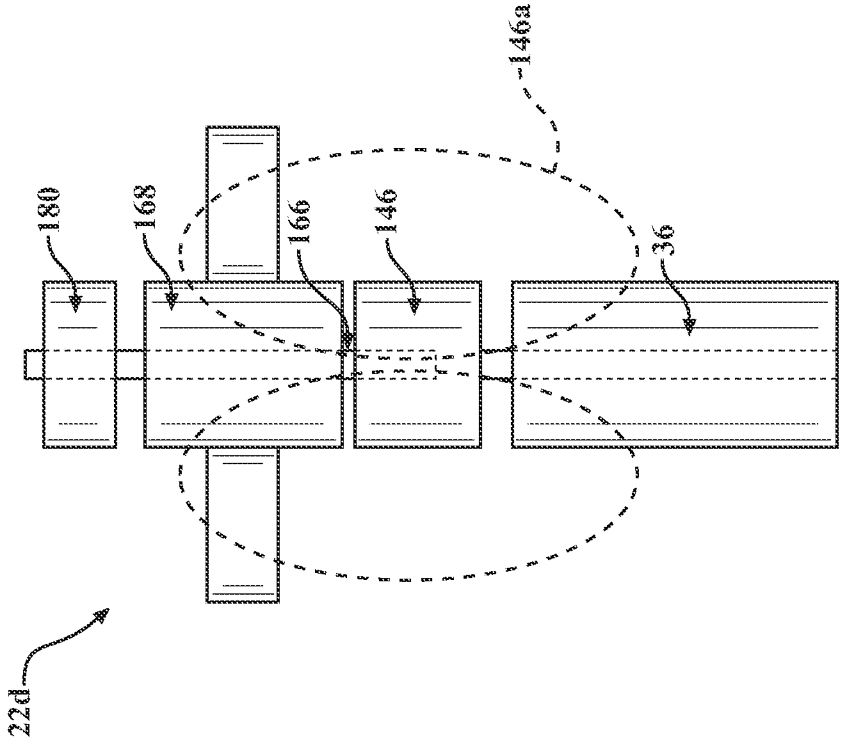
FIG. 23 illustrates a schematic diagram of components within a powered actuator in a fourth configuration according to aspects of the disclosure.

FIG. 23 illustrates a schematic block diagram of components within a powered actuator in a fourth configuration 22*d* according to aspects of the disclosure. Specifically, FIG. 23 shows the magnet wheel 180 being spaced apart from the EM brake 146 by the direct drive coupling (e.g. the worm gear 168), thus reducing or eliminating electromagnetic interference from interfering with the high-resolution position sensor. More specifically, the fourth configuration 22*d* includes the magnet wheel 180, the direct drive coupling (168), the EM brake 146, and the electric motor 36 all disposed along the driven shaft 166 in that given order.

In each of the above configurations 22*c* and 22*d*, the motor 36 is partially disposed within the magnetic field of the EM brake 146. The magnet wheel 180, similar to configurations 22*a* and 22*b*, is disposed outside of the magnetic field of the EM brake 146. In each of configurations 22*c* and 22*d*, the magnet wheel is shown adjacent the worm gear 168, and the EM brake 146 is adjacent the motor 36.

It will be appreciated that the configurations 22*a-d* include a variety of similarities and differences shared among two or more configurations. However, in each configuration, the magnet wheel 180 is positioned relative to the EM brake 146, based on the stackup of components, such that the magnet wheel 180 is outside of the magnetic field of the EM brake 146. The amount of spacing may vary depending on the stackup of components, as shown in FIGS. 20-23.

In another aspect, an electromagnetic shield, in the form of a cover or coating, may be applied between or on the magnet wheel 180 and the EM brake 146 to block the magnetic field of the EM brake 146 and reduce potential interference.

Figure 24:
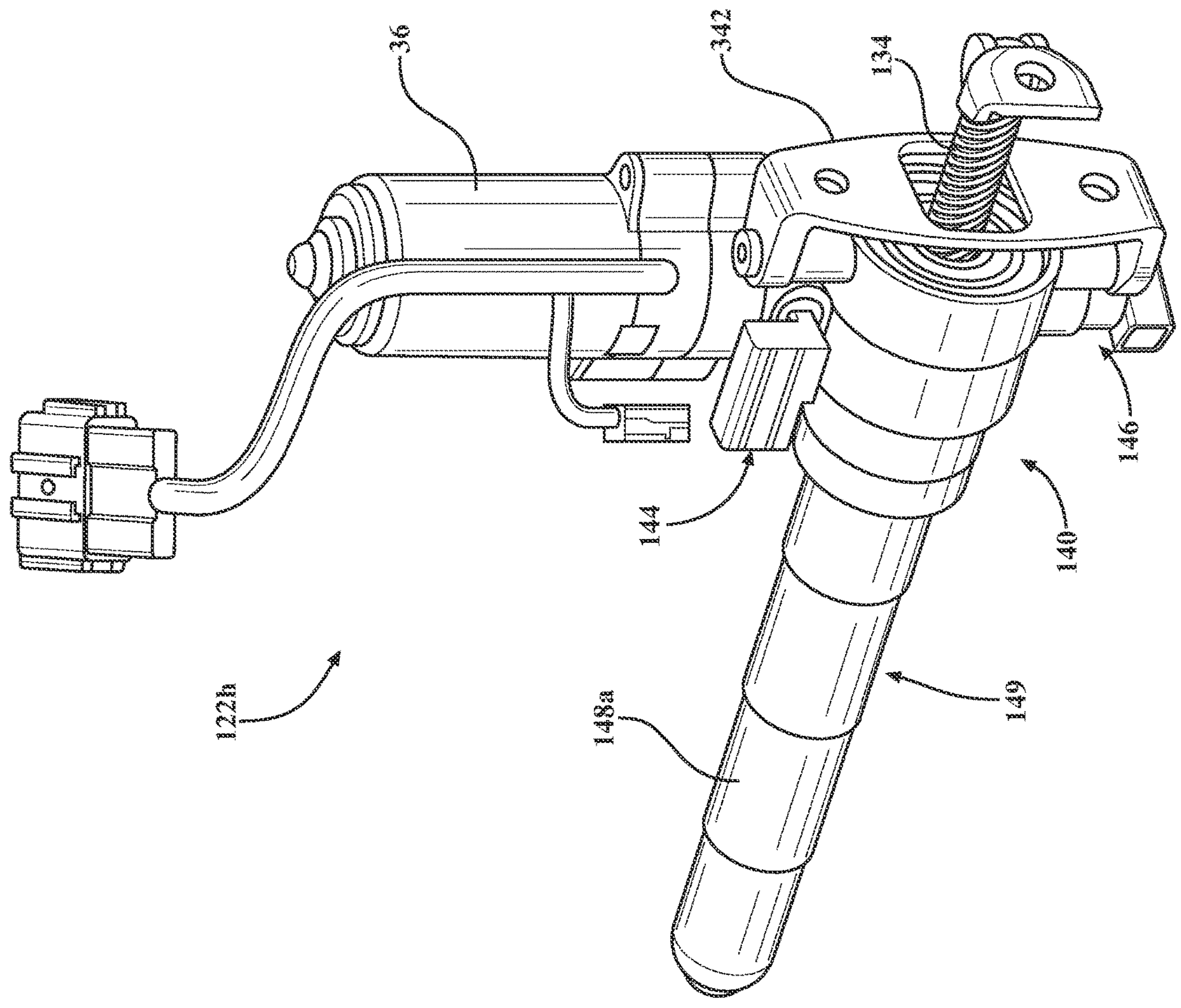
FIG. 24 illustrates a perspective view of a ninth powered actuator according to aspects of the disclosure.
Figure 25A:
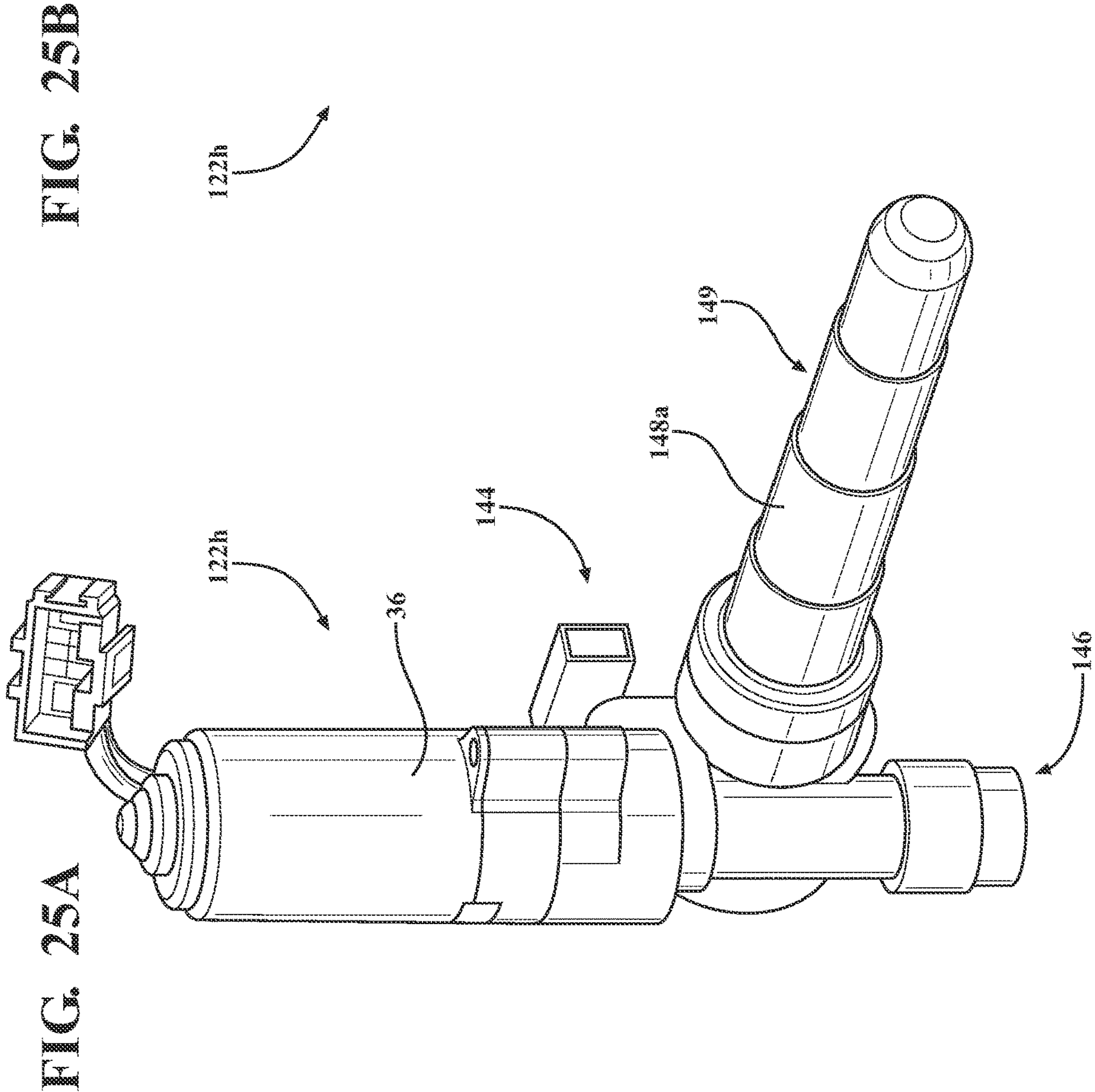
FIG. 25A illustrates a perspective view of the ninth powered actuator with a telescoping boot in an expanded state according to aspects of the disclosure.
Figure 25B:
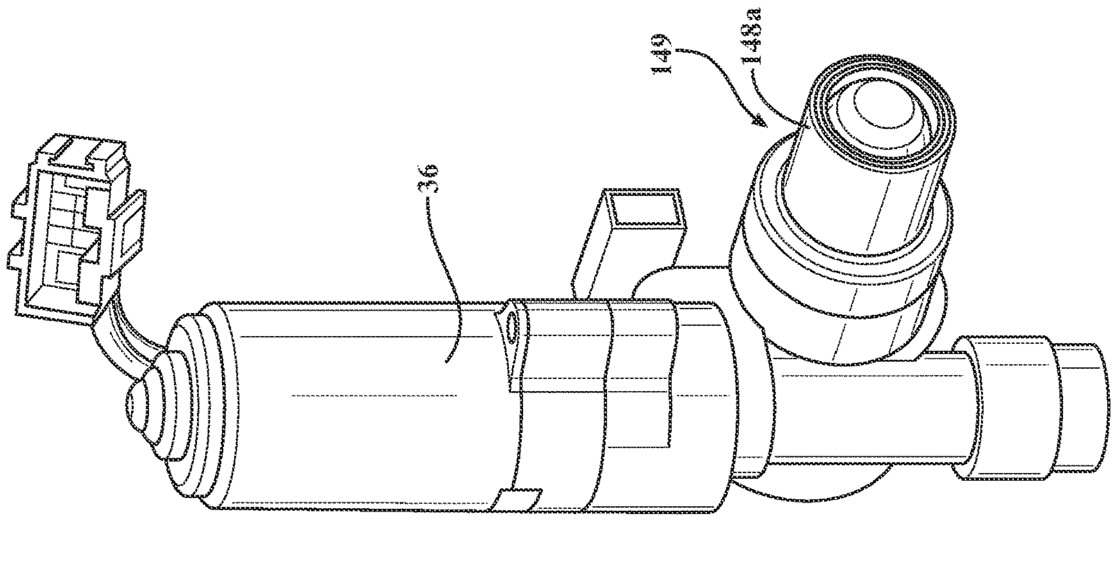
FIG. 25B illustrates a perspective view of the ninth powered actuator with the telescoping boot in a compressed state according to aspects of the disclosure.

FIGS. 24 and 25A-25B illustrate a ninth powered actuator 122*h* according to aspects of the disclosure. Specifically, the ninth powered actuator includes a retractable dust shield 148*a* enclosing the extensible member 134. The retractable dust shield 148*a* has a telescopic design including a plurality of tubular segments configured to move between an expanded state shown in FIG. 25A and a compressed state shown in FIG. 25B. FIG. 24 further illustrates motor 36, high resolution position sensor 144 for haptic control, EM brake 146, gearbox 140, etc.

FIG. 24 generally corresponds to FIG. 25A, wherein the extensible member 134 or leadscrew is in a retracted position in a door closed state, similar to the position shown in FIGS. 19, 12A, and 13A. FIG. 25B illustrates an extended position of the extensible member 134 in a door open state. Thus, the telescoping dust shield 148*a* is compressed retracted when the extensible member 134 is extended, and the dust shield 148*a* is extended when the extensible member is retracted. The overall length of the telescoping dust shield 148*a* changes in response to shifting of the extensible member 134.

FIG. 24 illustrates further aspects of the disclosure. FIG. 24 further illustrates a door adapter bracket 342 configured to allow for easy adaptation to various environments. The bracket 342 is operable to eliminate or substantially reduce moment variations due to a linkage between the vehicle body (or closure body) and the end of the extensible member 134 (for example a leadscrew). This arrangement provides enhanced haptic/servo control response. For example, the moment arm generally does not vary at different door positions. Accordingly, a linkage need not be accommodated, and the actuator 122*h* may be brought closer towards the shut face of the closure 12 (or vehicle body 14), thereby improving assembly requirements and reducing the space occupied within the door cavity (or vehicle body cavity). The motor 36, magnet ring 180, EM brake 145, etc. described above, as well as other components described above, may be used in the actuator 122*h*, similar to the previously described actuators.

Figure 26:
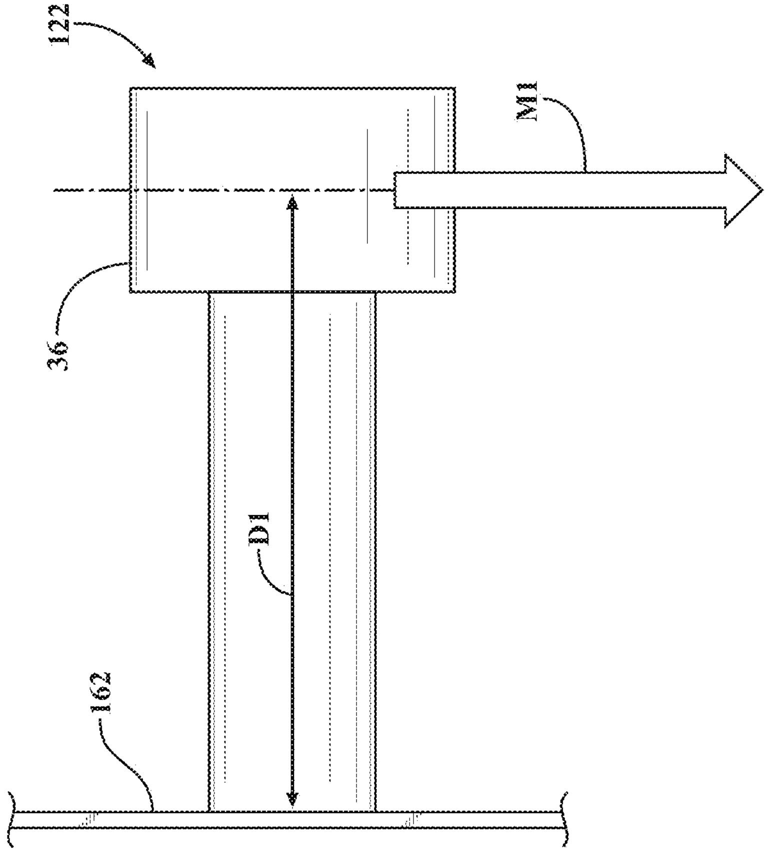
FIG. 26 (Prior Art)
FIG. 26 illustrates a schematic diagram of components within a powered actuator of the prior art.

FIG. 26 illustrates a schematic diagram of components of a powered actuator 122, where the motor 36 is disposed further from the shut face 162 a distance D1, such as for actuators having a linkage. As illustrated in FIG. 26, there is distance D1 between the motor 36 and the shut face 162. Due to the distance, a relatively large amount of loading (M1) may arise on the sheet metal of the shut face 162 due to the weight of the actuator (in particular the center of mass) distal from the mounting point of the actuator 122 to the sheet metal of the shut face 162.

Figure 27:
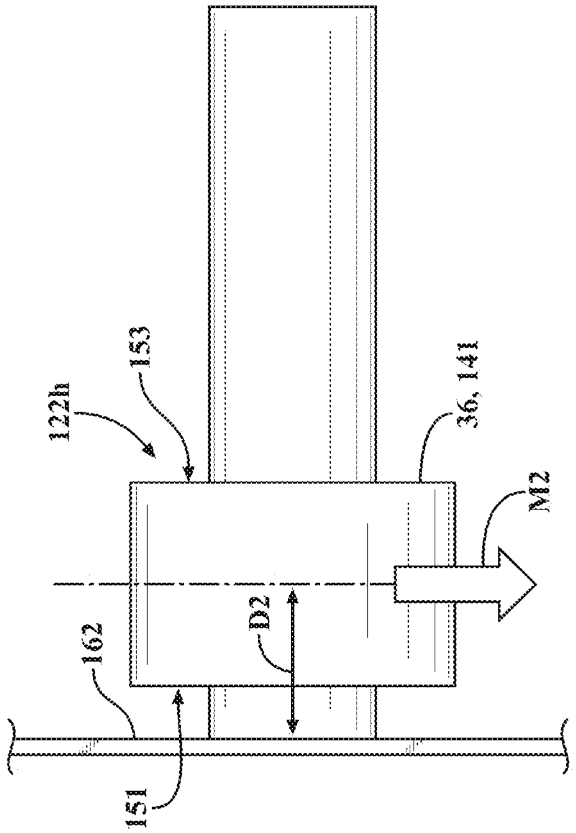
FIG. 27 illustrates a schematic diagram of components within a powered actuator according to aspects of the disclosure.

FIG. 27 illustrates a schematic diagram of components of an improved powered actuator according to aspects of the disclosure, such as actuator 122*h* described above. Specifically, FIG. 27 illustrates the powered actuator 122*h* of the present disclosure that moves weight, in particular the center of mass, (e.g. the motor 36 and other components attached thereto, such as gearbox housing 141) closer to the mounting point of the actuator 122*h* (distance D2) to the shut face 162. The powered actuator design according to an aspect of the present disclosure may, therefore, reduce loads on mounting points and surrounding sheet metal of the shut face. The actuator **122*h* may operate without a linkage, thereby allowing the motor 36 to be moved closer to the shut face 162 and reduce the load (M2**) on the sheet metal.

Both FIGS. 26 and 27 combine to illustrate how aperture 151 and 153 on each side of gearbox housing 141 are closer to the shut face 162 in FIG. 27. The extensible member 134 shifts relative to gearbox housing in and out of apertures 151 and 153. It will be appreciated that the illustrations of FIGS. 26 and 27 are schematic and intended to illustrate the reduced spacing and loading resulting from the arrangement of FIG. 27.

Figure 28:
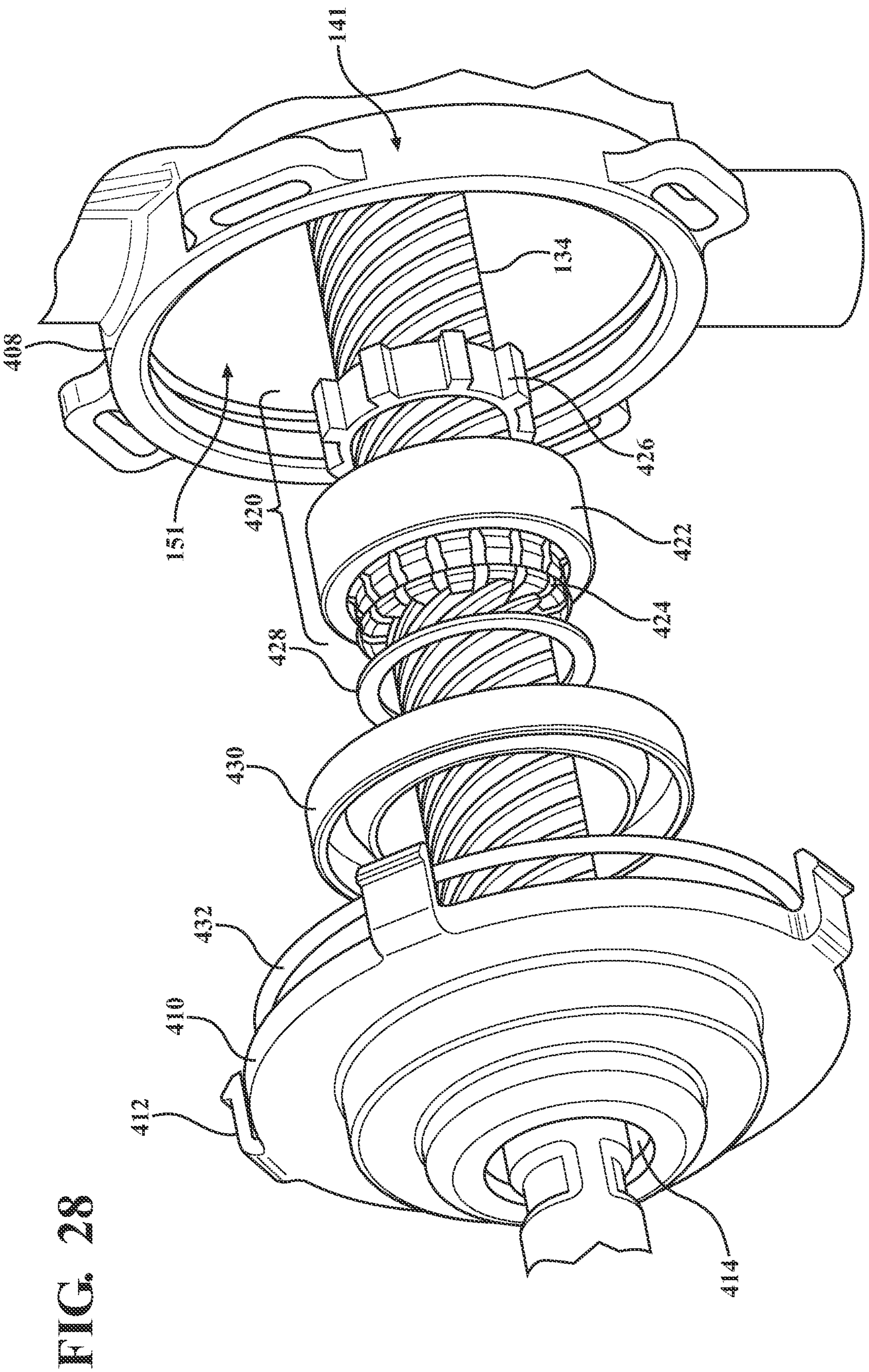
FIG. 28 illustrates an exploded perspective view of a scraper assembly and sealing arrangement for use with a powered actuator according to aspects of the disclosure.

FIG. 28 illustrates another power actuator **122*i* in accordance with an aspect of the disclosure. In this aspect, the side of the power actuator 122*i* that includes the exposed portion of the extensible member 134 (in the form of a leadscrew), for example when the extensible member 134 has been actuated and extended, may include a sealing arrangement to prevent fouling of the extensible member 134** due to debris, water, or the like.

As shown in the exploded perspective view of FIG. 28, power actuator **122*i* may include an outer housing 408 (which may be the adapter 142, gearbox 140, or other housing structure where the extensible member 134 extends from when actuated) and may further include a cover 410. The cover 410 is sized and arranged to selectively mount to and couple with an actuator housing 408. In one aspect, the cover 410 may include a plurality of projecting snap-fit tabs 412 sized and arranged to be received in corresponding receptacles formed on the housing 408. As shown, there are four tabs 412 equally spaced circumferentially around the circular shaped cover 410. It will be appreciated that other spacing and quantities may be used. Similarly, other securing arrangements may be used to secure the cover 410 to the adapter 142. The cover 410 may define an opening 414 through which the extensible member 134** may project when it moves axially.

Inside of the cover 410 are a plurality of sealing and scraping implements for blocking and/or removing debris, and for further limiting ingress of water, dust, or other microparticles.

Figure 31:
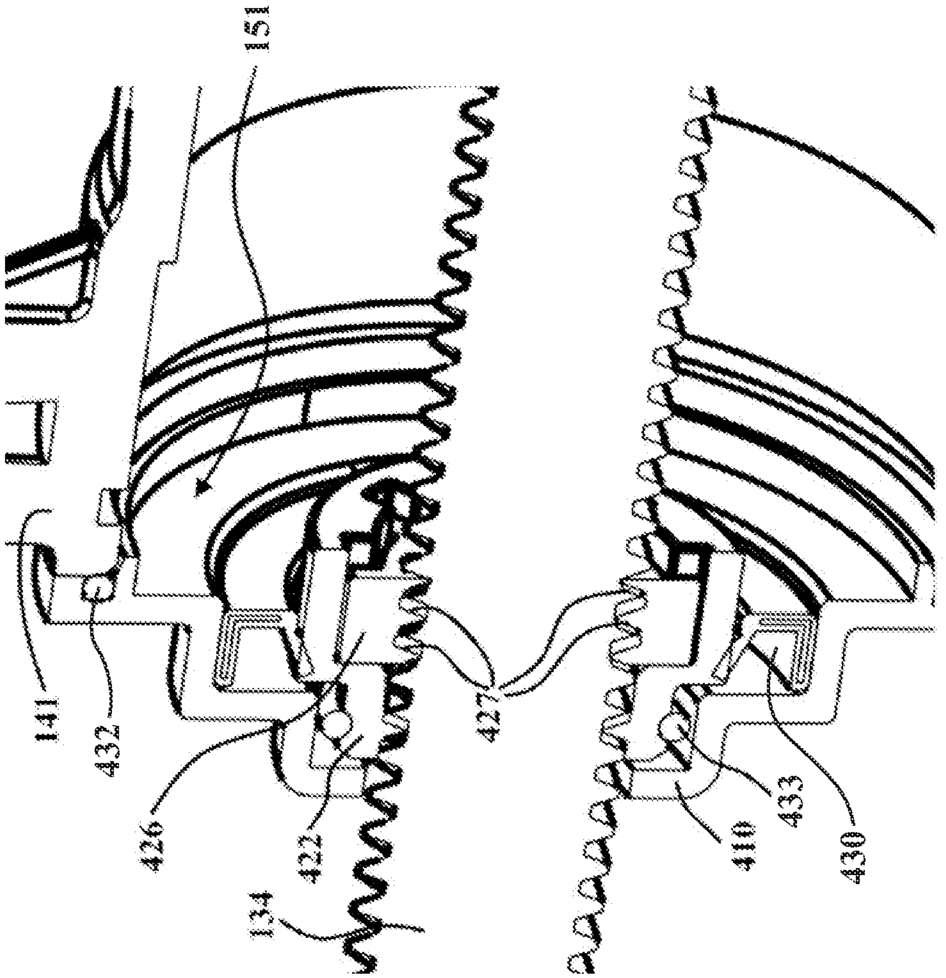
FIG. 31 is cut-away perspective view the showing the scraper in an assembled configuration with the gearbox housing and the scraper seal member in a sealing and/or scrapping engagement with the lead screw, according to aspects of the disclosure.
Figure 32:
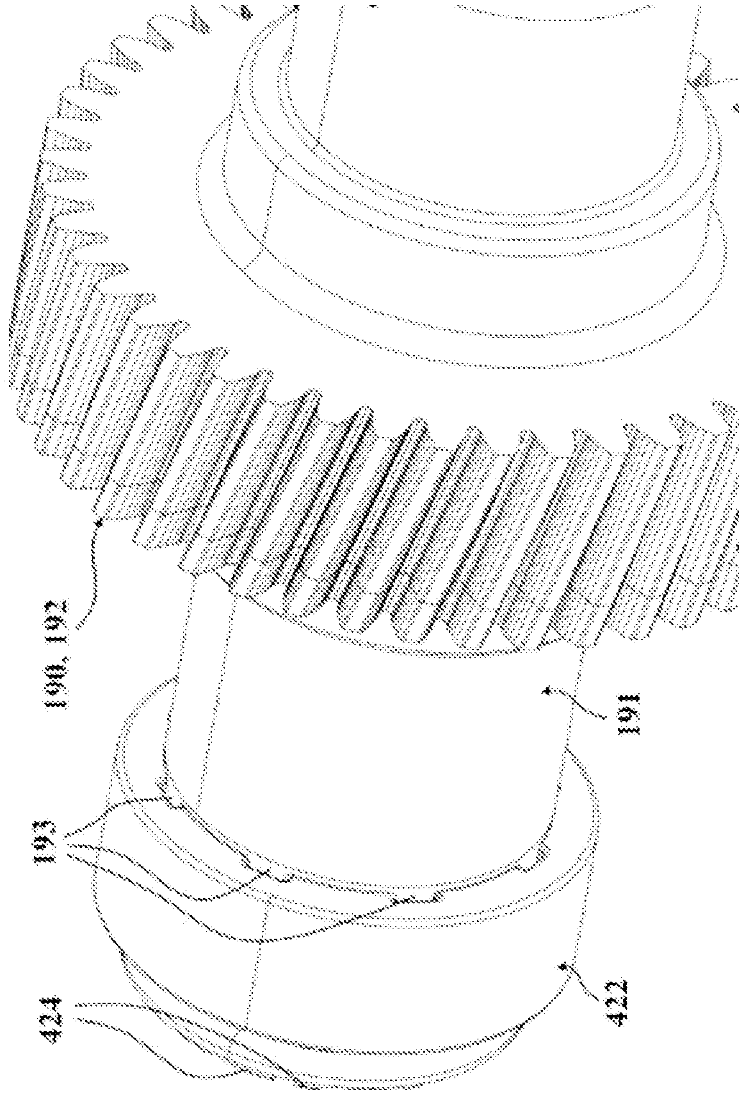
FIG. 32 is a perspective via of a coupling between the scraper assembly and a nut of the powered actuator, according to aspects of the disclosure.

In one aspect, a scraper assembly 420 is provided and disposed inside of the cover 410. The scraper assembly 420 may include a scraper housing 422. The scraper housing 422 may have a generally cylindrical shape and may be fixed for rotation with lead nut 190, for example via a hollow cylindrical coupling 191 for example connecting the scraper housing 422 with the lead nut 190 as seen in FIG. 32. Accordingly, as the lead nut 190 rotates, the scraper housing 422 also rotates. Rotation of the scraper housing 422 occurs while the extensible member 134 translates linearly, such that the threads of the lead screw 134 pass through the scraper housing 422, without the threads being caused to lock in engagement with the scraper housing 420 in a configuration where the scraper assembly 420 is not configured to rotate, either independently, or dependently such as by a coupling with the lead nut 190 as shown in FIG. 32. Coupling 191 may engage with the scraper housing 422 or lead nut 190 (not shown) via a series of teeth 193 received within apertures formed in the scraper housing 422 or nut 190. A scraper tooth 424 is fixed to the scraper housing 422. In one aspect, the scraper tooth may be integrally formed with the housing 422. The scraper tooth 424 is sized and arranged to fit within the thread profile of the extensible member 134, as shown in the cross-section of FIG. 31. As the leadscrew is drawn back into the actuator **122*i*, debris or other matter disposed within the grooves of the threads of the leadscrew will be blocked by the scraper tooth 424 such that the debris does not continue into the actuator 122*i* along with the extensible member 134**.

Figure 30:
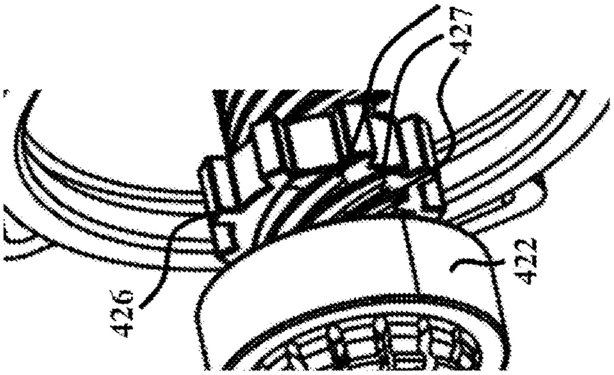
FIG. 30 is a close up partial view of the scraper assembly of FIG. 28 illustrative the grooved inner surface of the scraper seal member for mating in a sealing and/or scrapping engagement with the lead screw, according to aspects of the disclosure.
Figure 29:
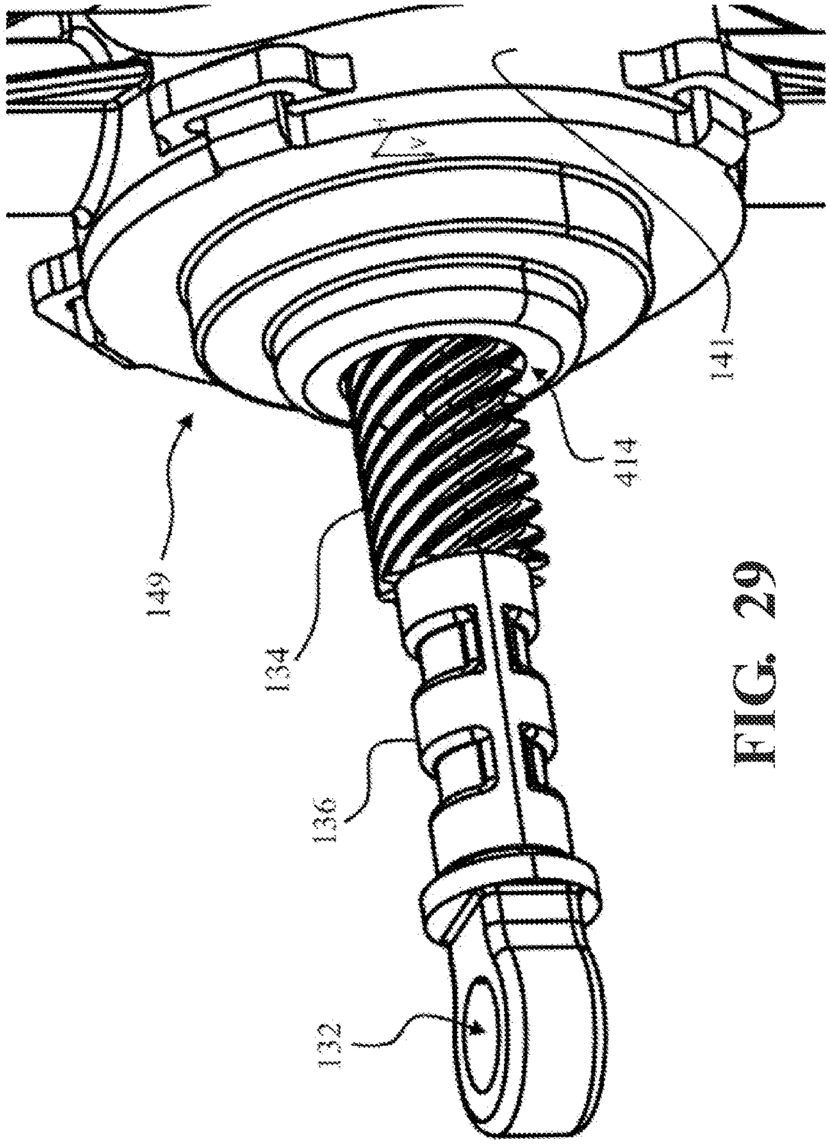
FIG. 29 is a partial perspective view showing the scraper assembly in an assembled configuration with the gearbox housing, according to aspects of the disclosure.

The scraper tooth 424 has a generally annular or ring-shape corresponding to the shape of the scraper housing 422. A scraper seal member 426 is disposed inside of the scraper housing 422. The seal member 426 has an annular shape and may be fixed for rotation with the scraper housing 422, such that it rotates with the scraper housing 422. Scraper seal member 426 includes a threaded inner surface 427 for mating with the threads of lead screw 134, as shown in more detail in FIG. 30 and FIG. 31.

A first compression ring 428, having a first diameter, is disposed adjacent the scraper assembly 420. A second compression ring 430, having a second diameter greater than the first diameter, is disposed radially between the cover 410 and the scraper assembly 420 (as shown in FIG. 31). An O-ring seal member 432, having a third diameter greater than the first and second diameter, is disposed axially between the cover 410 and the gearbox housing 141, as shown in FIG. 31. Another O-ring seal member 433 is disposed radially between the scraper housing 422 and the cover 410, as shown in FIG. 31.

As shown in FIG. 31, the cover 410 may have a stepped cross-sectional profile, and the scraper housing 422 (having scraper tooth 424) may have a similar stepped shape to fit within the cover 410. The O-ring 433 can fit radially between the respective stepped portions of the cover 410 and the scraper housing 422. The second compression ring 430 is shown in FIG. 31 and is disposed axially inward relative to the O-ring 433 and is disposed radially between the scraper housing 422 and another stepped portion of the cover 410.

Given the above O-rings and compression rings, and seal members, the scraper assembly 420 is therefore sealed against the cover 410. The cover 410 is sealed against gearbox housing 141. And the extensible member 134 is sealed against the scraper assembly 420. Accordingly, the extensible member 134 is sealed relative to the gearbox housing via the scraper assembly 420 and the cover 410.

Thus, when the cover 410 is secured to the adapter, the O-ring seal member 432 will be compressed therebetween to provide a sealing function. The cover 410 still includes hole or opening 414 for allowing the extensible member 134 to project outwardly therefrom. Accordingly, debris may enter the inside of the cover 410. However, when assembled, the scraper assembly 420 is disposed near the opening 414. Of course, when the extensible member 134 is extended and exposed outwardly from the cover 410, debris may accumulate on its surface. The debris is scraped and blocked during retraction of the leadscrew by the scraper assembly 420, which also seals the interior of the actuator **122*i*** as described above.

There is therefore illustratively shown herein a powered actuator for a closure of a vehicle including an electric motor 136 configured to rotate a driven shaft 166, an extensible member 134, such as a lead screw configured to be coupled to one of a body 14 or the closure 12 of the vehicle for opening or closing the closure 12, a gearbox 140 comprising a gearbox housing 141, the gearbox 140 configured to apply a force to the extensible member 134 for causing the extensible member 134 to move linearly in response to rotation of the driven shaft 166, and at least one sealing assembly 149 configured to seal the gear box housing 141 as the extensible member translates linearly. The gearbox housing 141 may include at least one aperture for allowing the extensible member to pass through as the extensible member translates linearly. The at least one aperture may include a first aperture 151 facing the shut face 162 of the closure 12 and a second aperture 153 facing an inner cavity 39 of the closure 12 such that the extensible member 134 passes through both the first aperture 151 and the second aperture 153 as the extensible member 134 translates linearly within the housing 141. One of the at least one sealing assembly 149 may be associated with the first aperture 151 (see FIGS. 19 and 28 for example) and another one of the at least one sealing assembly is associated with the second aperture 153 (see FIG. 25A and FIG. 25B for example). The at least one sealing assembly 149 associated with the first aperture 151 may be configured to abut against the extensible member 134 to allow the extensible member to translate linearly through the at least one sealing assembly (see FIG. 28), while also provided a seal between the extensible member 134 and the housing 141. Therefore the extensible member 134 may leave the interior sealed space of the housing 141 such that part of the extensible member 134 may be exposed to the external environment upon extension of the extensible member 134, as shown in FIG. 24 for example. The at least one sealing assembly associated with the first aperture may be configured as the scraper assembly 420 configured to remove debris from the extensible member as the extensible member translates linearly from the extended position to the retracted position. Therefore any debris, dust, dirt and the like deposited on the part of the extensible member 134 exposed to the external environment when the extensible member 134 is in the extended position may be prevented from entering into the internal cavity of the housing 141 when the extensible member 134 is retracted. Because the extensible member 134 is configured for reciprocation relative to the gear box housing 141 as provided for by apertures 151, 153 disposed on opposite sides of the housing 141 such that portions of the extensible member 134 extending beyond the apertures 151, 153 would be exposed to the external environment (for example, the lead screw 134 is not completely encompassed by a housing, such as two overlapping tubes which remain in overlapping sealing configuration when extended or retracted relative to each other such that the lead screw never extends outside the encompassment of the tubes) but for either the least one sealing assembly 149 as a cover preventing the contact of debris, dirt, or like contaminating particles from entering into contact with the extensible member 134 when the extensible member 134 is extending beyond the apertures 151, 153, or the least one sealing assembly 149 as a wiper or scrapper configuration removing debris, dirt, or like contaminating particles by abutting contact (e.g. in abutment) having entered into contact with the extensible member 134. Scraper assembly 420 may also be associated with the second aperture 153 in a similar manner. The another one of the at least one sealing assembly associated with the second aperture 153 may be configured to extend and retract with the extensible member 134 as the extensible member 134 translates linearly through the second aperture 153. The another one of the at least one sealing assembly associated with the second aperture 153 may be configured as a cover 148, such as a boot, configured to encompass of fully expose the extensible member 134 as the extensible member translates linearly through the second aperture 153. The another one of the at least one sealing assembly associated with the second aperture 153 may be an expandable/collapsible cover 148 or boot configured to encompass the extensible member as the extensible member translates linearly through the second aperture 153, and the gearbox 140 may include a lead nut 190, 192 rotatable in response to rotation by the driven shaft 166, and the extensible member 134 may include a leadscrew configured to move axially in response to rotation of the lead nut 190. The powered actuator may further be configured with an adapter 142, 342 configured to mount the gearbox 140 to a shut face 162 of the closure 12. The powered actuator may further include a high-resolution position sensor 144 coupled to the driven shaft 166 and configured to detect a positon of the driven shaft 166 and transmit the position to a servo controller, such as actuator controller 50.

Figure 33:
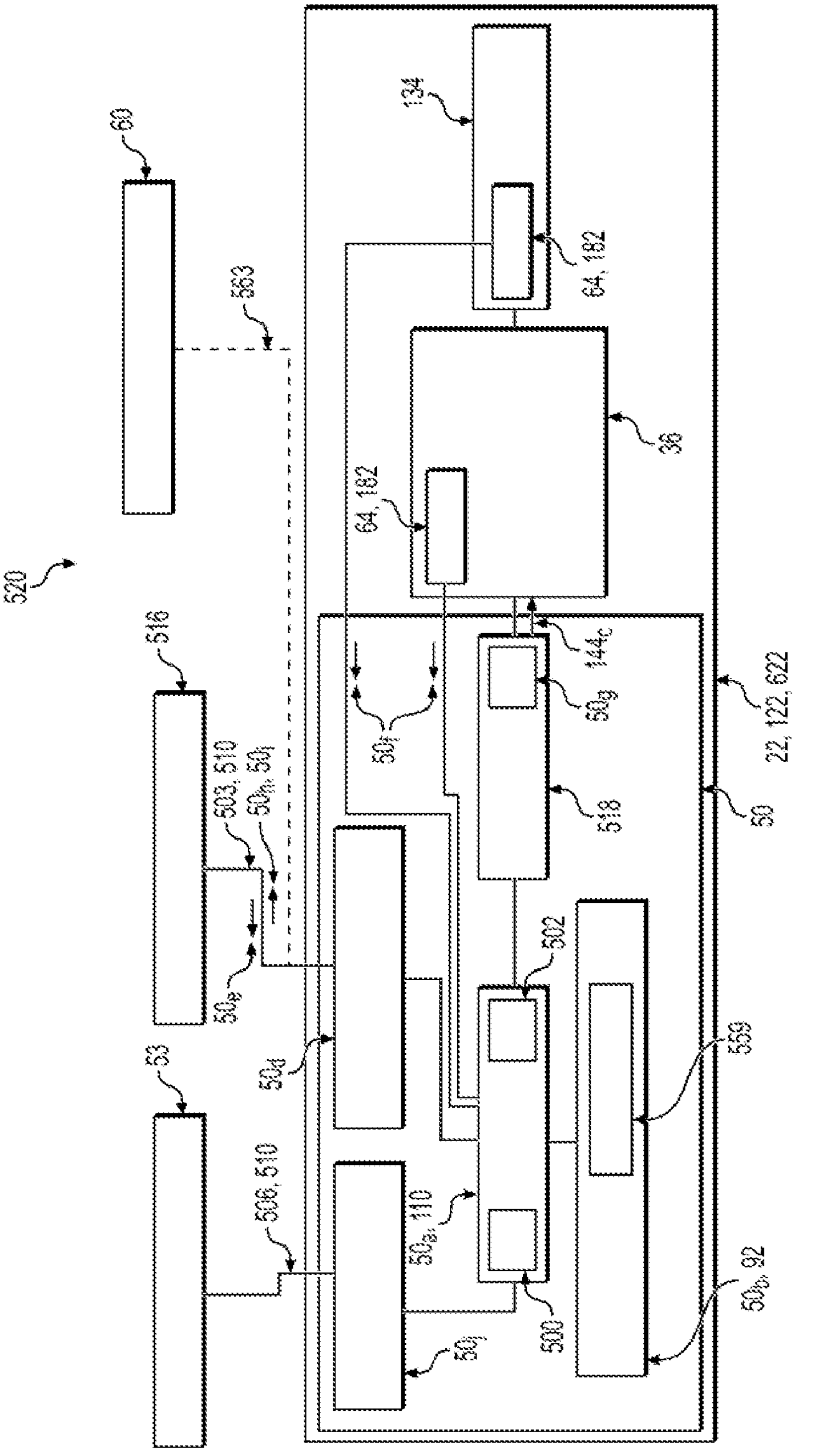
FIG. 33 is a block diagram of a controller circuit for an electronic motor assembly, according to aspects of the disclosure.

A power closure member actuation system or servo actuation system 520 shown in FIG. 33 includes the actuator controller 50 configured as a master controller and configured to issue one or more actuations signals $50_c$ to actuate the motor 36 based on command control signals 508 (or also denoted as command signals $50_e$) received via the electrical connection(s) 510 in order to move the closure member 12 between the open position and the closed position. As such, the electrical connection(s) 510 would be used to supply a generic indication of an open or close command 508, as an example, issued from a vehicle control system 516, such as the BCM 52 (e.g., inputs 54, 56), or directly from an open/close switch (e.g. the key fob 60 over wireless link 563, an exterior closure panel handle, an interior closure panel handle, a smart latch 83, a latch controller, etc.) for receipt by the actuator controller 50 acting as the master controller. The command 508, such as an open or close command, would not be directly transmitted by the actuator controller 50 to the motor 36, rather the actuator controller 50 would be responsible for processing the open/close command 508 and then generating additional actuation signals $50_c$ for direct consumption by the motor 36. In terms of master controller functionality, the actuator controller 50 operating as the master controller would be responsible for implementing control logic stored in a physical memory $50_b$, 92 for execution by a data processor, such as processor $50_a$, to generate the actuation signals $50_c$ (e.g. in the form of a pulse width modulated voltage for turning on and turning off motor 36 and controlling its direction and speed of output rotation of the lead screw 134, in accordance with an illustrative example) to power the motor 36 in order to control its operation. As illustrated in FIG. 33, the actuator controller 50 is electrically coupled a motor driver 518 including field-effect transistors (FETSs) $50_g$ which are appropriately controlled (switched on/off) by the actuator controller 50 to generate the actuation signals $50_c$. Circumstances surrounding the control of the motor 36 could include receiving sensor signals (via electronic components 64, 182 as sensors—e.g. position sensors, direction sensors, obstacle sensors, etc.) by the master controller as the actuator controller 50, processing those sensor signals, and adjusting operation of the motor 36 accordingly via new and/or modified actuation signals $50_c$(e.g. adjust the period of PWM based actuation signals $50_c$ in the configuration where the motor 36 is responsive to supplied PWM signals). In this example, the sensor signals $50_f$ of sensors 64, 182 and the actuation signals $50_c$ are generated and processed internally in the actuator housing 141, 184, 188, 206, 408, 422 by the actuator controller 50, in conjunction with the motor 36 also mounted within the actuator housing 141, 184, 188, 206, 408, 422. As such, signals 508 could represent generic open/close signals, or other commands, coming from the handle(s), or other control system etc., while the actual actuation signals $50_c$ received by and consumed (i.e. processed) by the motor 36 would be generated by the actuator controller 50.

Still referring to FIG. 33, the integrated actuator controller 50 of the powered actuator 22, 122 and its interconnection with the various electronic components $\mathbf{50}_g$, 64, 182 is schematically represented. The actuator controller 50 can include a processor $\mathbf{50}_a$, 110 (e.g., a software module 500 or hardware modules 502 which may include a coprocessor or memory according to one embodiment) and a set of instructions 559 stored in the physical memory $\mathbf{50}_b$, 92 for execution by the processor $\mathbf{50}_a$, 110 to determine the actuation signals $\mathbf{50}_c$ (for example, actuation signals in the form of a pulse width modulated voltage for turning on and turning off motor 36 and controlling its direction of output rotation) to power the motor 36 to control its operation in a desired manner. The memory $\mathbf{50}_b$, 92 may include a random access memory ("RAM"), read-only memory ("ROM"), flash memory, or the like for storing the set of instructions 559, and may be provided internal the processor $\mathbf{50}_a$, 110 or externally provided as a memory chip mounted to a printed circuit board (PCB), discussed in more detail below, or both. The memory $\mathbf{50}_b$, 92 may also store an operating system for general management of the actuator controller 50. As such, the electrical components $\mathbf{50}_g$, 64, 182 with the PCB(s) can be considered an embodiment of the control circuitry provided by the actuator controller 50 which operate together to form at least one computing device for processing data by a processor (e.g. processor $\mathbf{50}_a$, 110) such as communication signals, command signals $\mathbf{50}_e$, sensor signals $\mathbf{50}_f$, feedback signals $\mathbf{50}_h$ and executing code or instructions stored in a memory (e.g. memory $\mathbf{50}_b$, 92) and outputting motor 36 control signals and for processing other communication/control signals and algorithms and methods in a manner as illustratively described herein.

As shown in FIG. 33, the actuator controller 50 can have a communication interface $\mathbf{50}_d$ to receive any power and/or data/command signal(s)), such as receive control command signals $\mathbf{50}_e$ from the electrical connection(s) 510 (issued by the remote/external control system 16) and in turn to control the operation of the motor 36 in response. The actuator controller 50 may optionally have a dedicated power interface $\mathbf{50}_j$ connected through electrical power signal line 506 to the power source or battery 53. Likewise, communication interface $\mathbf{50}_d$ may be configured to supply power and/or data/command signal(s)), such as subcommand signals $\mathbf{50}_i$ to the electrical connection(s) 510 (for transmission to external systems 516 from the powered actuator 22, 122, when operating as a slave device). The communication interface $\mathbf{50}_d$ may include one or more network connections adapted for communicating with other data processing systems (e.g., BCM 52, smart latch 83 in communication) over a vehicle network or bus via, and in the illustrative embodiment over the electrical connection(s) 510 which may form part of such as bus. For example, the communication interface $\mathbf{50}_d$ may be connected to a Local Interconnect Network (LIN) or CAN bus or the like network protocol, over which command signals issued by the control system 16 over the vehicle network may be received and/or transmitted. As such, the communication interface $\mathbf{50}_d$ may include suitable transmitters and receivers. Thus, the actuator controller 50 may be linked to other data processing systems by a communication network, which electrical connection(s) 510 may form part of. The communication interface $\mathbf{50}_d$ may also be of a wireless configuration capable of sensing and transmitting communication signals wirelessly, for example using RF frequencies or the like, over wireless link 563. The input/output arrangements of the communication interface $\mathbf{50}_d$ can be built into an I/O arrangement on the PCB(s) of the actuator controller 50 for integration within the actuator housing 141, 184, 188, 206, 408, 422. Optionally, it may be integrated into the microprocessor $\mathbf{50}_a$.

Command signals $\mathbf{50}_e$ received by the communication interface $\mathbf{50}_d$ may include data related a generic or high level command to open the closure member 12 to a certain position; to hold the closure member 12 at this position; to fully open the closure member 12; to fully close the closure member 12; as but a list of non-limiting examples of commands. For example, a generic "CLOSE" command received by the communication interface $\mathbf{50}_d$ could result in the actuation signal $\mathbf{50}_c$ to drive the motor 36 at certain speeds (e.g. the actuator controller 50 may control the switching frequency of FETS $\mathbf{50}_g$ to adjust the power allowed to be conducted to the motor 36) over a defined path of movement from fully open, to a point/position before the fully close position where the actuation signal $\mathbf{50}_c$ would be adjusted by the actuator controller 50 to reduce the speed of operation of the motor 36 (e.g. the actuator controller 50 may decrease the switching frequency of FETS $\mathbf{50}_g$ to adjust the power allowed to be conducted to the motor 36) and stop movement of the closure member 12 (e.g. the actuator controller 50 may control the FETS $\mathbf{50}_g$ to stop conducting power to the motor 36) at a predefined point/position of the closure member 12. For example, such a point may correspond to a position of the closure member 12 whereat the latch 83 engages a striker (not shown) provided on the vehicle body 14 where it is in an aligned position of with the striker to perform a cinching operation to thereby transition the closure member 12 to the fully closed position without an operation of the motor 36, the cinching operation involving the transitioning of the latch 83 from a secondary latched position to a primary latched position as is generally known in the art. As a result, the striker provided on the closure member 12 which is moved by the movement of the closure member 12 into a position where the striker engages the secondary position of the latch 83 to capture and maintain the striker in latched engagement with the latch 83. At such a position, the motor 36 may be deactivated so as not to interfere with the cinching operation of the latch 83. Sensors provided in the latch 83 or in another remote system 516 and in communication directly or indirectly with the actuator controller 50, (for example via electrical connection(s) 510) may assist the actuator controller 50 to determine locally the actuation signal $\mathbf{50}_c$ required to stop the motor 36 at this position. Illustratively, such sensors may be an accelerometer (e.g., accelerometer 697, discussed below), and may generate sensor signals to be communicated to the actuator controller 50 via the electrical connections 510. It is recognized that other command signals can be issued, such as to move the closure member 12 from the fully opened to a secondary latching position whereat the vehicle latch 83 is moved into the secondary latched position in position for a cinching operation to transition the latch 83 from the secondary position to the primary latched position, and for other closure member movement operations. The processor $\mathbf{50}_a$, 110 can therefore be programmed to execute instructions as a function of the command signals $\mathbf{50}_e$ transmitted and received by the communication interface $\mathbf{50}_d$ as Local Interconnect Network protocol signals such as but not limited to commands for operating the powered actuator 22, 122 in a mode of operation including: a position request for motion mode, a push to close command mode, a push to open command mode, a time detected obstacle mode, a zone detected obstacle mode, a full open position detected mode, a learn mode, and/or an adjustable stop position mode.

Still referring to FIG. 33, the actuator controller 50 is configured to interpret the command signals $\mathbf{50}_e$ received at the communication interface $50_d$ from the external or remote system 516 and in response activate the motor driver 518 including the FETS $50_g$ appropriately, for example based on a stored movement sequence or profile stored in memory $50_b$, 92 and referenced (e.g. looked up in memory $50_b$, 92) based upon, at least in part, the received command signals $50_e$. Such predefined stored movement sequences of the closure member 12 may be recorded in the memory $50_b$, 92. For example, the received command signals $50_e$ may be a digital message encoded according to a communication protocol (e.g. a serial binary message-based protocol), the actuator controller 50 capable of decoding the digital message to extract the command (e.g. converts the data stream received by the communication interface $50_d$ as serial bits (voltage) levels into data that the actuator controller 50 can process). In response, actuator controller 50 may issue FET control signals to control the operation of the FETs $50_g$ (e.g. control the FET gates) to supply current and/or voltage to the motor 36.

The actuator controller 50 can be further programmed by the execution of instructions 559 to operate the motor 36 based on different desired operating characteristics of the closure member 12. For example, the actuator controller 50 can be programmed to open or close the closure member 12 automatically (i.e. in the presence of a wireless transponder (such as a wireless key FOB 60) being in range of the communication interface $50_d$) when a user outside of the vehicle 10 initiates an open or close command of the closure member 12. Also, the actuator controller 50 can be programmed to process feedback signals **50*f* from the electronic sensors 64, 182 supplied to the actuator controller 50 to help identify whether the closure member 12 is in an opened or closed position, or any positions in between. Further, the closure member 12 can be automatically controlled to close after a predefined time (e.g. 5 minutes) or remain open for a predefined time (e.g. 30 minutes) based on the instructions 559 stored in the physical memory $50_b$. For example, the high level generic command (e.g. $50_e$) may include a command labelled, for illustrative purposes only: "Open Profile A", which may be decoded by the actuator controller 50 to undertake operation of the powered actuator 22, 122 to move the closure member 12 in accordance with a sequence of operations as stored in memory $50_b$, 92 including three aspects such as moving the closure member 12 to fully open position, a hold open for a period of time (e.g., 3 minutes) after the closure member 12 has reached the fully opened position, and a fully closing operation after a second period of time (e.g., 5 minutes) after the closure member 12 has reached the fully opened position. For example, the high level generic command (e.g. $50_e$) may include a command labelled "Open Profile B", which may be decoded by the actuator controller 50 to undertake similar operations of "Open Profile A" except replacing the fully closing operation with an expected manual user movement of the closure member 12 as would be detected by the sensors 64, 182. Further, the processor $50_a$, 110 can be programmed to execute the instructions complementing and enhancing the functionality of the closure member 12 locally of received profile command, for example executing a sub-profile operating mode, based on received signals $50_f$ from the electric motor 36 representative of an electric motor 36** operation selected from operations such as but not limited to: an electric motor speed ramp up and ramp down operating profile, an obstacle detecting mode for detecting obstructions of the pivotal closure member between an open position and a closed position, a falling pivotal closure member detection mode, a current detection obstacle mode, a full open position mode, a learn completed mode, a motor motion mode, and/or an unpowered rapid motor motion mode.

As another illustrative example of locally controlled operation of the powered actuator 22, 122, a manual override function is described. As discussed above, one or more Hall-effect sensors 64, 182 may be provided and positioned within sensor housing 184, as illustrated in FIG. 12B, for example, and discussed in more detail below, the Hall-effect sensors 64, 182 are positioned on the PCB adjacent to the driven shaft 166, to send a signal, such as an analog voltage time varying signal depending of the change in magnetic field detected by the Hall-effect sensors 64, 182, representative of operation (e.g., rotation(s) of the driven shaft 166) of the electric motor 36 to actuator controller 50 that are indicative of rotational movement of motor 36 and indicative of the rotational speed of motor 36, e.g., based on counting signals from the Hall-effect sensor 64, 182 detecting a target (e.g., magnet wheel 180) on the driven shaft 166. In situations where the sensed motor 36 speed is greater than a prestored expected threshold speed, stored in memory $50_b$, 92 for example, and where a current sensor (in the case where ripple counting is employed to determine the operation of the motor 36, such as to determine the position of the motor 36) registers a significant change in a current draw, the actuator controller 50 may determine that a user is manually moving the closure member 12 while motor 36 is also operating to rotate the lead screw 134, thus moving the closure member 12 between its opened and closed positions. The actuator controller 50 may then send in response to such a determination the appropriate actuation signals $50_c$ (by cutting the power flow to the motor 36 for example) resulting in the motor 36 to stop to allow a manual override/control of the closure member 12 by the user 75. Conversely, and as an example of an object or obstacle detection functionality, when the actuator controller 50 is in a power open or power close mode and the Hall-effect sensors 64, 182 indicate that a speed of the motor 36 is less than a threshold speed (e.g., zero) and a current spike is detected (in the case where ripple counting is employed to determine the operation of the motor 36), the actuator controller 50 may determine that an obstacle or object is in the way of the closure member 12, in which case the actuator controller 50 may take any suitable action, such as sending an actuation signal $50_c$ to turn off the motor 36, or sending an actuation signal $50_c$ to reverse the motor 36. As such, the actuator controller 50 receives feedback from the Hall-effect sensors 64, 182, or from a current sensor (not shown) and renders control decisions locally for the powered actuator 22, 122 to ensure that a contact or impact with the obstacle and the closure member 12 has not occurred during movement of the closure member 12 from the closed position to the opened position, or vice versa. An anti-pinch functionality may also be performed in a similar manner to the obstacle detection functionality, to particularly detect an obstacle such as a limb or finger is present between the closure member 12 and the vehicle body 14 about the nearly fully closed position during the closure member 12 transition towards the fully closed position.

Figure 34:
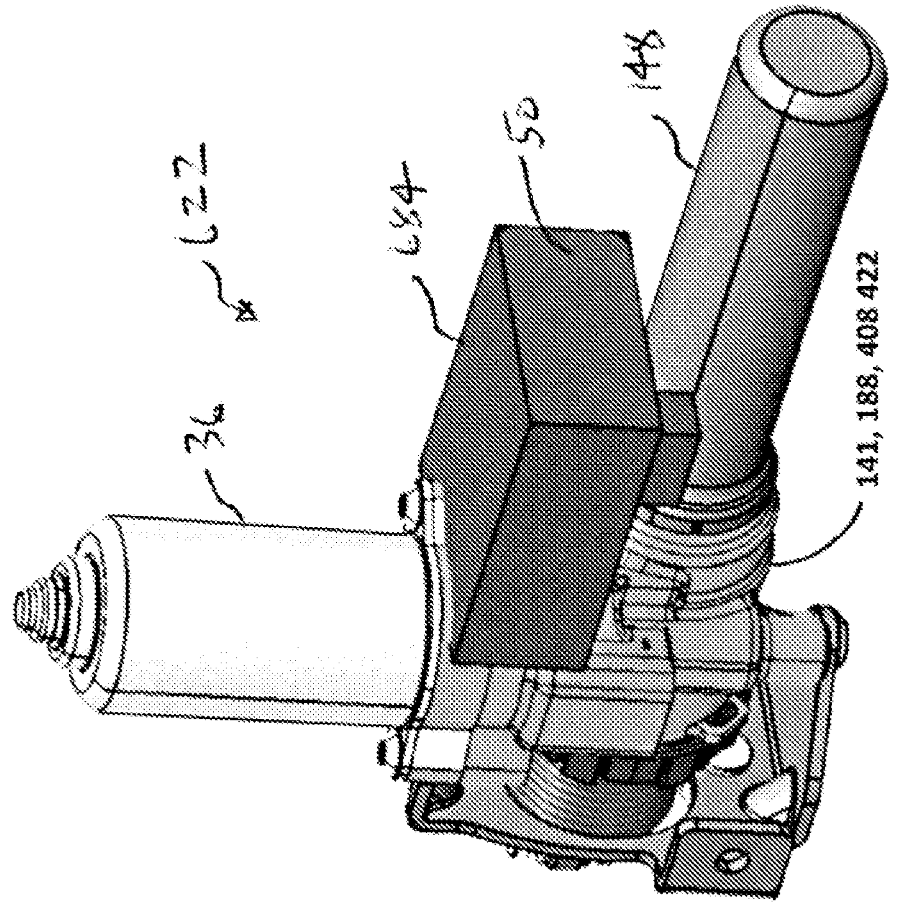
FIG. 34 shows an example actuator assembly for a closure member of the vehicle, according to aspects of the disclosure.

Referring to FIG. 34, an example actuator assembly 622 for a closure member (e.g., closure 12) of the vehicle 10 is shown. The actuator assembly 622 includes the actuator housing 141, 148, 184, 188, 206, 408, 422 including sensor housing 684 (e.g., formed of metal). Sensor housing 684 is similar to sensor housing 184 of FIG. 12B, but is larger in size. In addition, the actuator assembly includes the electric motor 36 disposed in the actuator housing 141, 148, 184,

188, 206, 408, 422. The electric motor 36 is configured to rotate the driven shaft 166 operably coupled to the extensible member 134, which is also coupled to one of the body 14 or the closure member 12 for opening or closing the closure member 12. The actuator assembly 622 also includes the actuator controller 50 disposed in the sensor housing 684 of the actuator housing 141, 148, 184, 188, 206, 408, 422, 684. The actuator controller 50 is coupled to electric motor 36. The actuator controller 50 is coupled to an accelerometer 697 configured to sense movement of the closure member 12. Signals from the accelerometer 697 are used to determine user intent by understanding the accelerations of the closure member 12. If the user pushes hard, the acceleration is high. If the person pushes door softly, the acceleration of the closure member 12 will be small. The actuator controller 50 is configured to detect the movement of the closure member 12 using the accelerometer 697. The actuator controller 50 is also configured to control the opening or closing of the closure member 12 based on the movement of the closure member 12 using the electric motor 36 (i.e., based on user intent). Following detection of movement by the accelerometer 697, obstacle detection can then be performed.

Figure 35:
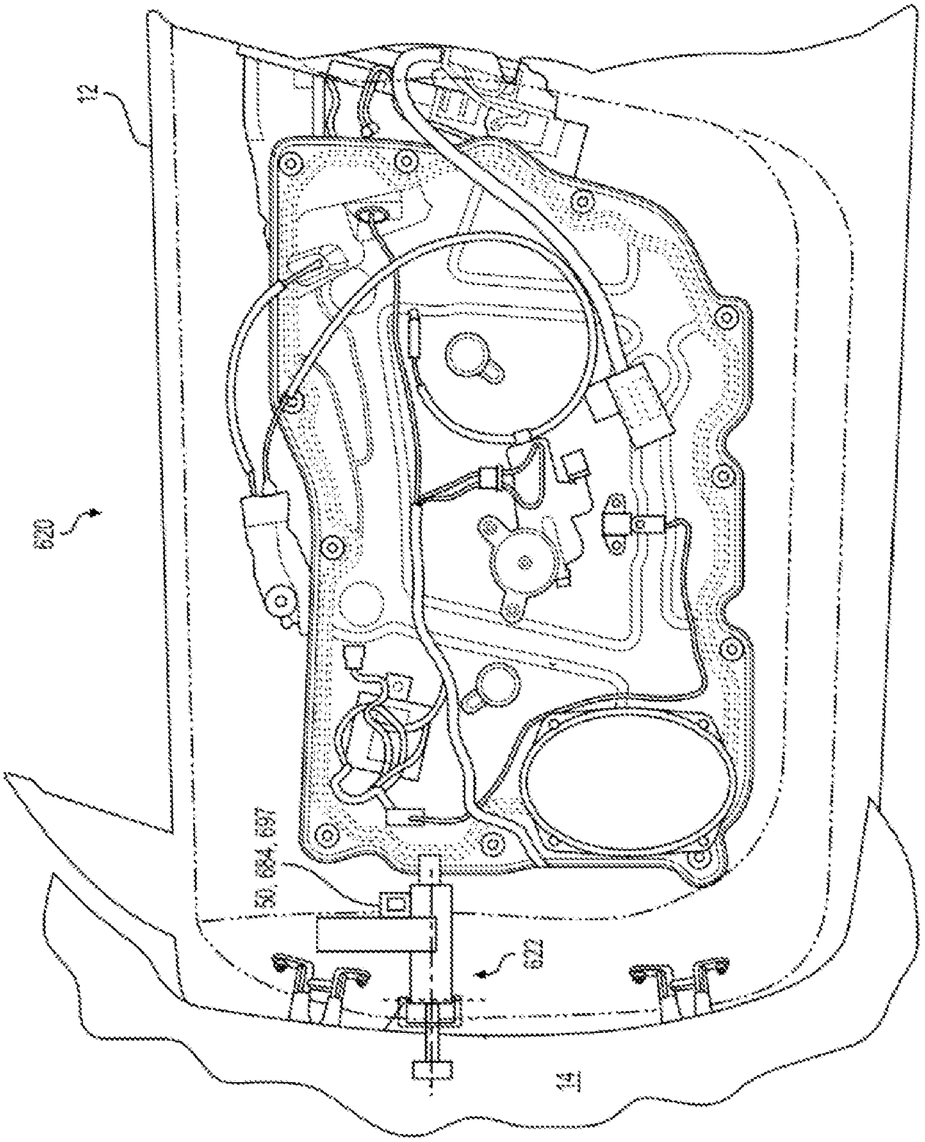
FIG. 35 shows a first example servo actuation system, according to aspects of the disclosure.

The actuator assembly 622 can be part of a first example servo actuation system 620 shown in FIG. 35. In the first example servo actuation system 620, the accelerometer 697 is part of the actuator assembly 622 itself. Specifically, the accelerometer 697 is disposed in the sensor housing 684 of the actuator housing 141, 148, 184, 188, 206, 408, 422, 684. So, in the first example servo actuation system 620, the actuator assembly 622 has the actuator controller 50 execute instructions or software to control itself.

Figure 36:
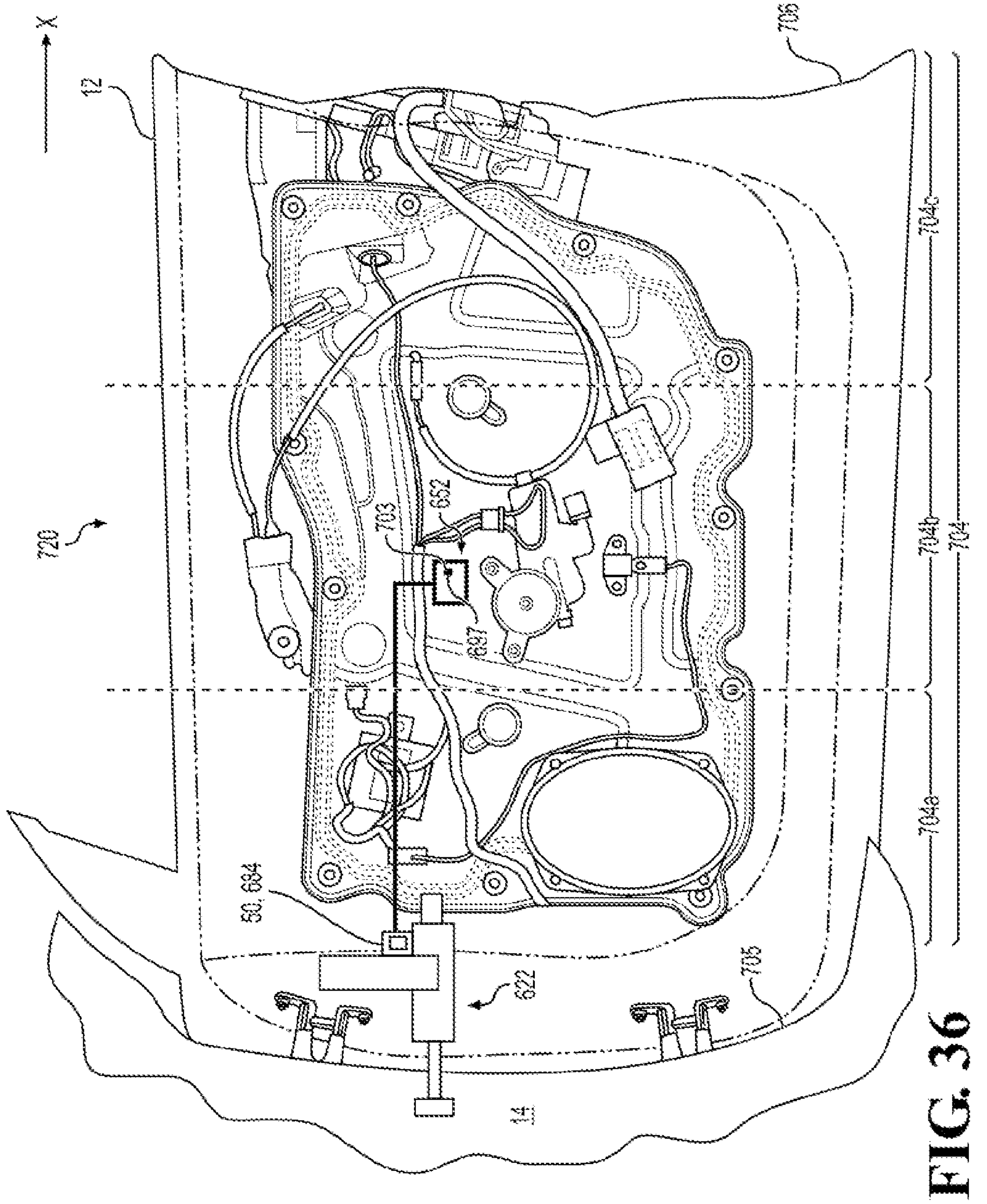
FIG. 36 shows a second example servo actuation system, according to aspects of the disclosure.

A second example servo actuation system 720 is shown in FIG. 36. As with the first example servo actuation system 620 shown in FIG. 35, the actuator assembly 622 includes the actuator housing 141, 148, 184, 188, 206, 408, 422, 684 and the actuator assembly 622 includes an electric motor 36 disposed in the actuator housing 141, 148, 184, 188, 206, 408, 422, 684 and configured to rotate a driven shaft 166 operably coupled to an extensible member 134, which is coupled to one of a body 14 or the closure member 12 for opening or closing the closure member 12. However, instead of the accelerometer 697 being disposed in the actuator housing 141, 148, 184, 188, 206, 408, 422, 684, the accelerometer 697 is disposed remotely from the actuator assembly 622 while still being configured to sense movement of the closure member 12.

At least one servo controller 50, 850, 1050 is coupled to the electric motor 36 and the accelerometer 697. The at least one servo controller 50, 850, 1050 is configured to detect the movement of the closure member 12 using the accelerometer 697. The at least one servo controller 50, 850, 1050 controls the opening or closing of the closure member 12 based on the movement of the closure member 12 using the electric motor 36. According to an aspect, and as shown in FIG. 36, the at least one servo controller 50, 850, 1050 includes the actuator controller 50 of the actuator assembly 622 disposed in the actuator housing 141, 148, 184, 188, 206, 408, 422, 684. The accelerometer 697 is disposed in a door node assembly 652 disposed remotely from the actuator assembly 622 on the closure member 12.

According to an aspect and still referring to FIG. 36, the accelerometer 697 is attached to the closure member 12 about a center of gravity 703 of the closure member 12. According to another aspect, the closure member 12 can have an overall closure member length 704 defined from a first closure member end 705 along a longitudinal direction x to a second closure member end 706. The overall closure member length 704, from the first closure member end 705 to the second closure member end 706, may comprise a front closure member length **704*a* being one third of the overall closure member length 704, a middle closure member length 704*b* being one third of the overall closure member length 704, and a back closure member length 704*c* being one third of the overall closure member length 704. According to another aspect, the accelerometer 697 is attached to the closure member 12 within the middle closure member length 704*b* of the closure member 12**.

Figure 37:
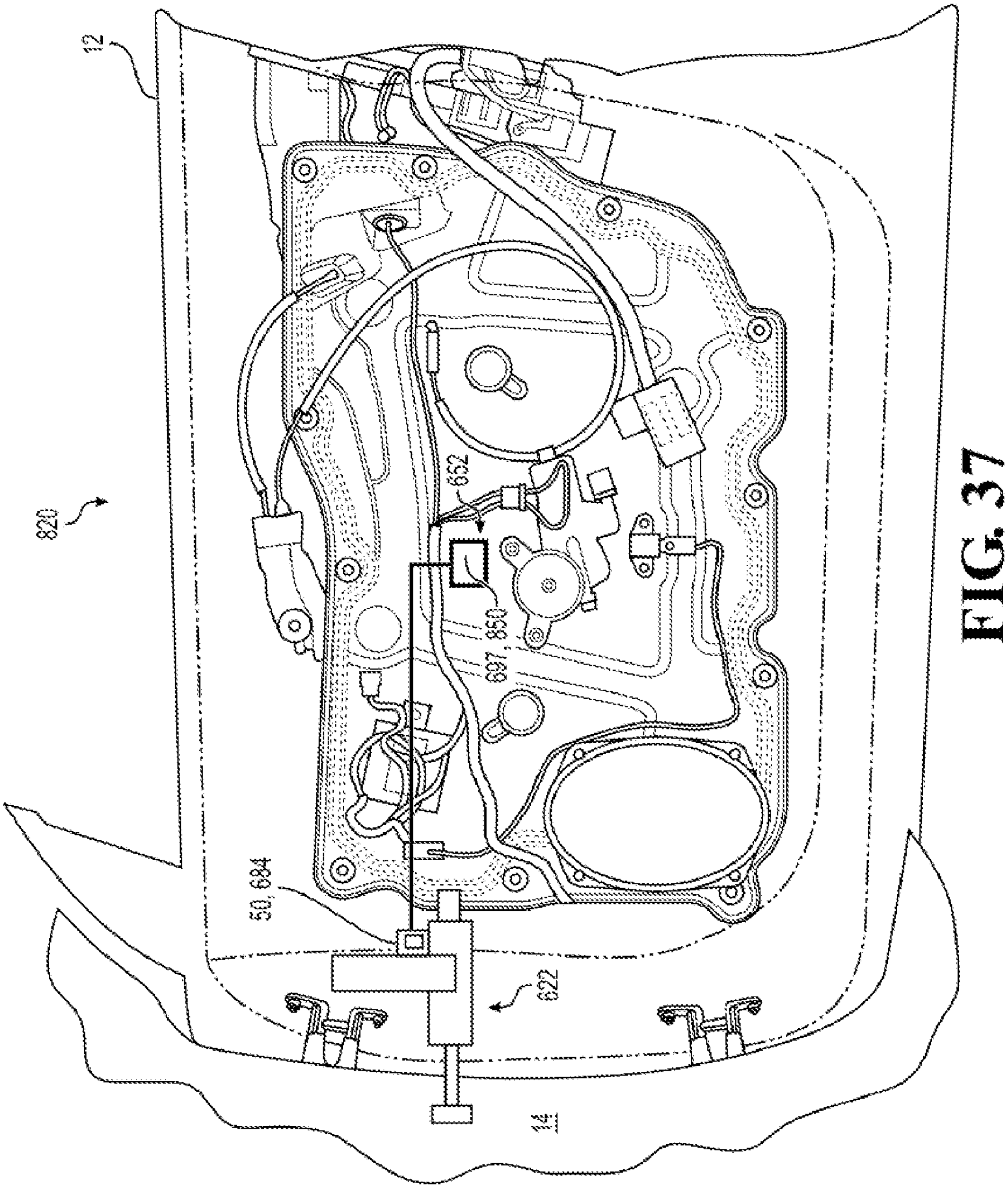
FIG. 37 shows a third example servo actuation system, according to aspects of the disclosure.

A third example servo actuation system 820 is shown in FIG. 37. Like the second example servo actuation system 720 shown in FIG. 36, the at least one servo controller 50, 850, 1050 of the third example servo actuation system 820 controls the opening or closing of the closure member 12 based on the movement of the closure member 12 using the electric motor 36; however, instead of the at least one servo controller 50, 850, 1050 only including the actuator controller 50, the at least one servo controller 50, 850, 1050 includes a door node controller 850 of the door node assembly 652 disposed remotely from the actuator assembly 622 on the closure member 12. In other words, the door node controller 850 is an example of remote system 516 of FIG. 33. The door node controller 850 is configured to command the actuator controller 50 to control the opening or closing of the closure member 12 based on the movement of the closure member 12 using the electric motor 36. As shown, the accelerometer 697 is disposed in the door node assembly 652.

Figure 38:
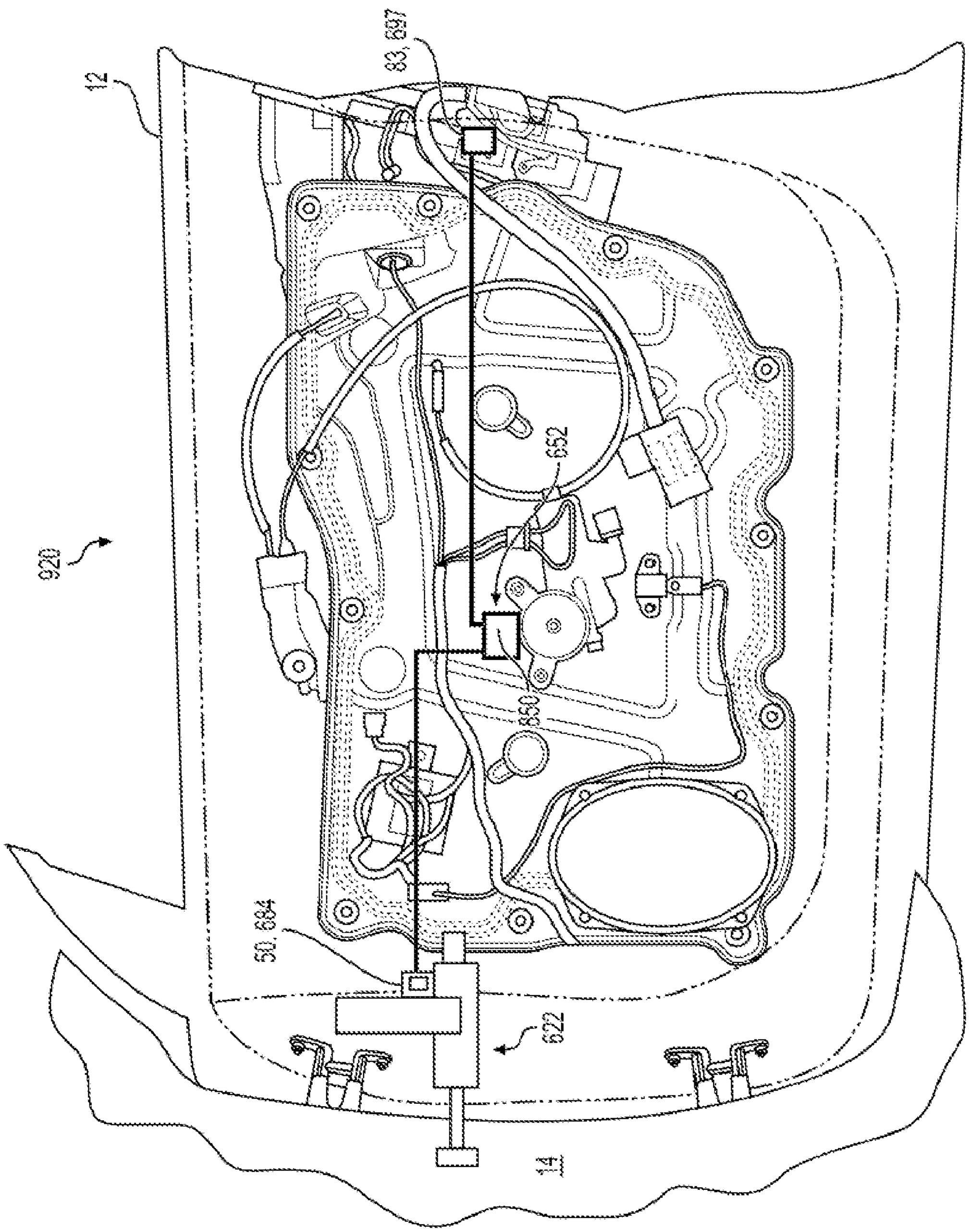
FIG. 38 shows a fourth example servo actuation system, according to aspects of the disclosure.

A fourth example servo actuation system 920 is shown in FIG. 38. Again, the door node controller 850 is configured to command the actuator controller 50 to control the opening or closing of the closure member 12 based on the movement of the closure member 12 using the electric motor 36. In the fourth example servo actuation system 920, the accelerometer 697 is disposed in the latch assembly 83 configured to selectively secure the closure member 12 to a vehicle body 14 of the vehicle 10. The latch assembly 83 is disposed remotely from the actuator assembly 622.

Figure 39:
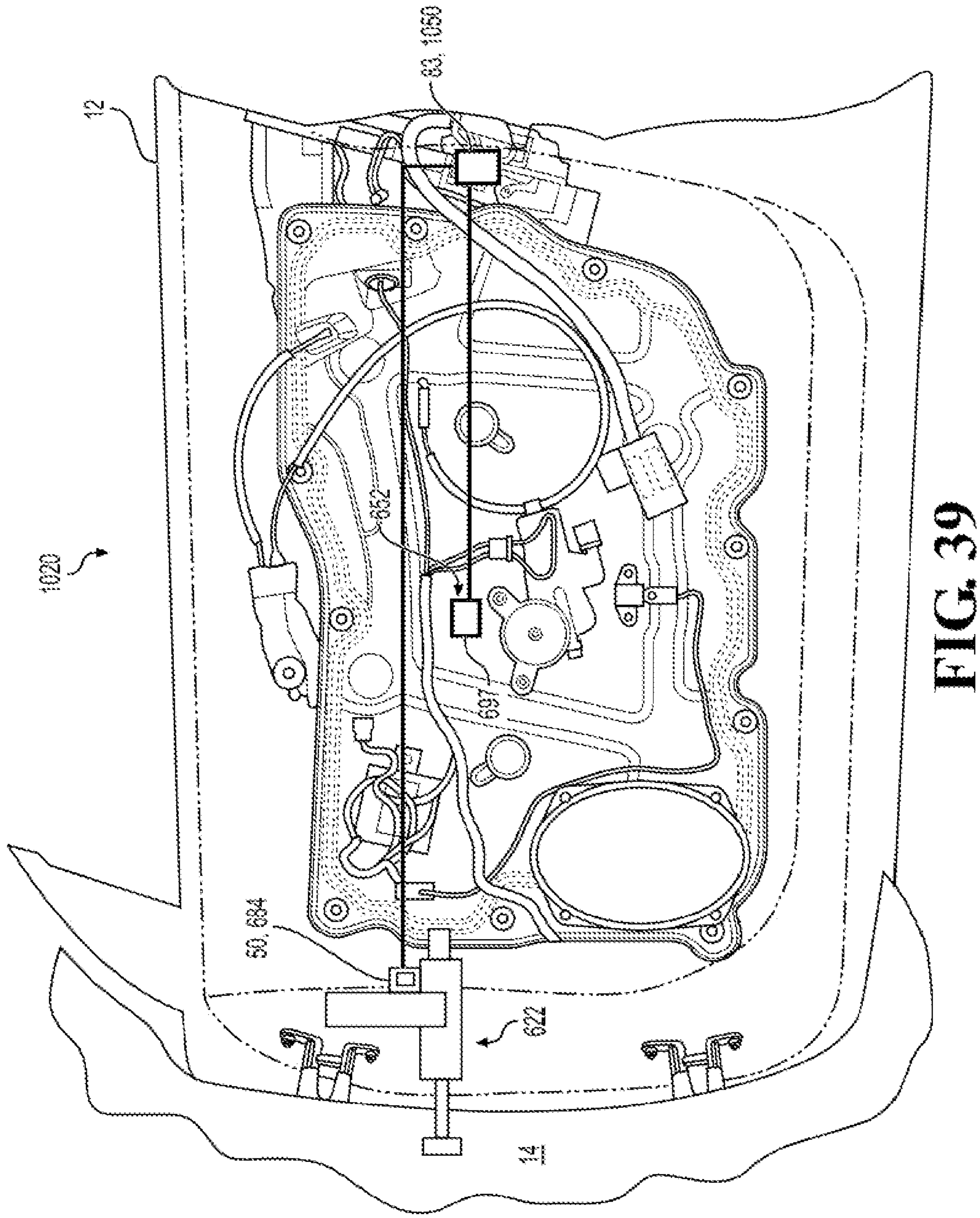
FIG. 39 shows a fifth example servo actuation system, according to aspects of the disclosure.

A fifth example servo actuation system 1020 is shown in FIG. 39. As discussed above, the actuator assembly 622 includes an actuator housing 141, 148, 184, 188, 206, 408, 422, 684 and an electric motor 36 disposed therein and configured to rotate a driven shaft 166 operably coupled to the extensible member 134. The actuator assembly 622 also includes the actuator controller 50 disposed in the actuator housing 141, 148, 184, 188, 206, 408, 422, 684 and coupled to electric motor 36. An accelerometer 697 is disposed remotely from the actuator assembly 622 and configured to detect movement of the closure member 12. As with the fourth example servo actuation system 920 shown in FIG. 38, the fifth example servo actuation system 1020 also includes the latch assembly 83 disposed remotely from the actuator assembly 622 and configured to selectively secure the closure member 12 to a vehicle body 14 of the vehicle 10. In addition, the latch assembly 83 includes a latch controller 1050 in communication with the accelerometer 697 and the actuator controller 50. The latch controller 1050 is configured to detect the movement of the closure member 12 using the accelerometer 697. The latch controller 1050 is additionally configured to command the actuator controller 50 to control the opening or closing of the closure member 12 based on the movement of the closure member 12 using the electric motor 36. So, the latch controller 1050 is another example of remote system 516 of FIG. 33. As shown in FIG. 39, the accelerometer 697 is disposed in the door node assembly 652 disposed remotely from the actuator assembly 622 and the latch assembly 83 on the closure member 12.

Figure 40:
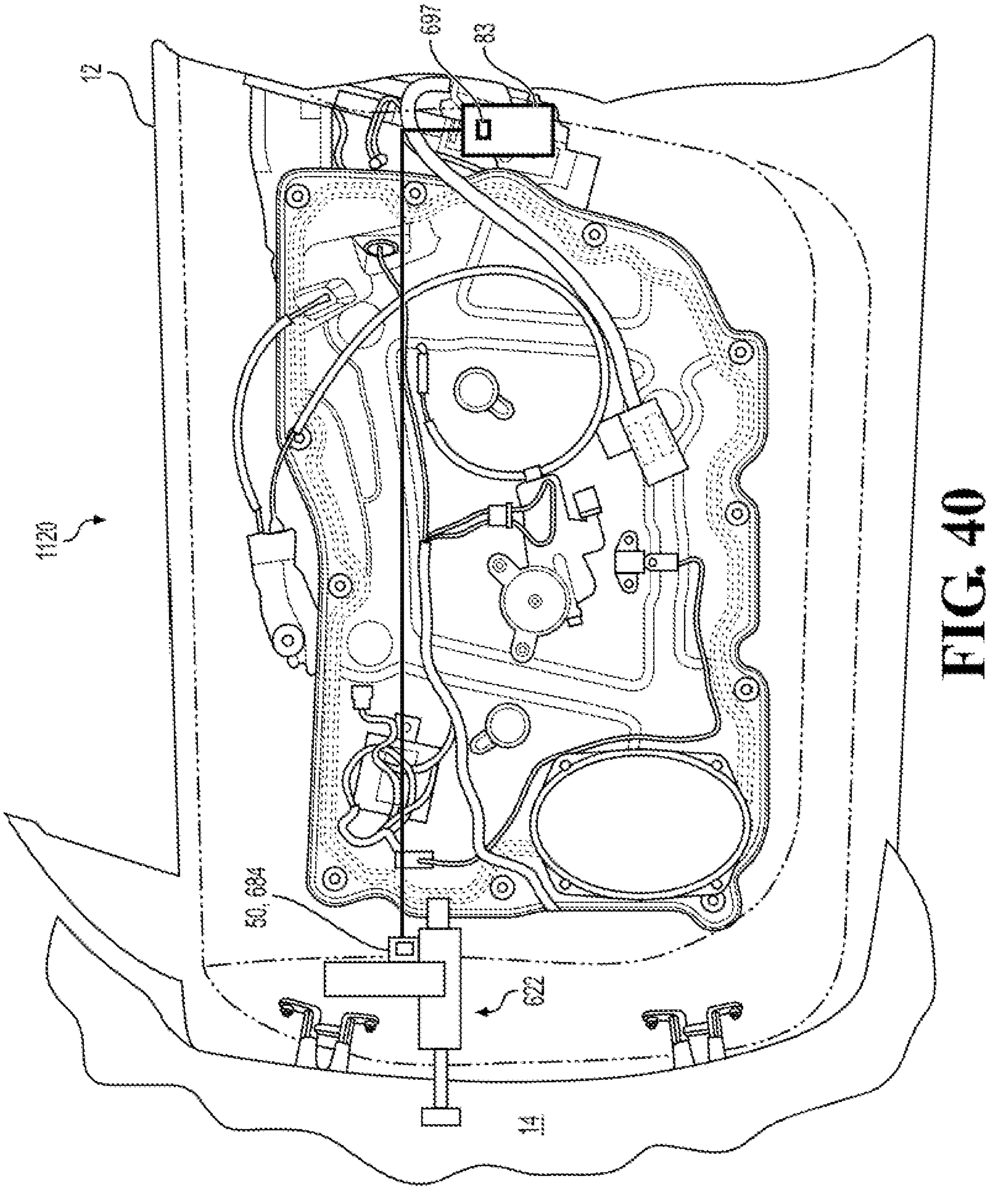
FIG. 40 shows a sixth example servo actuation system, according to aspects of the disclosure.

A sixth example servo actuation system 1120 is shown in FIG. 40. Like the fifth example servo actuation system 1020 is shown in FIG. 39, the sixth example servo actuation system 1120 includes the latch assembly 83 disposed remotely from the actuator assembly 622 and configured to selectively secure the closure member 12 to a vehicle body 14 of the vehicle 10. Yet, instead of the accelerometer 697 being disposed in the door node assembly 652, the accelerometer 697 is disposed in the latch assembly 83.

Figure 41:
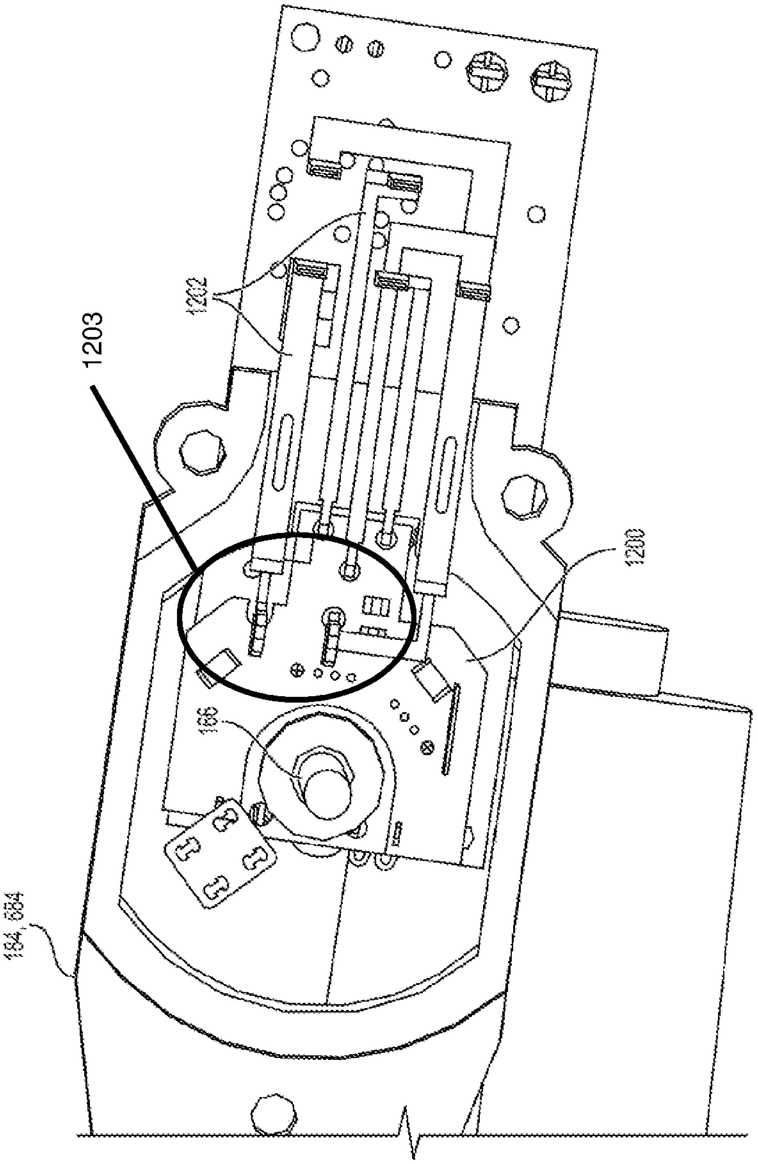
FIGS. 41-44 show an example of the sensor housing on a sensor printed circuit board and arrangements of Hall-effect sensors thereon, according to aspects of the disclosure.
Figure 42:
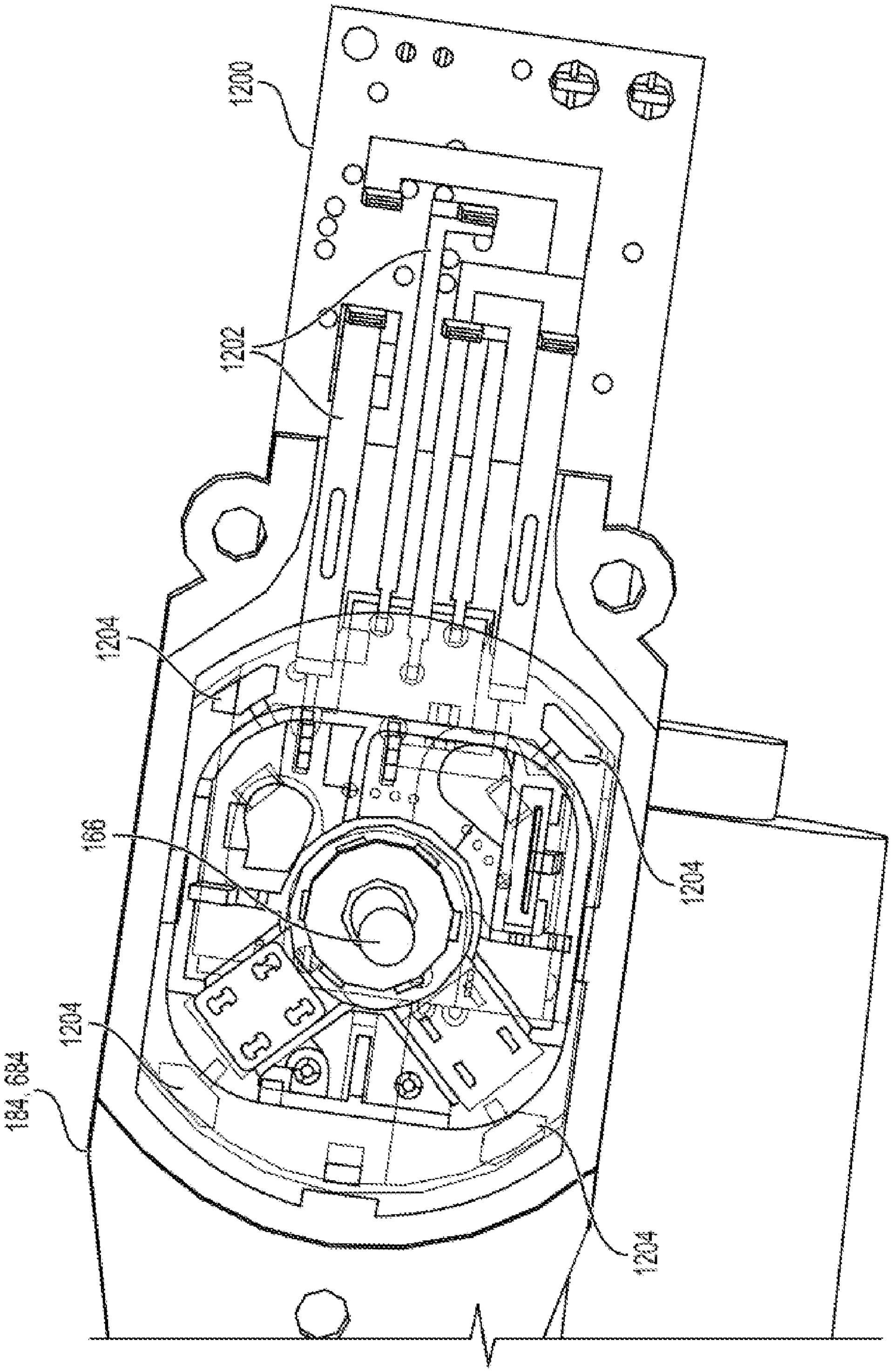
Figure 43:
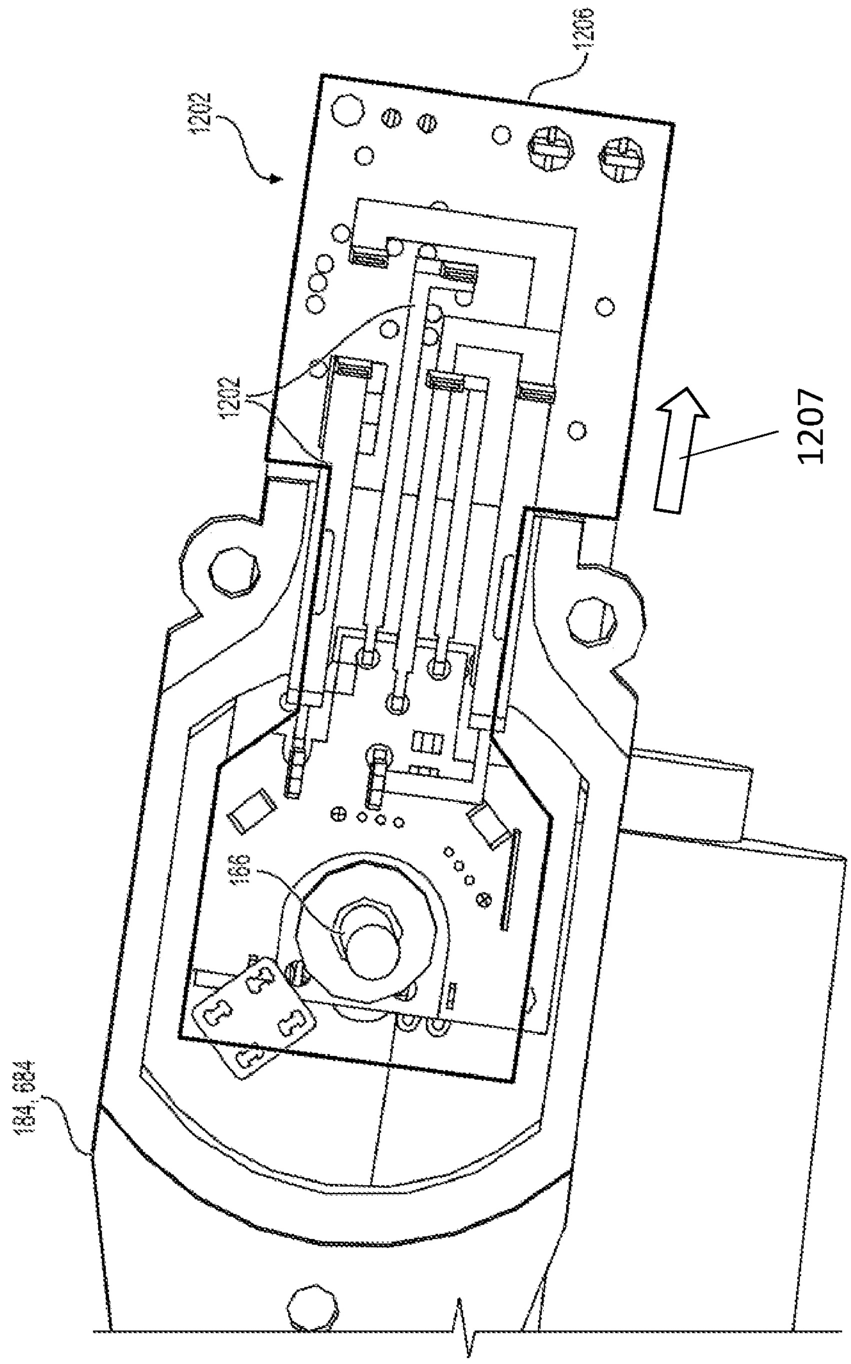
Figure 44:
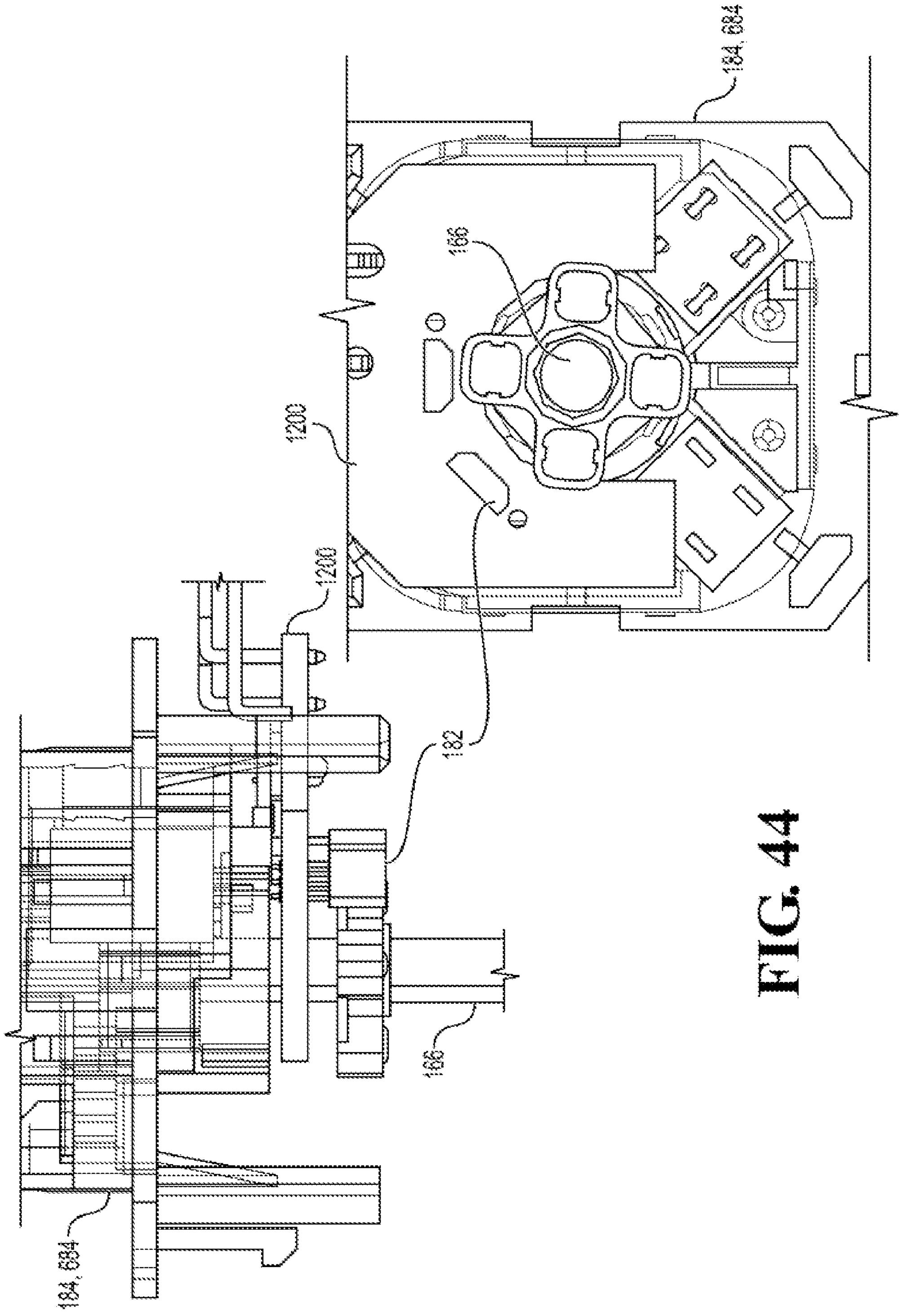

FIGS. 41-44 show an example of the sensor housing 184, 684 on a sensor printed circuit board 1200 and arrangements of the Hall-effect sensors 182 thereon. Specifically, FIG. 41 shows available real estate for the sensor printed circuit board 1200 to grow (e.g., to accommodate the actuator controller 50 and/or the accelerometer 697). So, the sensor printed circuit board 1200 with the Hall-effect sensors 182 and the actuator controller 50 and optionally the accelerometer 697 will be a rectangular board that will place the Hall-effect sensor 182 near the magnets. The Hall-effect sensor 182 interacts with the shaft 166 by being positioned in such a way that the shaft magnet will rotate above the Hall-effect sensor 182. A plurality of motor terminals 1202 are also shown and According to an aspect, the plurality of motor terminals 1202 may be symmetrical for left and right sides in the region 1203. FIG. 42 shows four mounting features 1204 used to locate the motor 36 in the gearbox (e.g., gearbox 141) to allow for the sensor printed circuit board 1200 to be cleared. FIG. 43 shows a perimeter 1206 of the sensor printed circuit board 1200 and how it can grow if required (e.g., as shown by the arrow 1207). FIG. 44 shows the arrangement of the Hall-effect sensors 182 (e.g., magnetized axially).

Figure 45:
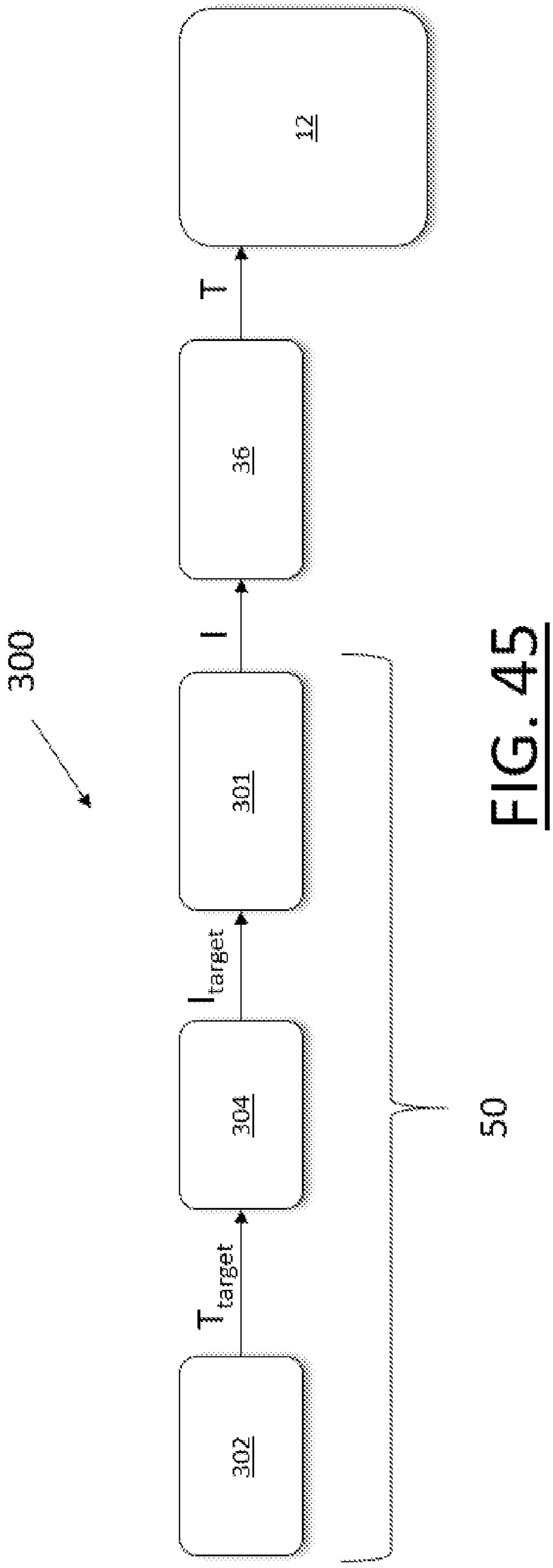
FIG. 45 is a block diagram of a control system for a power side door actuator, in accordance with aspects of the disclosure.
Figure 70:
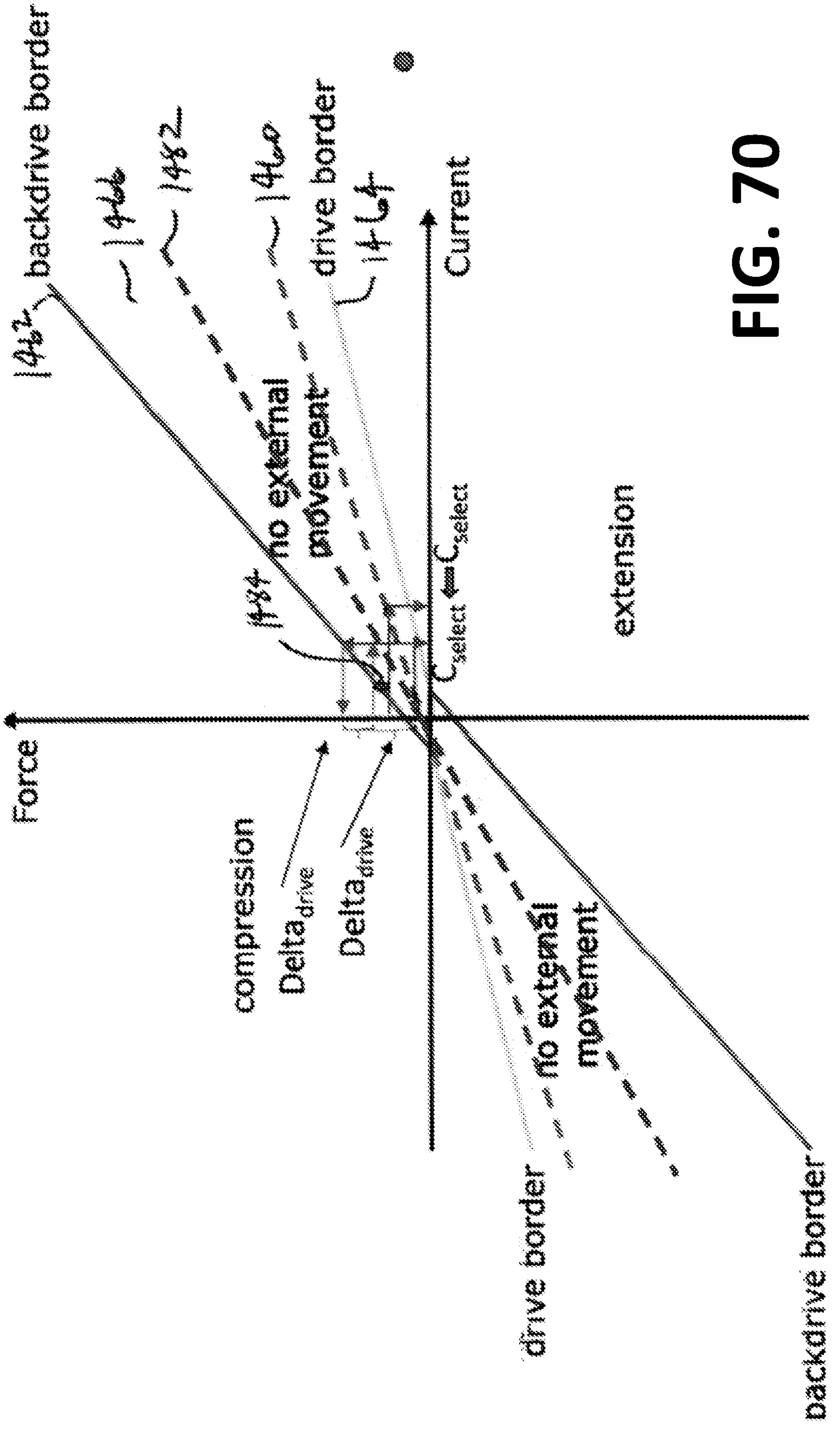

Now further referring to FIG. 45, there is shown a configuration of controller 50 configured for controlling the motor 36 using a closed loop current feedback motor control system 301 to supply the motor 36 with a drive current I. Controller 50 may also include a haptic controller 302 configured for implementing a haptic control algorithm configured for determining a value of a target torque $T_{target}$ the motor 36, as controlled by the closed loop current feedback motor control system 301, will apply to the door 12 (for example, a force compensation applied to the door 12 by the motor 36). The target torque $T_{target}$ is an example of a target force the haptic control algorithm is configured to determine when the frame of reference for door motion control is the pivot axis of the door as shown in FIG. 70 of the '521 Patent. Other frames of reference for determining a force value or torque value with which to base control of the power actuator 122 to assist with door motion is possible. Types of closures panels to be moved by the actuator 122 may also include frunk panels, liftgates, slides doors, hinge-based doors (e.g. four-bar hinges), as but non-limiting examples. Haptic control algorithm 302 may be implemented for example as module or unit of the motor controller system 50 configured for providing, such as by calculating, a compensation value or factor, such as a torque value, a current value, or a force value as but non-limiting examples, to compensate or negate, either partially, substantially or wholly negate, for external influences acting on the motion of the door 12. Haptic control algorithm may be implemented for an example as module or unit of the another vehicle system, such as a Body Control Module or "BCM" as one example. Haptic control algorithm 302 may be integrated into other type of vehicle systems or products, such as for example, a door control node for a side door or a liftgate, a latch assembly, or part of a standalone door actuation control module, as but non-limiting examples. Haptic control unit 302 may be comprised of hardware and/or software for executing a control algorithm, illustratively as a superposition algorithm outputting a result of a summation of a plurality of force blocks each outputting a target compensating torque value to be provided to the closed loop current control system 301. Such calculated torque value is intended to be the actual torque force which is applied to the door by the power actuator 122 with which the door motion will be controlled. One example of a haptic control algorithm is shown in United States patent application No. 20220243521 titled "A power closure member actuation system", (herein after referred to as the '521 Patent) the entire contents of which is incorporated herein by reference. Other types of control algorithms may be implemented with the control systems described herein. For example, haptic controller 302 may be adapted to execute a haptic control algorithm including a summation of a plurality of torque values from a plurality of torque calculations by a summer that outputs the target force as a target torque to the closed loop current control system 301, where the closed loop current control system 301 is adapted to convert the target torque into a target current for use by the closed loop current control system for generating the drive current I. The supplied torque value generated by the haptic control unit 302 may be provided to a drive unit 304 for conversion into a target current value in a manner as will be described in more detail hereinbelow.

The haptic control algorithm 302 may be implemented as code stored in a memory module for execution by a microprocessor device. For example, in one possible configuration, haptic control algorithm may be implemented as executable instructions stored in a memory device forming part of a distributed memory system which when executed by a processing device calculates or determines the target torque $T_{target}$. For example, the memory device could be a RAM or a ROM and the processing device a microprocessor which may be integrated as part of a dedicated controller unit on a first printed circuit board provided at a location on the vehicle body for example, or may be implemented as part of another controller structure, such as a door node controller, or a Body Control Module ("BCM"), or a centralized door control system controller, or at a decentralized door control system controller, all as but non-limiting examples, for sharing existing hardware and memory devices also configured to execute other control functions.

With reference to FIG. 45, the output of the haptic control algorithm 302 is provided to a drive unit 304. Drive unit 304 may be provided that is configured to convert the torque value outputted by the haptic control algorithm 302 into a value of a target current $I_{target}$ (e.g., using a proportional conversion) for input into the closed loop current feedback motor control system 301. Controlling the motor 36 using a current control approach as will be described in more details below provides for the selection of a target force value, or target torque by the haptic calculator, is converted into an actual force or torque application to the vehicle door without deviations from the calculated force/torque value. An example of the haptic control algorithm 302 is described in WO2021081664A1 entitled "Powered door unit optimized for servo control", the entire contents of which are incorporated herein by reference. In a possible configuration control system 301 may be provided as an integral unit along with the drive unit 304 forming along with the drive unit 304 a motor controller 308. For example instructions and hardware associated with closed loop current feedback motor system 301 and drive unit 304 may be supported on a second printed circuit board provided at a location on the vehicle door for example, such as part of a latch assembly, a door node, or integral part of the power actuator 122 as but non-limiting examples.

So, closed loop current feedback motor control system 301, haptic control algorithm 302, drive unit 304, and motor 36 may work together as part of a motor control system 300 for controlling motion of a door 12. In more detail, the system 300 can include the motor 36 for moving the door 12. The system 300 can also include the closed loop current control system 301 controlling the drive current I provided to the motor 36 for controlling the motor 36 to apply a torque T to the door 12. The system 300 also includes the haptic control algorithm 302 configured for calculating a target torque $T_{target}$ to be provided to the closed loop current control system 301. The closed loop current control system 301 controls the drive current I based on the target torque $T_{target}$. So, fast response times and accurate torque response when driving the motion of the door 12 are achieved by using the closed loop feedback system 301. Desired torque to be applied on the door 12 by the motor 36 is achieved by the closed loop feedback system 301, such that target torque input $T_{target}$ is converted into the target current value $I_{target}$ and then drive current I to control the motor 36.

Controlling the motor 36 using a closed loop current feedback motor control system 301 receiving a control command calculated based on torque values improves the performance of the door control by the motor 36. Since the drive current I provided to the motor 36 is controlled via the closed loop feedback system 301, and since drive current I is proportional to motor torque output T (or alternatively considering from a reference point of a user causing a torque input on the motor 36 via the user moving the door 12, whereby the motor 36 will act as a torque input generator to proportionally modify the drive current I), controlling the drive current I based on the target torque input $T_{target}$ will result in an accurate conversion of the target compensation torque T applied to the door 12 by the motor 36 through control of the drive current I.

Figure 46:
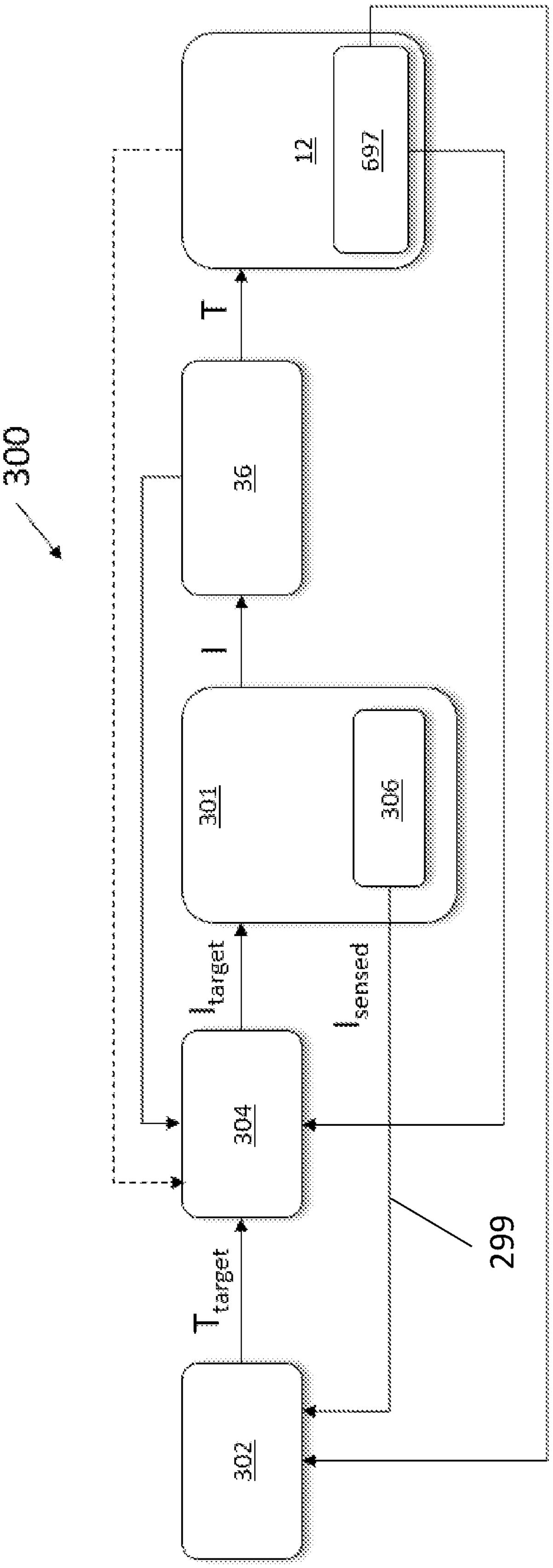
FIG. 46 is a block diagram of the control system of FIG. 45, further illustrating sensing systems, in accordance with aspects of the disclosure.

Now further referring to FIG. 46, there is shown a block diagram illustrating various sensors provided to the various control blocks of the motor control system 50. The system 300 also includes a current sensor 306 for detecting a sensed current $I_{sensed}$ flowing in the motor 36. The haptic control algorithm 302 is further configured to receive the sensed current $I_{sensed}$ via a signal line 299 shown in FIG. 46 and use the sensed current $I_{sensed}$ to calculate the target torque $T_{target}$. Thus, the current sensor 306 providing accurate torque values to the haptic control algorithm and an accelerometer 697 (and door position sensors 144, 182 discussed above and in more detail below) are provided for operating the closed loop current feedback motor control system 301.

Specifically, the accelerometer 697 may provide more sensitive sensing of door motion, while the door position sensors 144, 182 may be provided to offer reliability of door position and motion to the system 50. In other words, an accelerometer sensitivity of the accelerometer 697 is greater than a position sensitivity of a door position sensor 144, 182, such that the accelerometer 697 detects motion that is not detectable by the door position sensor 144, 182. Therefore, different sensors 144, 182, 697 may provide accurate, reliable, and sensitive data for providing feedback of door motion in control system 300.

So, the force based control of the motor 36 will be improved by using the current sensor 306 (e.g., a shunt resistor configuration to provide a low noise current signal I) detecting the current from the motor 36 through the return feedback branch of closed loop current feedback motor control system 301 for example, directly measuring the current running through the motor 36 as modified by the user pushing on the door 12 to cause the motor 36 to act as a generator provides a derivable torque value for use by the haptic control algorithm 302. By monitoring the drive current I directly, the haptic control algorithm 302 can be inputted a precise input torque (via the proportional to the sensed current $I_{sensed}$) applied by the user on the door 12. Compared to other types of sensors such as door position sensors or accelerometer 697, such sensors cannot detect the force input on the door 12 and would require a transfer function to translate the position or motion signals into an approximate force value. By detecting the sensed current $I_{sensed}$ flowing through the motor 36, since such drive current I is proportional to the torque T of the motor 36, such detected or sensed current $I_{sensed}$ can be fed back to the haptic control algorithm 302 to modify the target torque $T_{target}$ to be provided to the drive unit 304. According to an aspect, to ensure that the current feedback motor control system 301 does not act against a user manually moving the door 12, the drive unit 304 also considers sensed bidirectional motor current $I_{sensed}$ and adjusts or modifies the target current value $I_{target}$ accordingly. Specifically, changes in current $I_{sensed}$ are fed back to the drive unit 304 for determining if the user is moving the door 12 during current control mode to adjust $I_{target}$ so as not to drive the motor 36 against the motion imparted by the door 12 by the user. In Since the haptic control algorithm 302 performs calculations in terms of torque values, and the detect motor current can be easily translated into torque values to be used by the haptic control algorithm 302, other sensors such as position sensors, accelerometer 697 in comparison which require complex conversions from position/velocity/acceleration data into torque, may also further be unable to provide data or accurate data to extract force acting on the door 12 for use by the haptic control algorithm 302. Therefore, using a closed loop current feedback motor control system 301 where the current in the feedback line from the motor 36 is sensed to be used by the haptic control algorithm 302 to provide data that is correlated to the exact torque the user is applying to the door 12, results in a precise torque output target $T_{target}$ from the haptic control algorithm 302 to be supplied to the drive unit 304 which the closed loop current feedback motor control system 301 will in turn use to adjust the motor torque acting on the door 12 and which will be sensed by the user. Therefore, the force of the user acting on the door 12 can be precisely compensated by the haptic control algorithm 302 since the user's force can be precisely detected by detecting the motor current proportionally correlated to the torque applied to the door. In addition, because the drive unit 304 also can consider readings by the accelerometer 697, motor 36, and door position sensors 144, 182, increased sensitivity/resolution to movements of the door 12 by a user are provided compared to the using a position signal alone, thereby providing faster system response.

Figure 47:
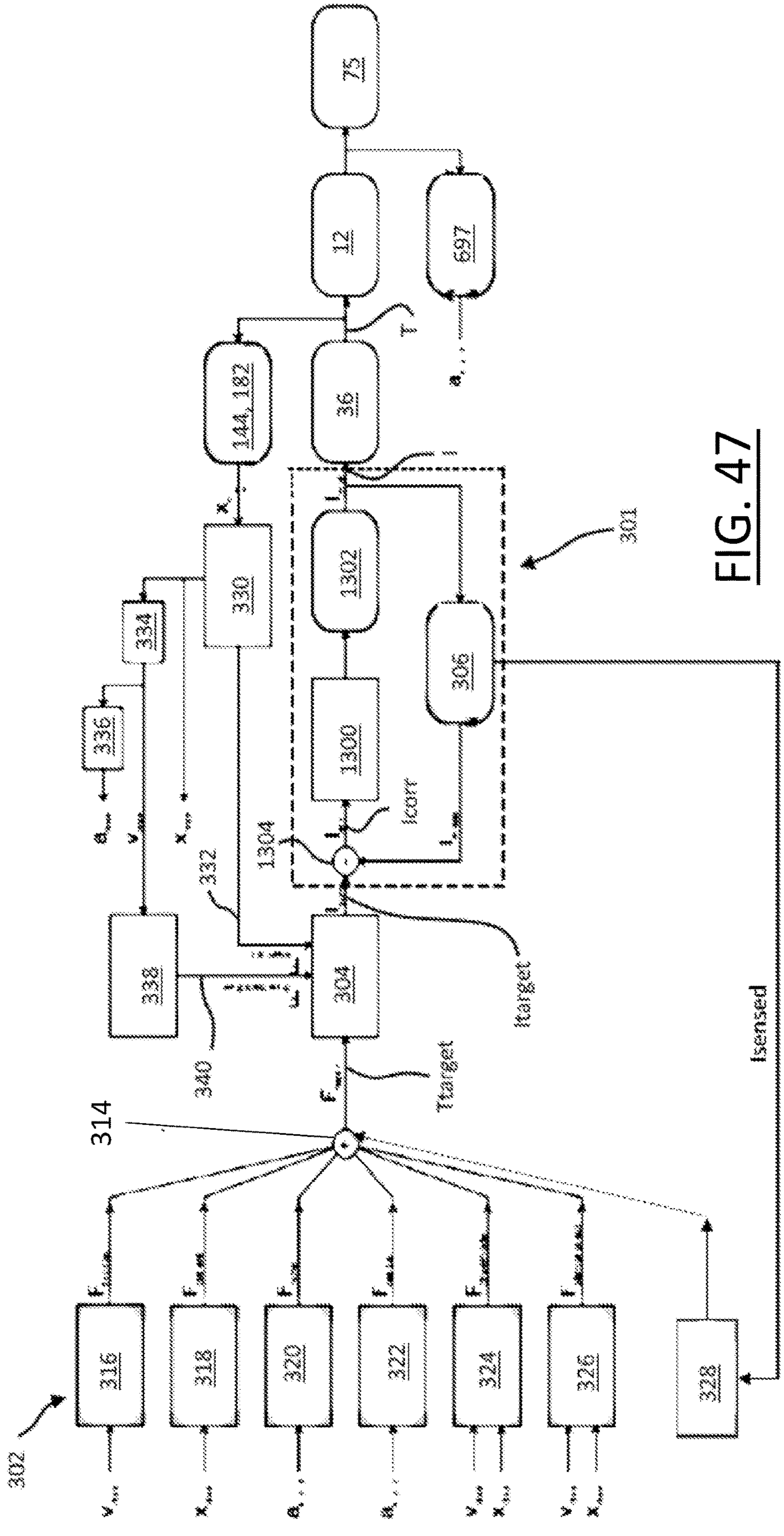
FIG. 47 is a schematic diagram of the control system of FIG. 45, in accordance with aspects of the disclosure.
Figure 48:
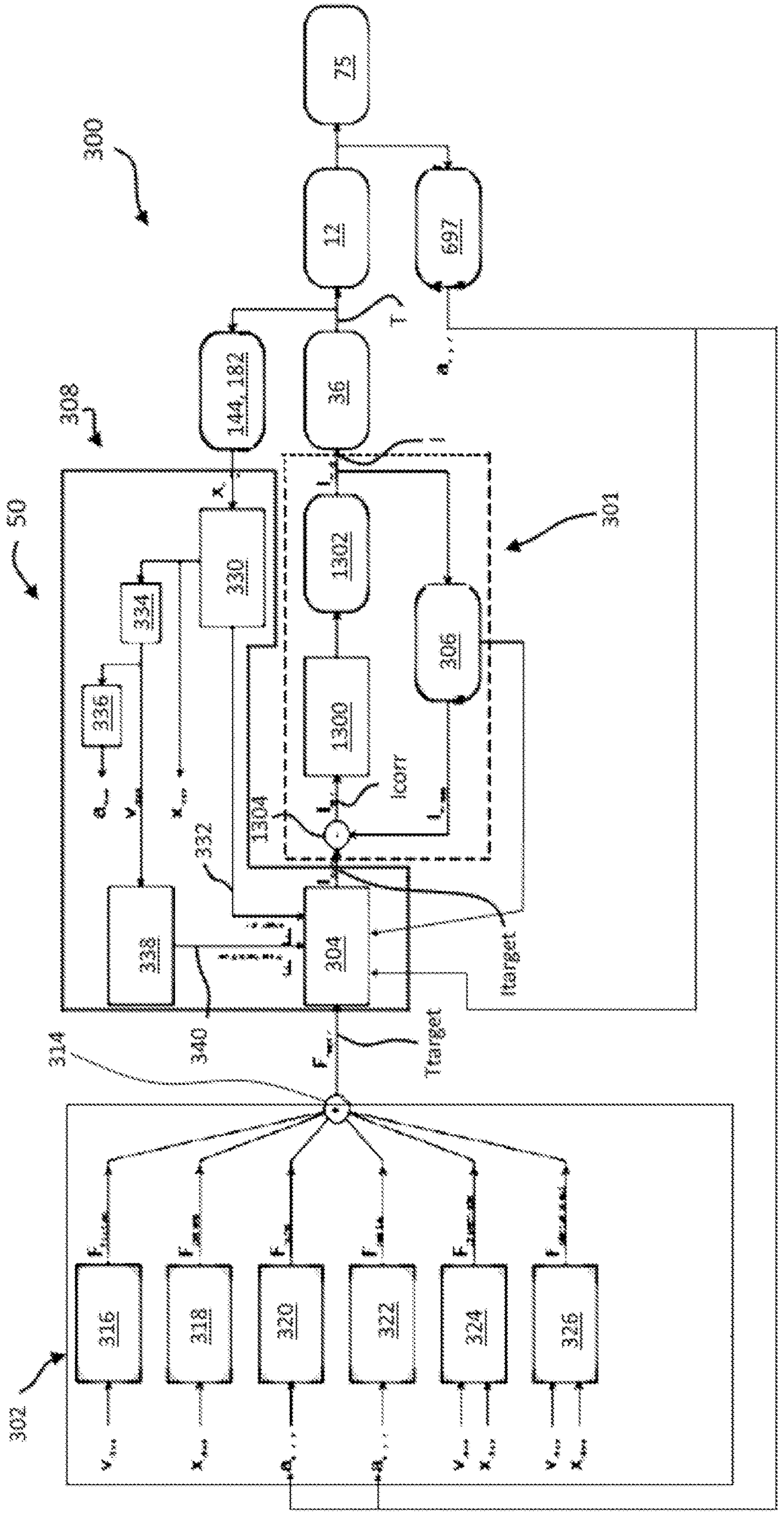
FIG. 48 is a schematic diagram of the control system of FIG. 46, in accordance with aspects of the disclosure.

Now further referring to FIG. 47 and FIG. 48, the closed loop current feedback motor control system 301 and the motor controller 308 comprising the drive unit 304 and the closed loop current feedback motor control system 301 may be distributed in various manners as shown in FIG. 49 to FIG. 55. Separation of the haptic control algorithm 302 from the motor controller 308 and the closed loop current feedback motor control system 301 provides for separation of control component between components which are dynamic, for example which require more frequent updates, maintenance, tuning, from those components which are static, for example those which do not require updates, or maintenance. For example, the haptic control algorithm 302 can be updated regularly with new functions, modules, and control features depending on the vehicle application, or depending on subsequent tuning of the system, or with additional improvements in the algorithm, and following installation of the system into the vehicle. For example, the haptic control algorithm 302 may be updateable through the update functions of the Body Control Module. Closed loop current control system 301 may have associated units or modules represented in computer-executable instructions stored in a memory system having previously written memory that cannot be subsequently overwritten (e.g. such memory may be write protected, encrypted or encoded, or not accessible to an Original Equipment Manufacturer), while the haptic controller 302 may have associated units or modules represented in computer-executable instructions stored in the memory system having previously written memory that can be subsequently overwritten, for example by Original Equipment Manufacturer through a dedicated interface port, or through the software interface ports of the Body Control Module. Similarly, drive unit 304 may have associated units or modules represented in computer-executable instructions stored in a memory system having previously written memory that cannot or can be subsequently overwritten. In one possible embodiment, only the memory associated with the haptic control algorithm 302 may be overwritten allowing a customization of the haptic control algorithm 302 after installation to the particular vehicle the system is being installed therewith, while the memory associated with the closed loop current control system 301 and/or the drive unit 304 cannot be overwritten since the control of the power actuator 122 using the closed loop current control system 301 and the drive unit 304 may be independent from the actual installation environment of the power actuator 122 and tuned prior to installation of the system into the vehicle. As a result the haptic control algorithm 302 may be provided as part of a centralized vehicle controller, such as the BCM 52 (FIG. 55), which is configured for ease of upgradability, such as via flashing or uploading as part of a regular system update, or as part of a dedicated update of the haptic control algorithm 302. So, the haptic control algorithm 302 can be provided as part of the centralized vehicle controller (e.g., BCM 52) not in the door 12, while the closed loop current control system 301 can be provided within the door 12. Furthermore, the haptic control algorithm 302 may involve computationally intense computations requiring access to a powerful processor, and as a result the haptic control algorithm 302 may be distributed into the distinct memory of separate main vehicle controller comprising such a powerful processor also used for controlling other system e.g. such as a ADAS system. Whereas low level feedback motor control system 301 and motor controller 308 may be static and not require regular or any updates, and may be provided in less accessibly parts of the vehicle 10. For example, if the motor controller 308 is provided in a power side door actuator unit 622, an updating communication port may be removed as compared to if the haptic control algorithm 302 is also provided with the power side door unit 622. In addition, the closed loop current control system 301 may comprise a memory unit that cannot be overwritten or updated, while the haptic control algorithm 302 comprises a memory that can be overwritten.

Referring specifically to FIG. 47, the accelerometer 697 provides an acceleration signal $a_{x,y,z}$ to at least one of the closed loop current control system 301 and the haptic control algorithm 302. The haptic control algorithm 302 includes a summation of a plurality of forces from a plurality of force calculations 316, 318, 320, 322, 324, 326, 328 by a summer 314 that outputs the target torque $T_{target}$ to the drive unit 304. The plurality of force calculations include a friction force calculation 316 that receives a velocity of the door 12 $V_{door}$ input and outputs a friction force $F_{friction}$, a detent force calculation 318 that receives a position of the door 12 $X_{door}$ input and outputs a detent force $F_{detent}$, an incline force calculation 320 that receives the acceleration signal $a_{x,y,z}$ input and outputs an incline force $F_{incline}$, an inertia force calculation 322 that receives the acceleration signal $a_{x,y,z}$ input and outputs an inertia force $F_{inertia}$, a drive mode force calculation 324 that receives the position of the door 12 $X_{door}$ and the velocity of the door 12 $V_{door}$ input and outputs a drive mode force $F_{drivemode}$, a slam protect force calculation 326 that receives the position of the door 12 $X_{door}$ and the velocity of the door 12 $V_{door}$ input and outputs a slam protect force $F_{slamprotect}$, and a user input torque force calculation 328 that receives the sensed current $I_{sensed}$ input from the current sensor 306 and outputs a user input torque force $F_{userinput}$. So, according to an aspect, the same accelerometer 697 can be used to determine vehicle inclination and can also be used for door inertia.

The door position sensors 144, 182 are coupled to a kinematic block 330 configured to receive the position of the door 12 $X_{door}$ and output a first force input 332 to the drive unit 304. Kinematic block 330, as an example of a compensating block or unit for internally generated factors to the power actuator assembly 122, may be adapted to provide a signal resulting from a calculated kinematic compensation force value, which may be a torque value for example, to the drive unit 304 to vary the target current $I_{target}$ to compensate for any variations in the actuator characteristics tending to cause a deviation of the actual motor torque output T from the target torque $T_{target}$. One example kinematic of the power actuator 122 that the kinematic block 330 is adapted to compensate for is the moment arm of the power actuator 122. Kinematic unit 330 may be configured for calculating a kinematic compensation force to be supplied to the drive unit 304. Signals from the door position sensors 144, 182 are transmitted to the haptic control algorithm 302 and the drive unit 304. Without such door position information, the drive unit 304 may not be able to properly track movement of the door 12, and the compensation algorithms may not be certain of the data being received. The kinematic block 330 is also coupled to a first differentiator 334 configured to mathematically differentiate the position of the door 12 $X_{door}$ and output the velocity of the door 12 $V_{door}$. The first differentiator 334 is then coupled to a second differentiator 336 configured to mathematically differentiate the velocity of the door 12 $V_{door}$ and output an acceleration of the door 12 $a_{door}$. The velocity of the door 12 $V_{door}$ is received by a backdrive block 338 that is configured to receive the velocity of the door 12 $V_{door}$ and output a second force input 340 to the drive unit 304. The backdrive block 338, as an example of a compensating block or unit for internally generated factors of the power actuator assembly 122, may be adapted to provide a signal resulting from a calculated drive/backdrive compensation force value, which may be a torque value for example, to be supplied to the drive unit 304 to vary the target current $I_{target}$ to compensate for any variations in the actuator characteristics tending to shift the motor torque output T from the target torque $T_{target}$. Backdrive block 338 may be implemented as a system model stored in a memory. The system model of backdrive block 338 may be based on a precalibration of the geartrain assembly stored in a memory. One example characteristic of the power actuator 122 that the kinematic block 330 is adapted to compensate for is the backdrive characteristics of the power actuator 122 due to gearing for example e.g. of the reduction geartrain. Kinematic block 330 may be implemented as a system model stored in memory. Kinematic block 330 may include lookup tables for outputting a force adjustment value based on the position of the door for example. The drive unit 304 receives the first and second force inputs 332, 340 and outputs the target current $I_{target}$. So, the drive unit 304 receives the torque $F_{haptic}$ input or target torque $T_{target}$ from the haptic control algorithm 302 and is a separate function that collects parameters, processes all of the variable and decides what to do to the motor 36.

The motor controller 308 is shown illustratively as adapted to compensate for internal influences capable of influencing the motion of the door 12. Internal influences may include effects on door motion attributed or originating from or associated with irregularities of the powered actuator 122, which may include but not be limited to gear train factors such as gearbox (backlash reactions, lag, slop, slack, differences in operation between a back driven direction and a forward driven direction of the powered actuator 122, loss of efficiency, as but non-limiting examples), internal friction factors due to gearing or bushing types, moment variations due to connection/mounting points of the powered actuator 122 with the vehicle body and/or vehicle door, use of a flex coupling or other types of shock absorbing couples, use of a clutch or brake mechanism, a spindle/nut interface, or other associated characteristics. Such effects may result in door motion differences in expected door motion compared to actual door motion due to the powered actuator 122 not outputting the predetermined target force value, for example received from the output of the haptic control algorithm 302 e.g. powered actuator 122 does not cause a $T_{target}$ to be applied to the door as a motor torque output T. Motor controller 308 is therefore configured to generate a control signal provided to the motor 36 that is varied or adjusted to counteract any internal influences or effects attributed to the power side door actuator 122. Therefore a system 300 for controlling the motion of a door 12 is provided that illustratively includes a power side door actuator 122 comprising a motor 36 for generating an output force for moving the door 12, and a motor controller for controlling the motor 36 at a target operating parameter, for example at a target output force ($T_{target}$), wherein the motor controller is adapted to compensate for effects associated with the power side door actuator 122 that vary the force output (T) of the motor 36 compared to the target output force ($T_{target}$) such that the actual force applied to the door 12 is the same as the calculated target output force ($T_{target}$). For example, if the motor 36 is intended to be controlled using a $T_{target}$ equal to 10 newton-meters such that 10 newton-meters in force is expected to be applied to the door 12, and the power side door actuator 122 has an effect tending to cause a difference between the force command value and the actual force output, for example the actual force imparted by extensible member 134 acting on the vehicle body to move the door as described herein above is actually 9.5 newton-meters, that is 0.5 newton-meters than the calculated target force. Such difference may be due to for example internal friction causing the actual motor output T to be reduced by 0.5 newton-meters, the controller is adapted to adjust the $T_{target}$ from 10 newton-meters to 10.5 newton-meters, such that the output motor force applied to the door 12 is equal to the expected output force acting on the door of 10 newton-meters (10.5 newton-meters−0.5 newton-meters). As another example due to power side door actuator 122 operating inefficiencies/irregularities due to back drive operation and forward drive operational differences (for example due to the geartrain), requiring the motor 36 to be operated differently when controlled in either the backdrive direction or the forward drive direction as determined by block 338, the controller, for example drive unit 304 is adapted to adjust the $T_{target}$ to overcome the loss of efficiency when the power side door actuator 122 is operated in the back drive direction, such that actual motor output T matches $T_{target}$. Providing a compensation for the internal irregularities of the power side door actuator 122 allows the system to properly respond to the user's touch on the door 12 by providing an appropriate haptic force sensation/response to the user. Since the human touch has a high tactile sensitivity, compensating for power side door actuator 122 irregularities, even if minor so as not to be visually noticeable provides an improved experience to the user moving the door 12 through constant haptic interaction e.g. touch. Internal irregularities of the power side door actuator 122 cause the actual operation of the actuator, such as for example actual output of the power side door actuator 122 to move the door with a target force to deviate from a desired or intended output of the power side door actuator 122 as determined by the control system of the power side door actuator 122. For example the actual output of the actuator may be the actual output force applied to the vehicle door. Such discrepancies between the intended force acting on the door to move the door and the actual force acting on the door may be due to single or multiple cumulative irregularities of the power side door actuator 122 which may include irregularities caused by internal friction or inertia, irregularities caused by geartrain characteristics such as differences in backdrive versus forward drive responses of a geartrain, slop or slack in the geartrain, irregularities caused by moment arms of power side door actuator 122 due to mounting configurations which causes a change in force output acting on the door depending on door position for example, irregularities in usage or wear of the actuator 122 over time caused by degradation of internal components, irregularities in response due to the actuator temperature, as but non-limiting examples. Such irregularities may cause delays or lag in response times in response to the application of a force on the door for moving the door triggering the haptic motor control, as well as a difference in targeted force actually acting on the door by the power side door actuator 122, and differences in door motion depending on the direction of motion of the door e.g. towards the closed position or the open position, for example. Through mitigation or reduction or elimination of such irregularities, the quality of door interaction by a user may be enhanced. As the user may be in constant touch interaction with the door during its door operation, by compensating for such irregularities of power side door actuator 122, the user experience through the sense of touch may be improved by reducing noticeable sensations due to force assist during operation of the door, including perceived jerkiness or shuttering of the door during initial activation of the power side door actuator 122 or change in directions of the door, differences in force assist magnitude during opening versus closing direction, differences in force assist magnitude during a single opening direction, differences in force assist magnitude during transition between opening and closing direction, differences in force assist magnitude depending on environmental operating conditions of the power side door actuator 122, a degradation in force assist depending on the age of the power side door actuator 122, all as but non-limiting examples. Irregularities may be inherent in the components and configurations of the power side door actuator 122, which may be static and not change over time, or may be dynamic and change over time. Further irregularities may vary based on external factors affecting the actuator, such as environmental temperature, and door position, as examples.

The closed loop current control system 301 includes a motor block 1300 connected to an H-bridge block 1302. A subtractor 1304 subtracts the sensed current $I_{sensed}$ from the current sensor 306 from the target current $I_{target}$ to output a corrected current $I_{corr}$ to the motor block 1300. The motor block 1300 and H-bridge block 1302 are configured to convert the corrected current $I_{corr}$ to the drive current I which is sensed by the current sensor 306. Motor block 1300 illustratively implements a PID control function having three control terms of proportional, integral and derivative influence, for example.

Now referring specifically to FIG. 48, the kinematic block 330, first differentiator 334, second differentiator 336, back-drive block 338 and drive unit 304 comprise the motor controller 308 of controller 50. The controller 50 can also include the closed loop current feedback motor control system 301, as shown.

Figure 49:
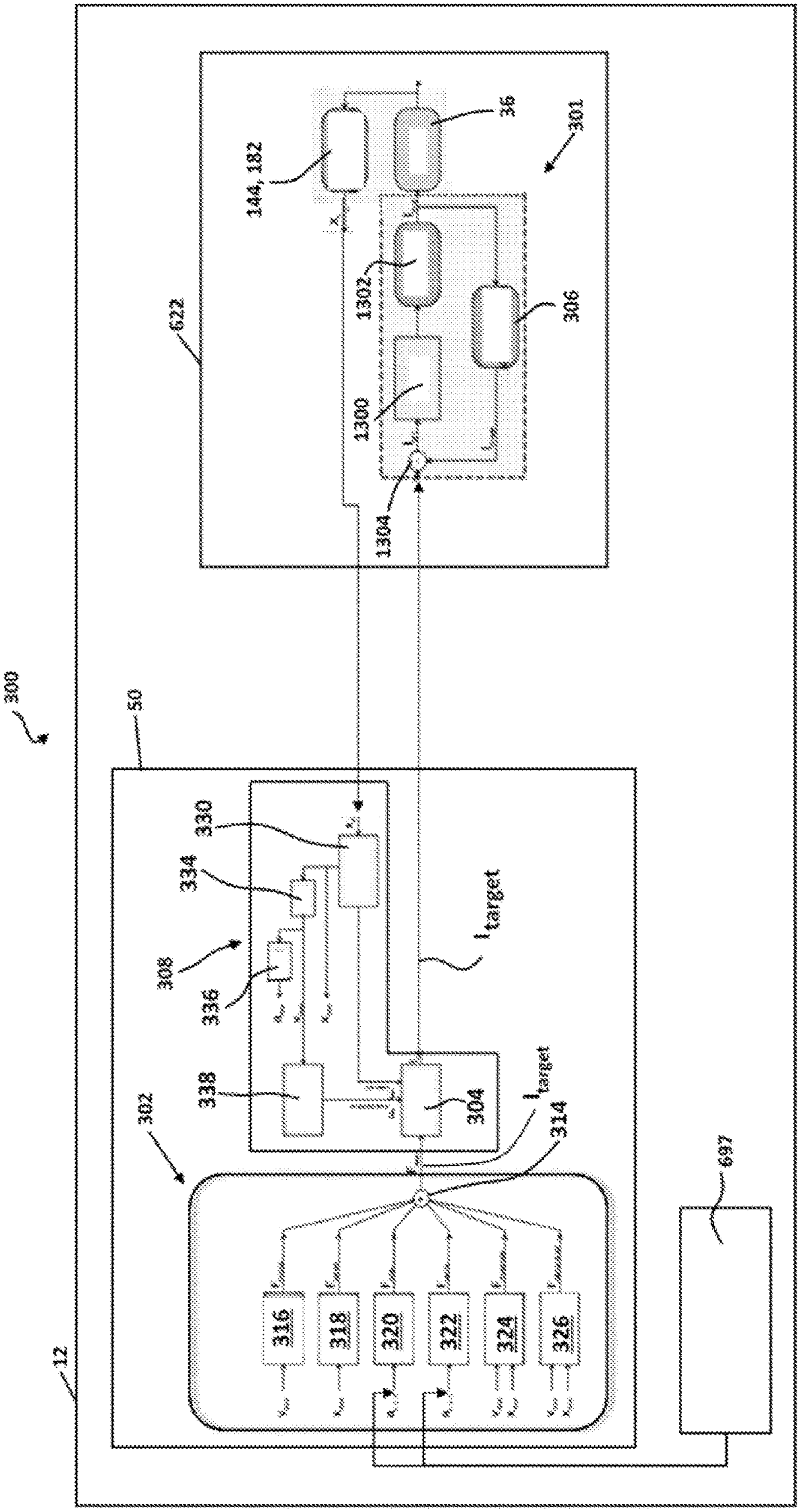
FIGS. 49 and 50 show possible distributed configurations of the components of the control system of FIG. 45, and more particularly illustrating a haptic control algorithm remote from the side door actuator unit.
Figure 50:
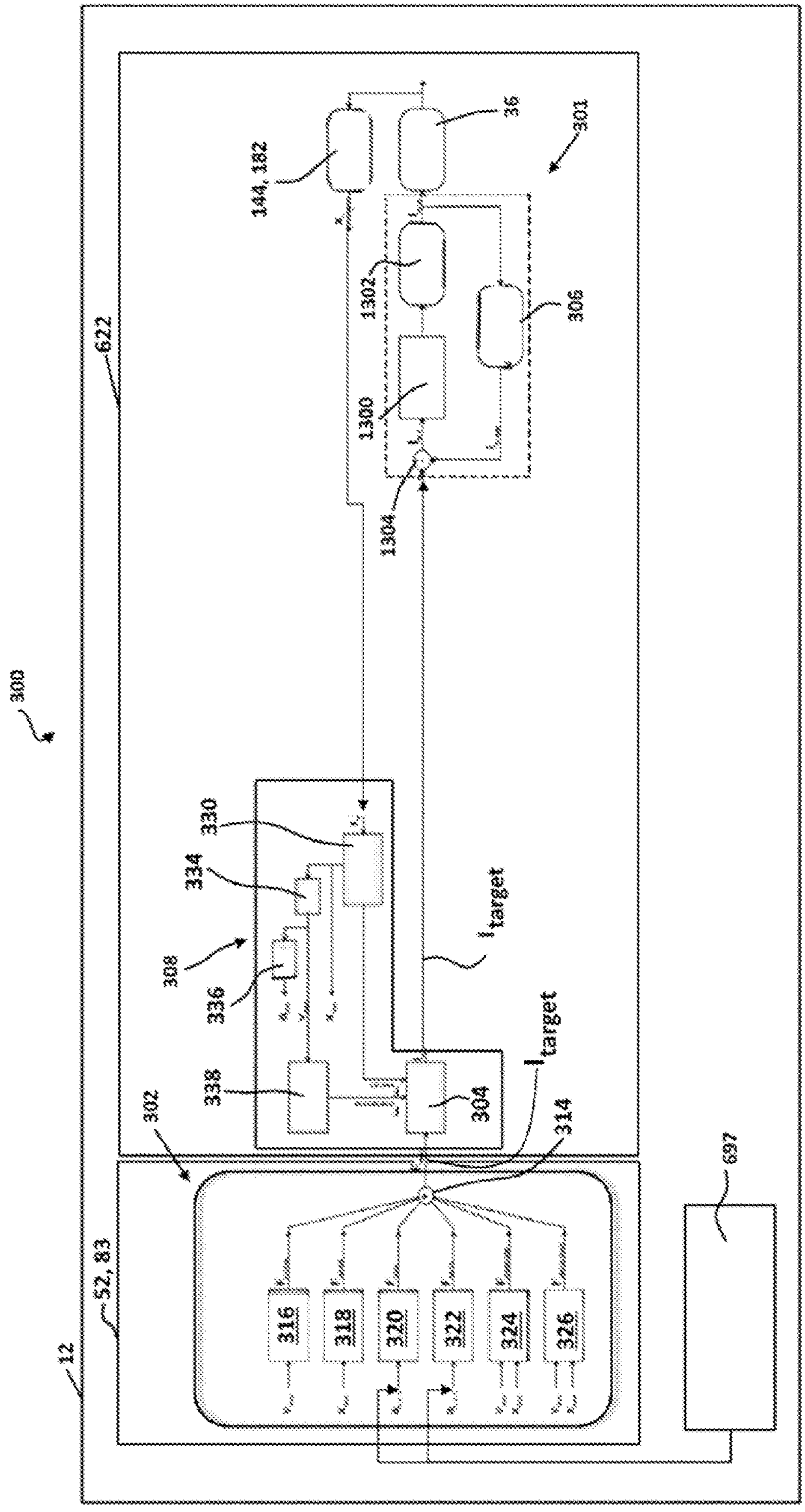
Figure 51:
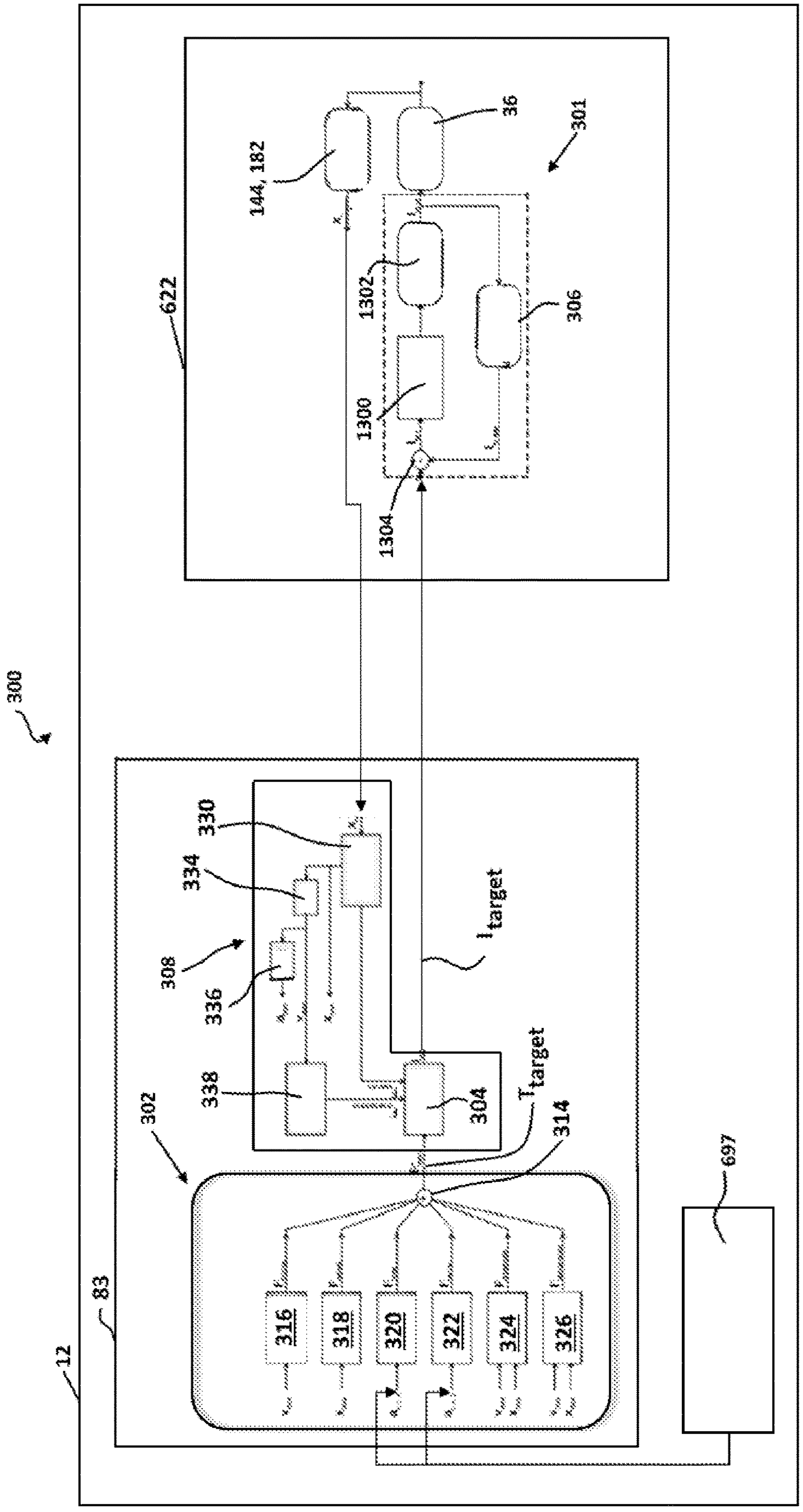
FIGS. 51 to 54 show possible distributed configurations of the components of the control system of FIG. 45, and more particularly illustrating a haptic control algorithm in a latch.

In further detail, FIGS. 49 and 50 shows the haptic control algorithm 302 provided in a remote controller (e.g., controller 50 or latch assembly 83) within the vehicle door 12, separate from the power side door unit or actuator assembly 622. Specifically, in FIG. 49, the haptic control algorithm 302 and motor controller 308 are provided in the remote controller (e.g., controller 50) within the vehicle door 12. The actuator assembly 622 includes the closed loop current feedback motor control system 301, motor 36, and door position sensor 144, 182. Also, as shown, accelerometer 697 is separate or remote from the actuator assembly 622, while still being coupled to the haptic control algorithm 302. In FIG. 50, only the haptic control algorithm 302 is provided in the remote controller (e.g., controller 50), while the actuator assembly 622 includes the motor controller 308, closed loop current feedback motor control system 301, motor 36, and door position sensor 144, 182. Again, the accelerometer 697 is separate or remote from the actuator assembly 622, while still being coupled to the haptic control algorithm 302.

Figure 52:
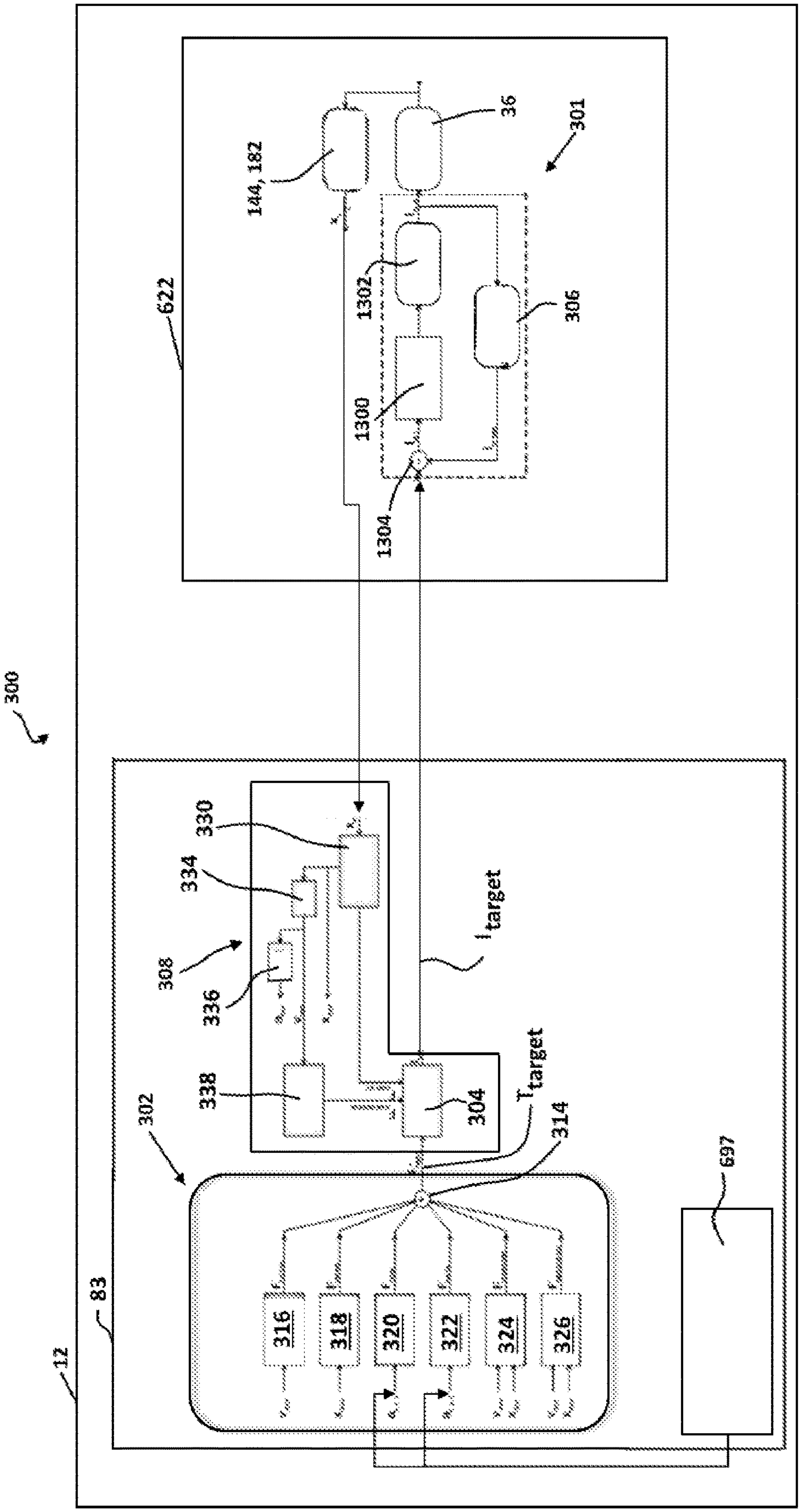
Figure 53:
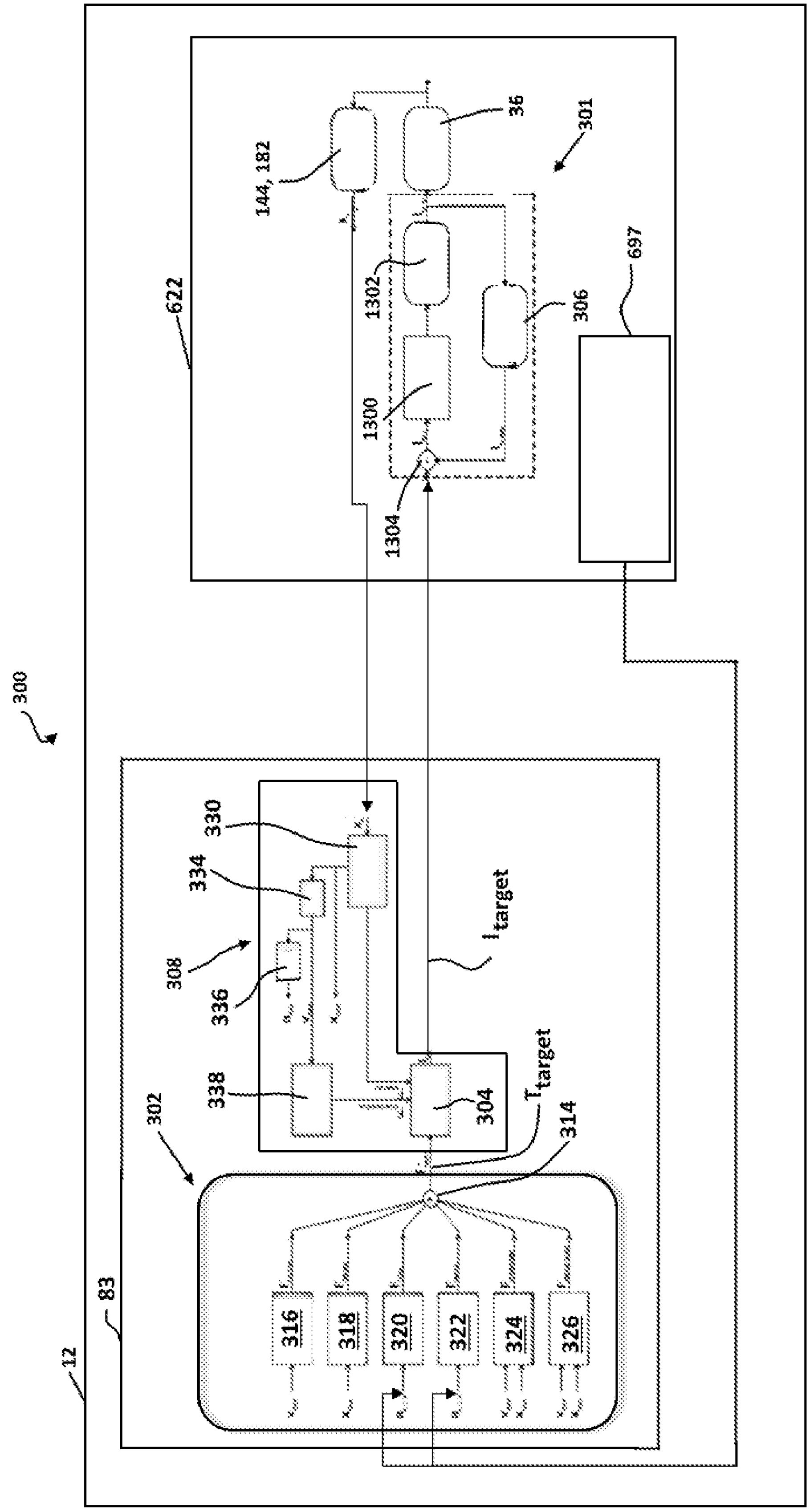
Figure 54:
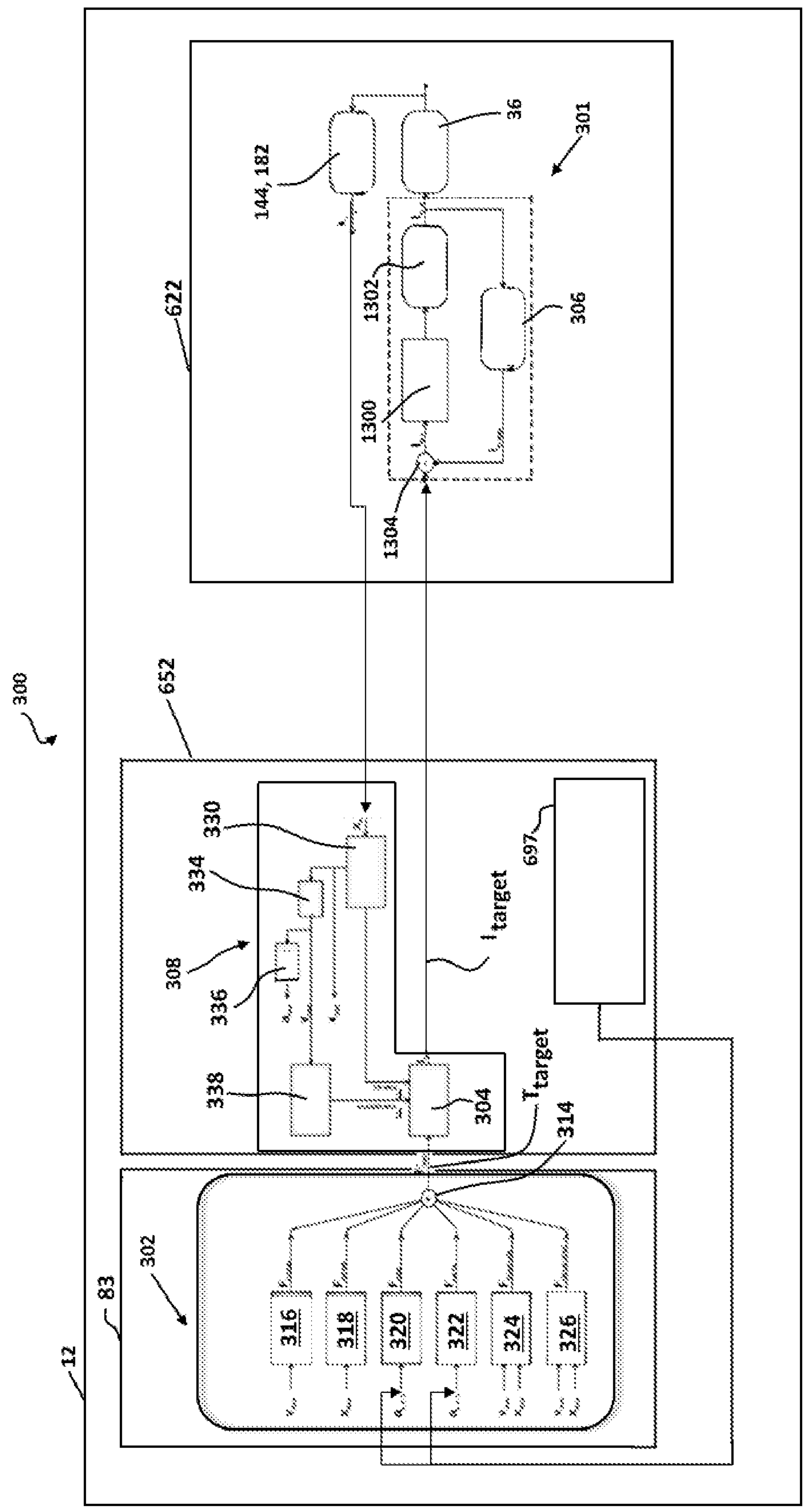

In further detail, FIGS. 51-54 show the haptic control algorithm 302 provided in another remote controller (e.g., within the vehicle latch assembly 83) for sharing a processor already provided in the latch assembly 83, and which is also separated from the power side door unit or actuator assembly 622. FIGS. 51-54 also shows various possible positions of an accelerometer 697 for detecting door motion. Specifically, in FIG. 51, the latch assembly 83 includes both the motor controller 308 and the haptic control algorithm 302. The actuator assembly 622 includes the closed loop current feedback motor control system 301, motor 36, and door position sensor 144, 182. The accelerometer 697 is separate or remote from both the latch assembly 83 and the actuator assembly 622, while still being coupled to the haptic control algorithm 302. In FIG. 52, the latch assembly 83 includes the motor controller 308, the haptic control algorithm 302, and the accelerometer 697. The actuator assembly 622 includes the closed loop current feedback motor control system 301, motor 36, and door position sensor 144, 182. In FIG. 53, the latch assembly 83 includes the motor controller 308 and the haptic control algorithm 302. The actuator assembly 622 includes the closed loop current feedback motor control system 301, motor 36, door position sensor 144, 182, and the accelerometer 697. In FIG. 53, the latch assembly 83 includes the haptic control algorithm 302. The actuator assembly 622 includes the closed loop current feedback motor control system 301, motor 36, and door position sensor 144, 182. The motor controller 308 and the accelerometer 697 are in the door node assembly 652 and remote from the actuator assembly 622. The actuator assembly 622 includes the closed loop current feedback motor control system 301, motor 36, door position sensor 144, 182, and the accelerometer 697. Still in another configuration, the latch assembly 83 includes both the motor controller 308, the closed loop current feedback motor control system 301 and the haptic control algorithm 302.

Figure 55:
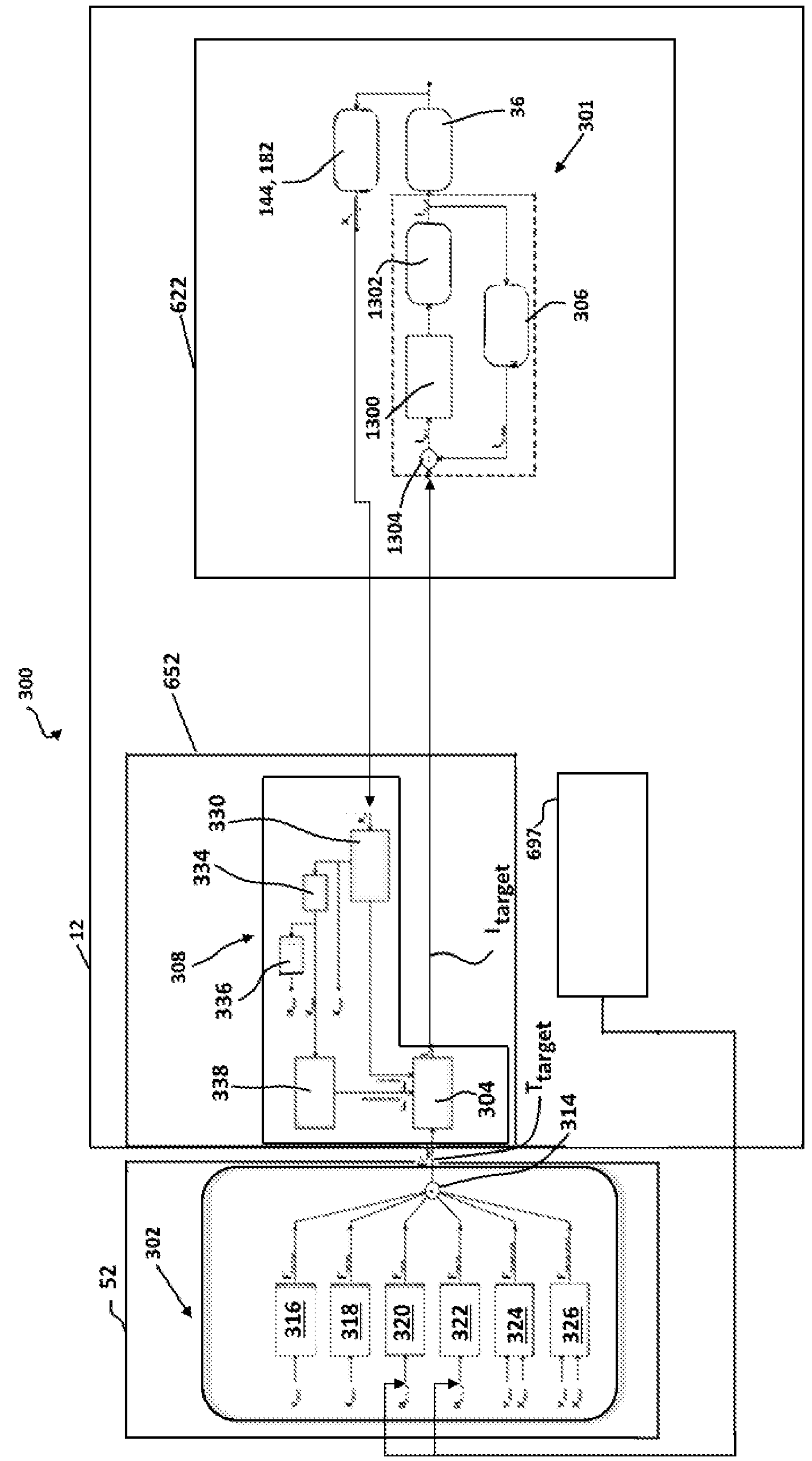
FIG. 55 shows yet another possible distributed configurations of the components of the control system of FIG. 45, and more particularly illustrating a haptic control algorithm a main vehicle controller.

In further detail, FIG. 55 shows the haptic control algorithm 302 provided in a remote controller not within the vehicle door 12, such as provided as part of the Body Control Module 52 (BCM). Since Body Control Module already includes communication access ports/interface for receiving updates, the haptic control algorithm 302 may be easily and repeatability updated, for example by flashing, using this communication interface. The door node assembly 652 includes the motor controller 308. The actuator assembly 622 includes the closed loop current feedback motor control system 301, motor 36, and door position sensor 144, 182. The accelerometer 697 is disposed remotely from the BCM 52, door node assembly 652, and actuator assembly 622 (e.g., in door 12 as part of vehicle latch 83, in a door control node 652, in the power side door (PSD) unit 622, or elsewhere).

Figure 56:
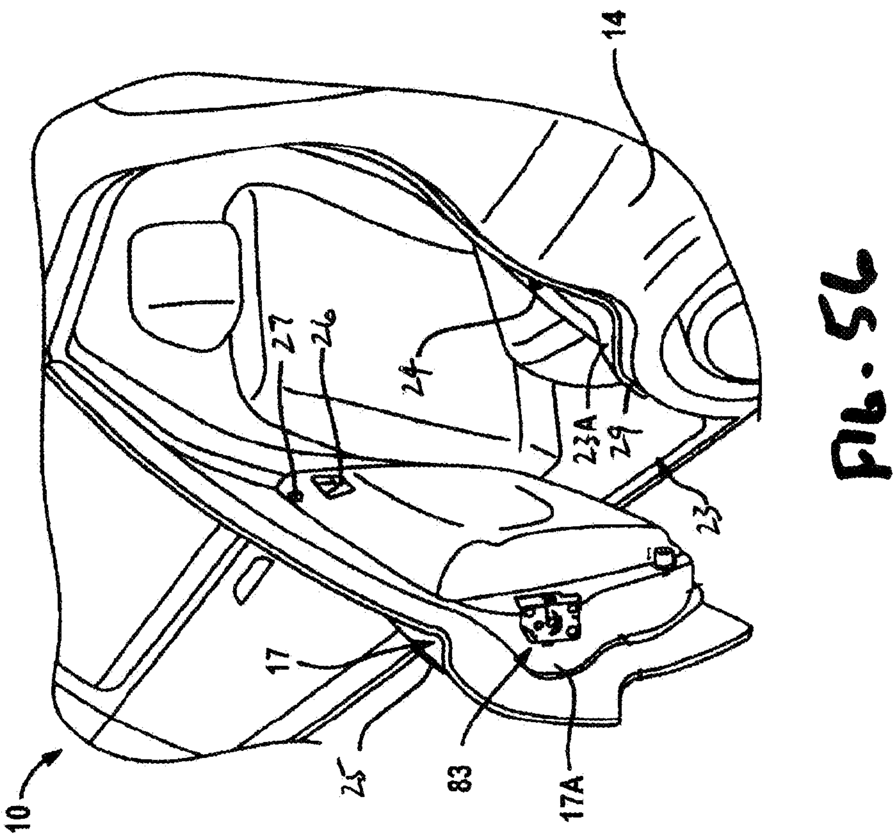
FIG. 56 is a partial perspective view of the motor vehicle with another closure member equipped with a latch assembly, according to aspects of the disclosure.

Referring now to FIG. 56, the vehicle body 14 of the motor vehicle 10 defines an opening 23 to an interior passenger compartment. The closure member, for example, rear passenger door 17, is illustratively shown pivotably mounted to vehicle body 14 for movement between an open position (shown) and a fully-closed position to respectively open and close opening 23 with latch assembly 83. Examples of latch assembly 83 can be found in U.S. Publication No. 2018/0100331, which is hereby incorporated by reference. While rear passenger door 17 is shown, it should be understood that the latch assembly 83 could alternatively or additionally be used for door 12 and/or power closure member actuation system 20 can be used for rear passenger door 17. The latch assembly 83 is shown secured to rear passenger door 17 adjacent to an edge portion 17A thereof and includes a latch mechanism that is releasably engageable with a striker 24 fixedly secured to a recessed edge portion 23A of opening 23. As will be detailed, latch assembly 83 is operable to engage striker 24 and releaseably hold closure member 17 in its fully-closed position. An outside handle 25 and an inside handle 26 are provided for selectively actuating a latch release mechanism of latch assembly 83 to release striker 24 from the latch mechanism and permit subsequent movement of rear passenger door 17 to its open position. An optional lock knob 27 provides a visual indication of the locked state of closure latch assembly 83 and which may also be operable to mechanically change the locked state of latch assembly 83. A weather or door seal 29 is mounted on edge portion 23A of opening 23 in vehicle body 14 and is adapted to be resiliently compressed upon engagement with a mating sealing surface of rear passenger door 17 when the rear passenger door 17 is held by the latch mechanism of latch assembly 83 in its fully-closed position so as to provide a sealed interface therebetween which is configured to prevent entry of rain and dirt into the passenger compartment while minimizing audible wind noise, for example.

FIGS. 57-60 show the door 12 pivotally mounted on the hinges 16, 18 connected to the vehicle body 14 (not shown in its entirety) for rotation about the hinge axis AA along with corresponding torque, moment arm, and speed plots. For greater clarity, the vehicle body 14 is intended to include the 'non-moving' structural elements of the vehicle 10 such as the vehicle frame (not shown) and body panels (not shown). The door 12 includes inner and outer sheet metal panels 12*a* and 12*b* with a connecting portion 12*c* between the inner and outer sheet metal panels 12*a* and 12*b*. The power-operated actuator mechanism or powered actuator 22, 122, 622 includes the extendible actuation member 42, 134 that is moveable between retracted and extended positions to effectuate swinging movement of door 12.

FIGS. 61-63 are block diagrams of another exemplary power door actuation system 1420 for controlling motion of the door 12. The system 1420 can include the motor 36 for moving the door 12. The system 1420 can also include the closed loop current control system 301 (FIG. 63) controlling the drive current $I_{output}$ provided to the motor 36 for controlling the motor 36 to apply an output torque or force $F_{output}$ to the door 12. The system 1420 also includes the force compensation module or haptic control algorithm 302 configured for calculating a compensation force $F_{haptic}$ to be provided to the closed loop current control system 301. The closed loop current control system 301 controls the drive current $I_{output}$ based on the compensation force $F_{haptic}$.

As discussed, the haptic controller or haptic control algorithm 302 determines the force command or compensation force $F_{haptic}$ which compensates for forces affecting the motion of the door 12 in the powered assist mode (inertia, weight, friction, incline). This compensation force $F_{haptic}$ represents the force that should be applied by the actuator 22, 122, 622 to move/hold the door 12. The compensation force $F_{haptic}$ (summation of forces) is converted into current $I_{output}$ to drive the motor 36, which in an ideal plant of the actuator 22, 122, 622, would translate into directly the force being applied to the door 12. However, the actuator 22, 122, 622 is not ideal, as it introduces some discrepancies which could mean that the force actually applied to the door 12 is not equal to the compensation force $F_{haptic}$ (e.g., a couple of Newtons more or less, which affects the proper response of the actuator 22, 122, 622 in a haptic mode or the powered assist mode. Thus, the compensation force $F_{haptic}$ should be adjusted to compensate for these variations due to the actuator 22, 122, 622. It is understood that other operating parameters of the actuator may be controlled, such as and without limitation, the target speed or acceleration output of the actuator, or the target operating currents or voltages of the actuator.

In application, the drive unit 304 selects a current $I_{output}$ (e.g., target current $I_{target}$) that compensates for the known variations of the actuator 22, 122, 622. Specifically, a response model 1421 of the actuator 22, 122, 622 can be predetermined/tested, so it is known exactly what current $I_{output}$ to select to have a desired output force $F_{output}$.

A major variation of the actuator 22, 122, 622 that needs to be compensated is due to efficiency or backdriveability. For example, an efficiency of the geartrain 38, 140 driven in the forward drive direction 1422 may be greater than the efficiency of the geartrain 38, 140 driven in the backdrive direction 1424, thus more current $I_{output}$ is required to move the actuator 22, 122, 622 in the forward drive direction 1422 than the backdrive direction 1424. Since the hall sensor 144, 182 is placed at the end of the motor 36, motion must be detected in order for the haptic control algorithm 302 to start calculating the compensation force $F_{haptic}$. However, due to the backdriveability of the actuator 22, 122, 622, there is a stall state where the user 75 trying to moving the door 12 will not actually be sensed by the hall sensor 144, 182. Once the user 75 has applied a sufficient force to cause the geartrain 38, 140 to rotate and the hall sensor 144, 182 to detect motion, the haptic control algorithm 302 will start. Yet, the user force may be different when moving the door 12 in the backdrive direction 1424 or forward drive direction 1422, and so haptically this is not a good sensation to the user 12. So, ideally, the geartrain 38, 140 can be operated in a balanced state such that the user 75 will feel the same force required to move the geartrain 368, 140 in the forward drive and backdrive directions 1422, 1424. This balanced state may involve applying the current $I_{output}$ to the motor 36 to preload the geartrain 38, 140 in a direction that is more difficult to move the geartrain 38, 140. So, the force applied on the geartrain 38, 140 by the electric motor 36 is sufficient to operate the geartrain 38, 140 in the balanced state without causing the door 12 to move.

As discussed, the door 12 of the vehicle 10 is moveable relative to the vehicle body 14 about a hinge axis AA between a closed position and a fully-open position. So, as best shown in FIG. 61, the power door actuation system 1420 includes the actuator 22, 122, 622 (e.g., mounted within the housing 141, 148, 184, 188, 206, 408, 422, 684 attached to the door 12). The actuator 22, 122, 622 includes the electric motor 36 supported by the. The electric motor 36 is configured to output a motor force. The actuator 22, 122, 622 also includes a geartrain 38, 140 (e.g., supported by the housing 141, 148, 184, 188, 206, 408, 422, 684) and having a geartrain input coupled to an output of the electric motor 36 for receiving the motor force and a geartrain output for applying an output force $F_{output}$ to the door 12. The actuator 22, 122, 622 additionally includes the an actuation member illustratively shown as an extendible member 134 coupled to the geartrain output and configured for extension and retraction relative to the housing 141, 148, 184, 188, 206, 408, 422, 684 in response actuation by the geartrain output for moving the door 12 relative to the vehicle body 14.

In order to correct for the efficiency or backdrivability of the actuator 22, 122, 622, the system 1420 is adapted to determine the output force $F_{output}$ to compensate for external forces affecting the motion of the door 12. The system 1420 also adjusts the output force $F_{output}$ determined to an adjusted output force $F_{output}$ to compensate for internal forces affecting the operation of the actuator 22, 122, 622. The system then controls the electric motor 36 to move the door 12 at the adjusted output force $F_{output}$.

Referring back to FIGS. 57-60, moment arm compensation is another variation in the drivetrain 38, 140 that needs to be accounted for. However, moment arm compensation is an example of a compensation based on position of the door 12, as opposed to a moving direction of the door 12. Variations of the moment arm response can be predetermined and fixed as well. So, the internal forces affecting the operation of the actuator 22, 122, 622 can be related to at least one of an efficiency of the geartrain 38, 140, and the moment arm 1442 of the geartrain 38, 140 connection to the door 12.

Figure 57:
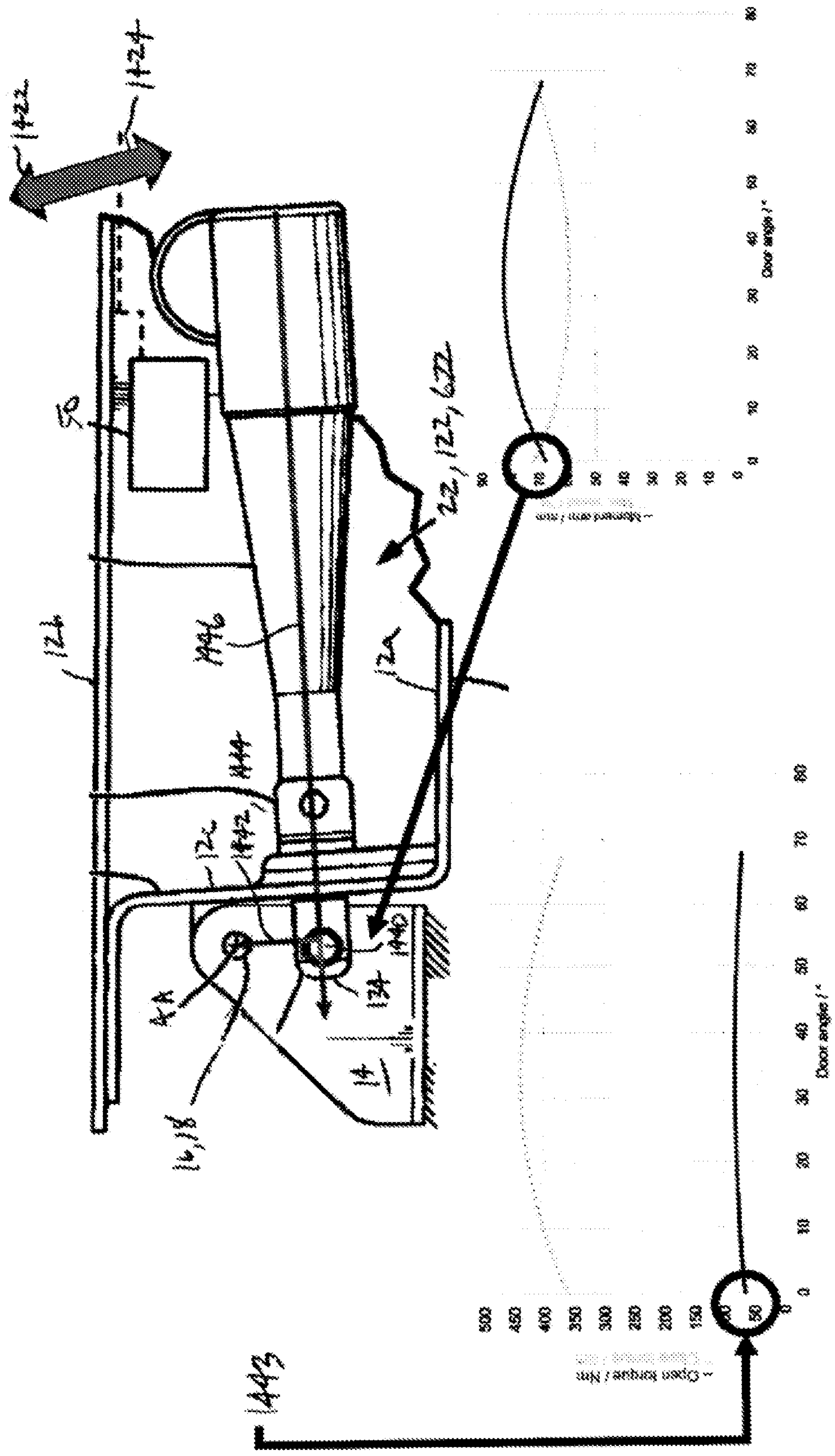
Figure 58:
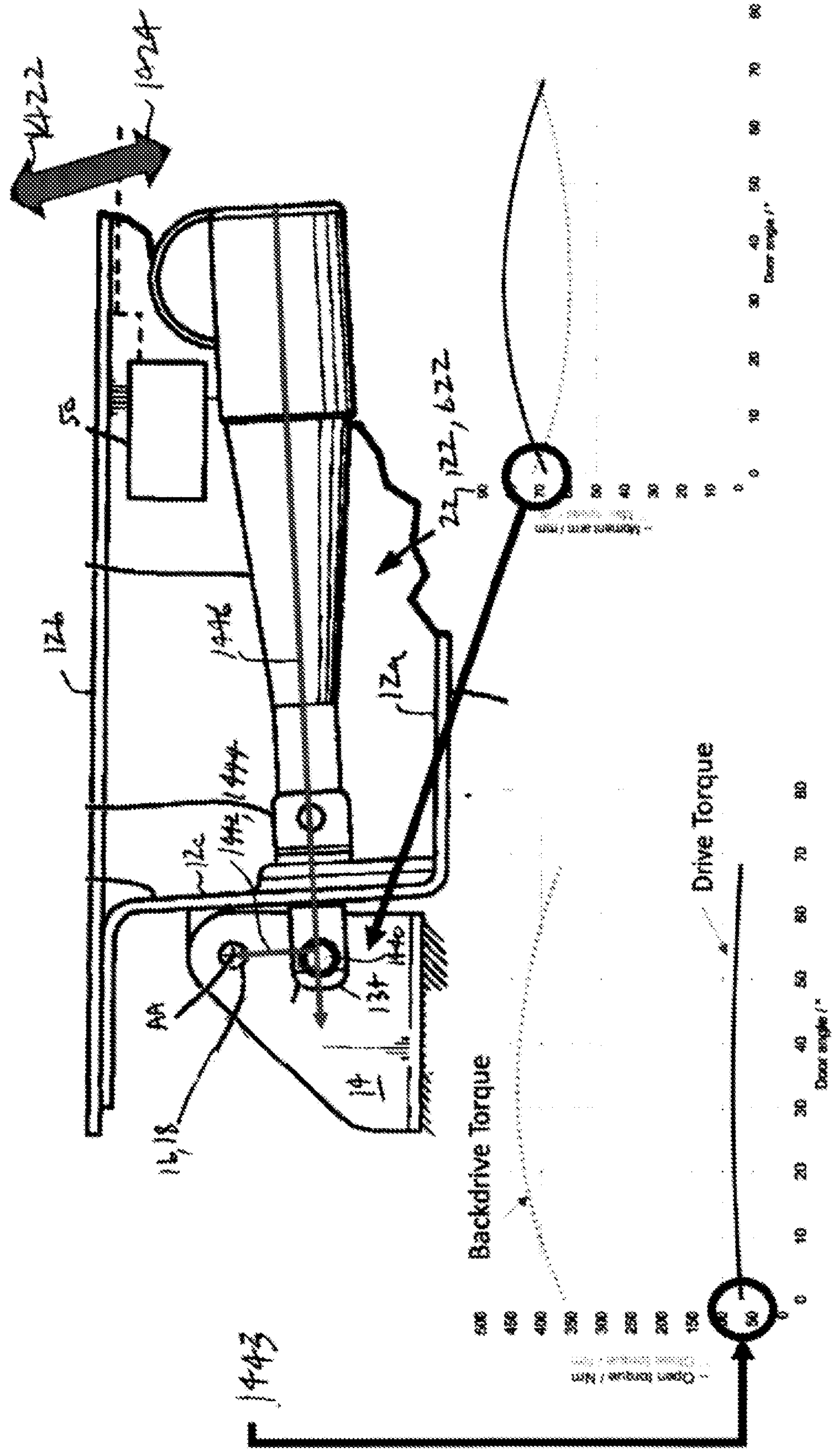
Figure 59:
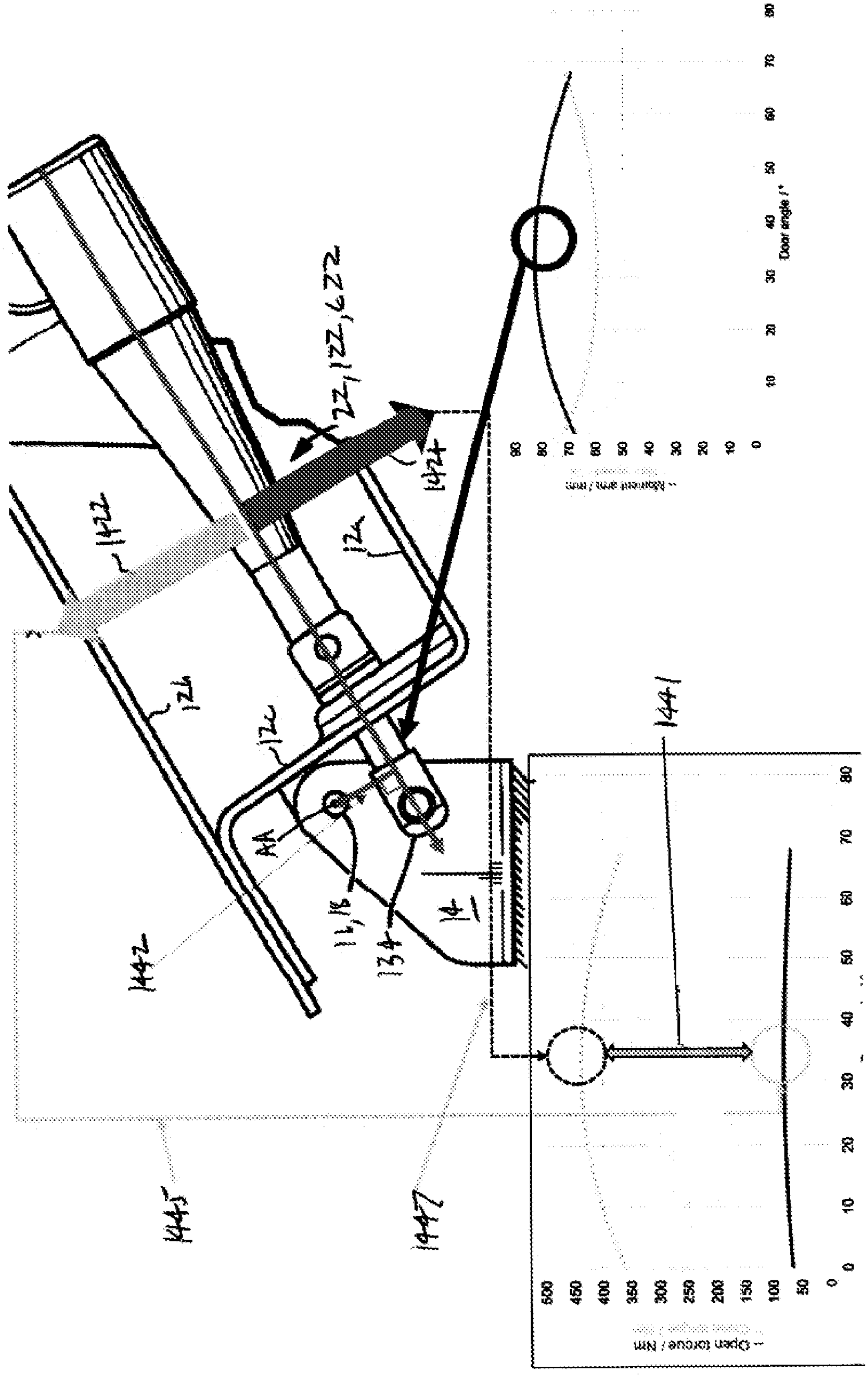

In addition, referring specifically to FIGS. 57-59, the geartrain 38, 140 is moveable in the forward drive direction 1422 and in the backdrive direction 1424. Thus, according to an aspect, the adjusted output force $F_{output}$ can be selected such that an input force applied to the geartrain output by the door 12 to move the geartrain 38, 140 in the forward drive direction 1422 is substantially similar to the force required to move the geartrain 38, 140 in the forward drive direction 1422. So, the electric motor 36 may be adapted to apply a force on the geartrain 38, 140 to operate the geartrain 38, 140 in such a balanced state (i.e., when the geartrain 38, 140 is in the balanced state, the motor force applied to the geartrain input to cause the geartrain 38, 140 to be driven in the forward drive direction 1422 is substantially similar to the motor force applied to the geartrain 38, 140 to cause the geartrain 38, 140 to be driven in the backdriven direction). According to an aspect, the determined output force $F_{output}$ is adjusted when the actuator 22, 122, 622 is not in motion.

Figure 60:
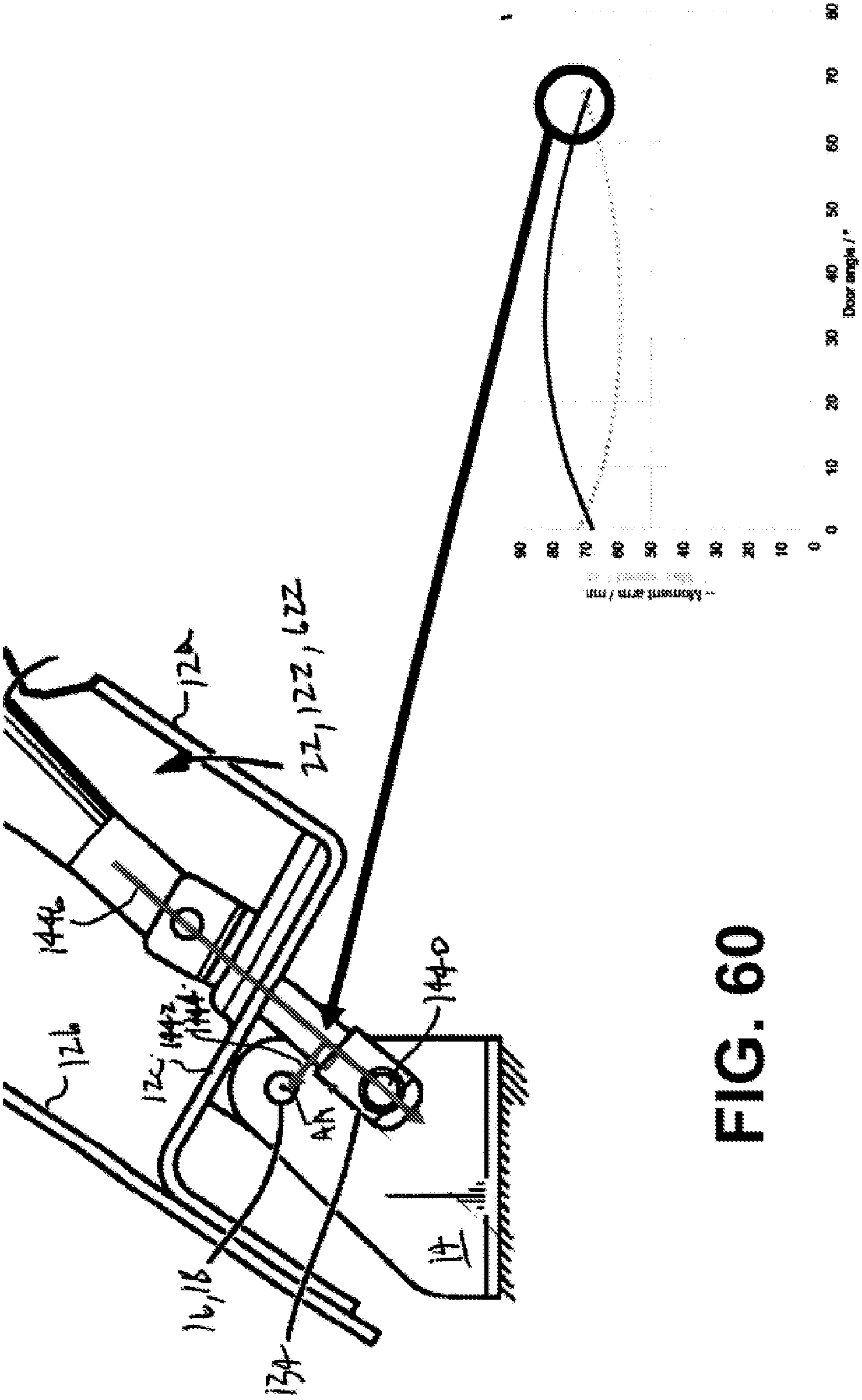

As best shown in FIGS. 57-58, the moment arm 1442 increases to a maximum from door closed position to when the door 12 is partially opened. The plot on the left hand side of FIGS. 57 and 58 shows an open or drive torque (solid line at the bottom of the figures) and a closed or backdrive torque (dotted line at the top of the figures) versus door angle. So, the beginning of the plot indicated as 1443 is starting from the closed position and moving toward the open position. The plot on the right hand side of FIGS. 57 and 58 shows the moment arm 1442 (solid line) and maximum speed (dotted line) versus door angle. The moment arm 1442 is defined by kinematics. The backdrive torque and drive torque (i.e., forward drive direction 1422) are labeled in FIG. 58. FIG. 59 shows the position of the door 12 when the moment arm 1442 is at a maximum (e.g., max at 20 to 30 degrees depending on the kinematics of the door 12), as well as corresponding points, which are circled, on the open torque and a closed torque versus door angle plot and moment arm 1442 and maximum speed versus door angle plot. As shown and indicated as 1441, the motor 36 has to output large torque differences depending on which direction the geartrain 38, 140 has to be driven to move the door 12 in a direction (e.g., front driven to move door 12 towards fully opened position, and backdriven to move the door 12 towards the closed position). So, for example as indicated as 1445, the motor 36 may be driven with less output torque from a given position in the forward drive/door open direction, but as indicated as 1447, needs to be driven with greater output torque from a given position in the forward drive/door open direction. In other words, the motor 36 requires more torque in drive direction and less torque in backdrive direction 1424 to create the same torque at the door 12. FIG. 60 shows that the moment arm 1442 is smallest when the door 12 is fully opened.

According to an aspect, the extendible member 134 of the actuator 22, 122, 622 can be a linear strut 134 coupled to the geartrain output and configured for extension and retraction relative to the housing 141, 148, 184, 188, 206, 408, 422, 684 in response actuation by the geartrain output. Specifically, the linear strut 134 can be a spindle drive mechanism including the leadscrew 134 and the lead nut 190 in threaded engagement with the leadscrew 134 such that rotation of one of the leadscrew 134 and the lead nut 190 causes pivoting of the door 12. The linear strut 134 can be coupled to the vehicle body 14 at a connection point 1440 on the vehicle body 14 distanced from the hinge axis AA, such that the moment arm 1442 is defined by a perpendicular line 1444 extending from a line of force 1446 applied by the linear strut 134 on the connection point 1440 to the hinge axis AA. So, the perpendicular line 1444 extends from the hinge axis AA of the door 12 to the connection point 1440 of the linear strut or extendible member 134 and one of the vehicle body 14 and the door 12. Other types of actuation members are possible, and include without limitation levers, racks, cable drums, spindles, gear systems, as examples.

As previously discussed, the actuator 22, 122, 622 is adapted to supply the current $I_{output}$ to the electric motor 36. The current $I_{output}$ can be selected to operate the electric motor 36 such that the adjusted output force $F_{output}$ is applied to the door 12 by the geartrain output. In more detail, the current $I_{output}$ may be selected such that an input force applied to the geartrain output by the door 12 to move the geartrain 38, 140 in the forward drive direction 1422 is substantially similar to the force required to move the geartrain 38, 140 in the forward drive direction 1422. In addition, the actuator 22, 122, 622 can be adapted to apply the adjusted output force $F_{output}$ to the door 12 while no motion of the door 12 is detected.

Referring back to FIGS. 61-63 and as discussed above, the power door actuation system 1420 can further include a sensor 144, 182, 697 for detecting one of a motion of the electric motor 36 or geartrain 38, 140 or the door 12. The power door actuation system 1420 can further include the controller 50. In more detail, the controller 50 is adapted to determine the output force $F_{output}$ to compensate for external forces affecting the motion of the door 12, and adjust the output force $F_{output}$ determined to an adjusted output force $F_{output}$ to compensate for internal forces affecting the operation of the actuator 22, 122, 622. As discussed above, the haptic control algorithm 302 determines the force output $F_{output}$ target as the compensation force $F_{haptic}$ compensated for environmental factors (e.g., non-drive unit or actuator factors) influencing the motion of the door 12. The motor controller or system compensation module 308 then adjusts the compensation force $F_{haptic}$ accordingly to compensate for response differences between the compensation force $F_{haptic}$ and the force output $F_{output}$ caused by drive unit factors (e.g., backdrive efficiency of the drive unit or actuator 22, 122, 622). As shown in FIG. 62, the system compensation module 308 can include a predetermined actuator model 1421. The force compensation module or haptic control algorithm 302 can for example be based on a superposition principle of torques. FIG. 63 is another schematic diagram of the control system of FIG. 47, showing additional details of the motor 36 coupled to the gearbox 38, 140 and Hall effect sensor 144, 182. The predetermined actuator or response model 1421 is discussed in more detail below with reference to FIGS. 64-71.

According to an aspect, the controller 50 is configured to select a current $I_{output}$ to be supplied to the electric motor 36 such that such that the output force $F_{output}$ to the door 12 substantially matches the determined output force $F_{output}$. The controller 50 is configured to select the current $I_{output}$ when no motion of the electric motor 36 or geartrain 38, 140 is detected. Thus, the electric motor 36 can be adapted to produce a balancing torque to preload the geartrain 38, 140 in one of the forward drive direction 1422 and backdrive direction 1424 such that the resistance felt by the user 75 manually moving the door 12 in either one of the backdrive direction 1424 or forward drive direction 1422 is substantially the same. Such a manual operation of the actuator 22 is imparted by a user manually moving the door 12 in one of a closing direction or an opening direction.

Again, the geartrain 38, 140 is moveable in a forward drive direction 1422 and in a backdrive direction 1424, wherein the controller 50 is configured to select the current $I_{output}$ such that the geartrain 38, 140 is operated in the balanced state. Thus, the geartrain 38, 140 operated in the balanced state is driven in one of the forward drive direction 1422 and backdrive direction 1424 without causing motion of the actuator 22, 122, 622. Thus, the controller 50 is configured to select the current $I_{output}$ such that a force applied to the geartrain output by the door 12 to move the geartrain 38, 140 in the forward drive direction 1422 is substantially similar to the force required to move the geartrain 38, 140 in the forward drive direction 1422. The controller 50 may cease to adjust the determined output when motion of one the electric motor 36 or geartrain 38, 140 is detected.

As mentioned above, the controller 50 can include the force compensation module or haptic control algorithm 302 configured to determine the compensation force $F_{haptic}$ for compensating for external forces affecting the motion of the door 12, and a drive unit 304 configured to receive the compensation force $F_{haptic}$ and determine a current $I_{output}$ to be supplied to the electric motor 36. The current $I_{output}$ is adjusted when no motion of the electric motor 36 or geartrain 38, 140 is detected so as to drive the geartrain 38, 140 in one of a drive direction and backdrive direction 1424 without causing motion of the geartrain 38, 140. So, the haptic control algorithm 302 calculates the compensation force $F_{haptic}$ as a control parameter to the drive unit 304 to be applied by the drive unit 304 on the door 12 to compensate for external environmental factors influencing the position of the door 12. According to an aspect, the same accelerometer 697 is used to determine inclination of the vehicle 10 and inertia of the door 12.

As discussed above, the door position sensors 144, 182 are coupled to the kinematic block 330 configured to receive the position of the door $X_{door}$ and output the first force input 332 to the drive unit 304. The kinematic block 330 is also coupled to the first differentiator 334, which is configured to mathematically differentiate the position of the door $X_{door}$ and output the velocity of the door $v_{door}$. The first differentiator 334 is then coupled to the second differentiator 336 configured to mathematically differentiate the velocity of the door $v_{door}$ and output the acceleration of the door $a_{door}$. The velocity of the door $v_{door}$ is received by a backdrive block 338 that is configured to receive the velocity of the door $v_{door}$ and output the second force input 340 to the drive unit 304. So, the first force input 332 of the backdrive block 338 is a factor that is used in the drive unit 304 to change an overall system efficiency n_system depending on direction of the motor 36. So, the system compensation module 308 receives door direction data for determining if the actuator 22, 122, 622 is being moved in backdrive direction 1424 or forward drive direction 1422. The kinematic block 330 compensates for non-drive unit hardware (e.g., moment arm 1442 variation based on the known position of the door 12 using the hall sensor 144, 182). The kinematic block 330 has the information of the kinematics and adjusts an overall system ratio R_system. Since the whole operation is a multiplication, it is independent of the forward drive/backdrive situation. The drive unit 304 receives the first and second force inputs 332, 340 and outputs the target current $I_{target}$. So, the drive unit 304 converts the compensation force $F_{haptic}$ into a current target as well as adjusts the compensation force $F_{haptic}$ to improve the response of the motor 36. Specifically, FIG. 63A shows a function performed by the drive unit 304 ($I_{motor}=I_{target}$).

Figure 64:
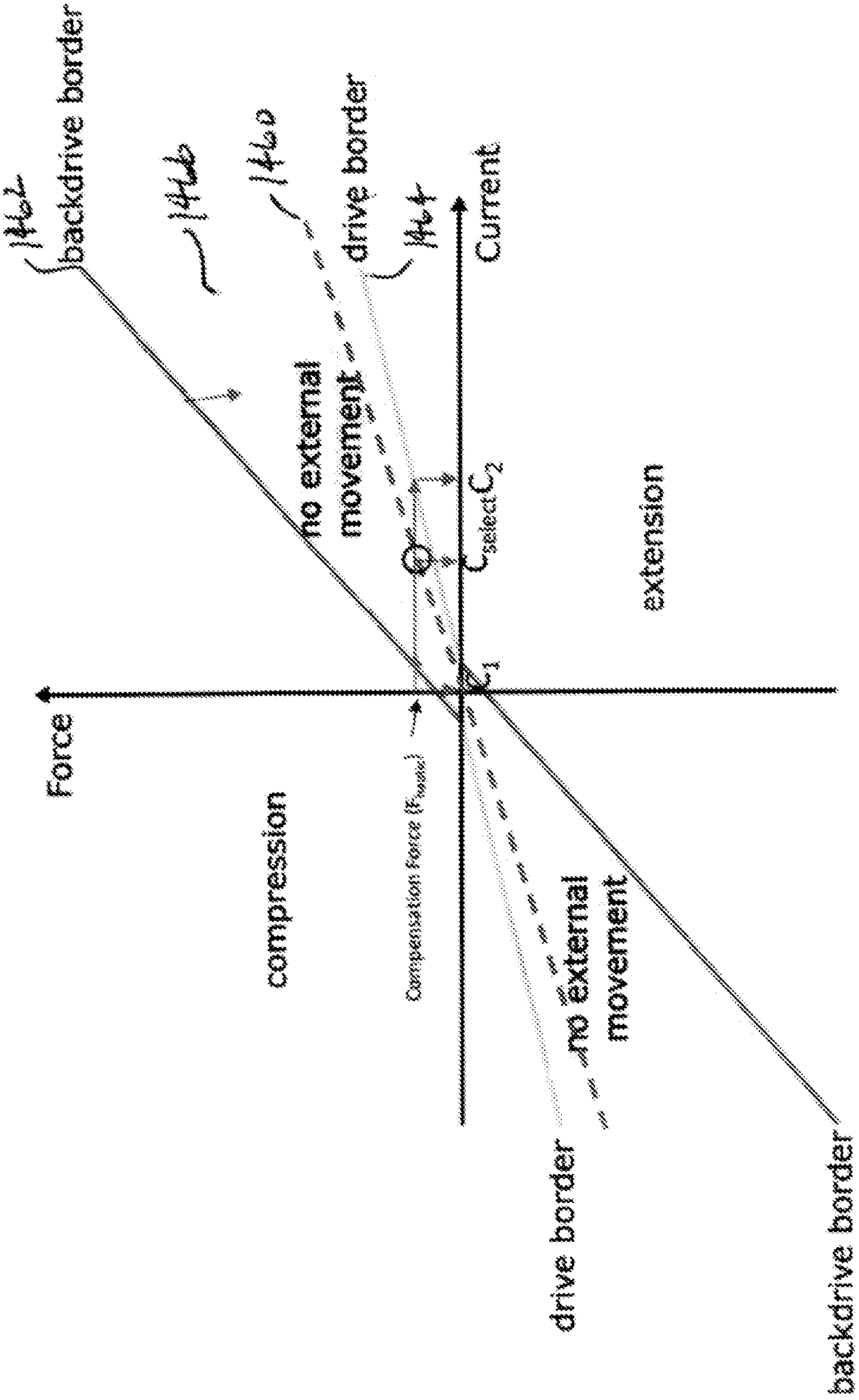

FIGS. 64-71 show examples of operation of the system 1420 of FIGS. 61-63 with and without balancing. In the examples, plots are force versus current are shown, with compression being shown on the upper portion of each plot and extension being shown in the lower portion of each plot. Specifically, FIGS. 64-67 show an operational example without balancing. In FIG. 64, the door 12 is not moving, but there is a slight incline acting to move door 12 to closed position. It is assumed that the door 12 is stopped in a hold open position ("locked" state). The haptic control algorithm 302 calculates the compensation force $F_{haptic}$ required to resist motion of the door 12 against environmental factors (e.g., inclination) towards the closed position (to maintain the door 12 stationary). To resist the door 12 moving towards the closed position, the actuator 22, 122, 622 may have to be extended requiring a +ve current or output current $I_{output}$ to be supplied thereto. The inherent locking characteristics (breakaway forces due to friction for example) of the actuator 22, 122, 622 from stationary can assist in preventing motion of the door 12 due to environmental factors (e.g. inclination) and assist with maintaining the locked state of the actuator 22, 122, 622. And so, during no door motion, the haptic control algorithm 302 calculates the compensation force $F_{haptic}$ intended for the actuator 22, 122, 622 to output to negate the environmental factors. However, since the actuator 22, 122, 622 has inherent inefficiencies, the current $I_{output}$ required to be supplied to the actuator 22, 122, 622 is selected by the system compensation module 308 having the response model 1421. Accordingly, the system compensation module 308 can select the current $I_{output}$ at the intersection with the dotted line 1460. The output current $I_{output}$ is always according to upper (i.e., backdrive border 1462), lower (i.e., forward drive border 1464) or dotted line 1460. So, within a shaded zone 1466 there is no movement of the actuator 22, 122, 622. Also referred to as a "stall zone". The dotted line 1460 ("stall gain") ideally sits in a position that the vertical distance to the forward drive border 1464==vertical distance to backdrive border 1462 (where the vertical axis is Force). This behavior is normal to any actuator 22, 122, 622. The higher the efficiency of the overall mechanical system, the smaller will be the shaded area.

Figure 65:
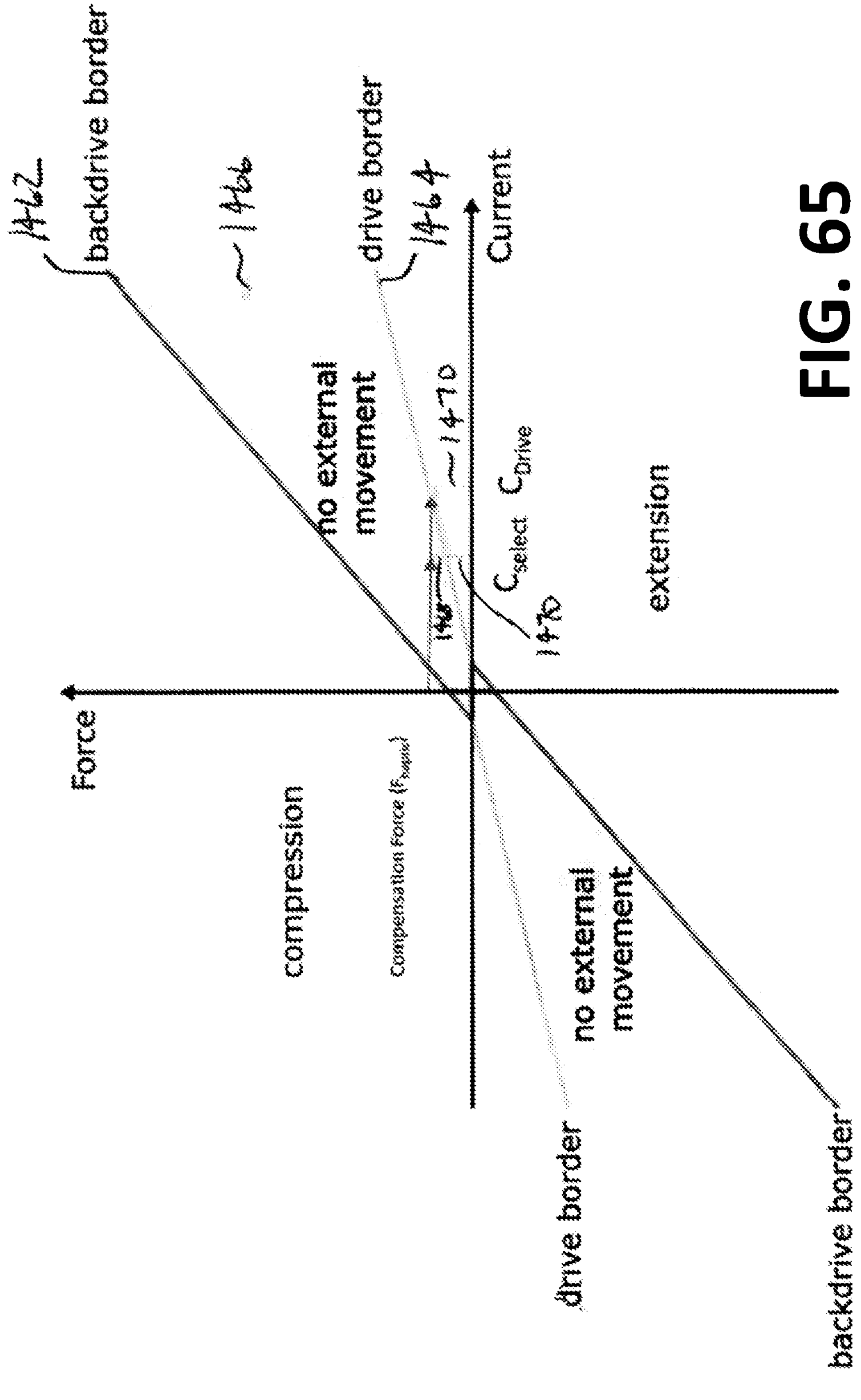

In FIG. 65, the door 12 is now moved towards open position (towards forward drive border 1464). So, now the user 75 manually moving the door 12 must move the actuator 22, 122, 622 into motion, or must apply a force to move the actuator 22, 122, 622 to the backdrive border 1462 or forward drive border 1464. In the example, the user 75 moves the actuator 22, 122, 622 towards the forward drive border 1464 (line indicated as 1468) by moving the door 12 towards the open position. Since the user 75 applies a force to move the door 12, once the door 12 is set into motion at the forward drive border 1464 (as detected by the hall sensors 144, 182), the current $I_{output}$ will be selected based on the compensation force $F_{haptic}$.

Depending on the detected motion (e.g., a high user applied force to the door 12), an activation of the haptic control algorithm 302 may increase the value of the compensation force $F_{haptic}$ (line indicated as 1470) (e.g., due to increase in friction during motion of the door 12 as one example) such that the system compensation module 308 now calculates a new current $C_{drive}$ to provide the force assist to the user 75 moving the door 12.

Figure 66:
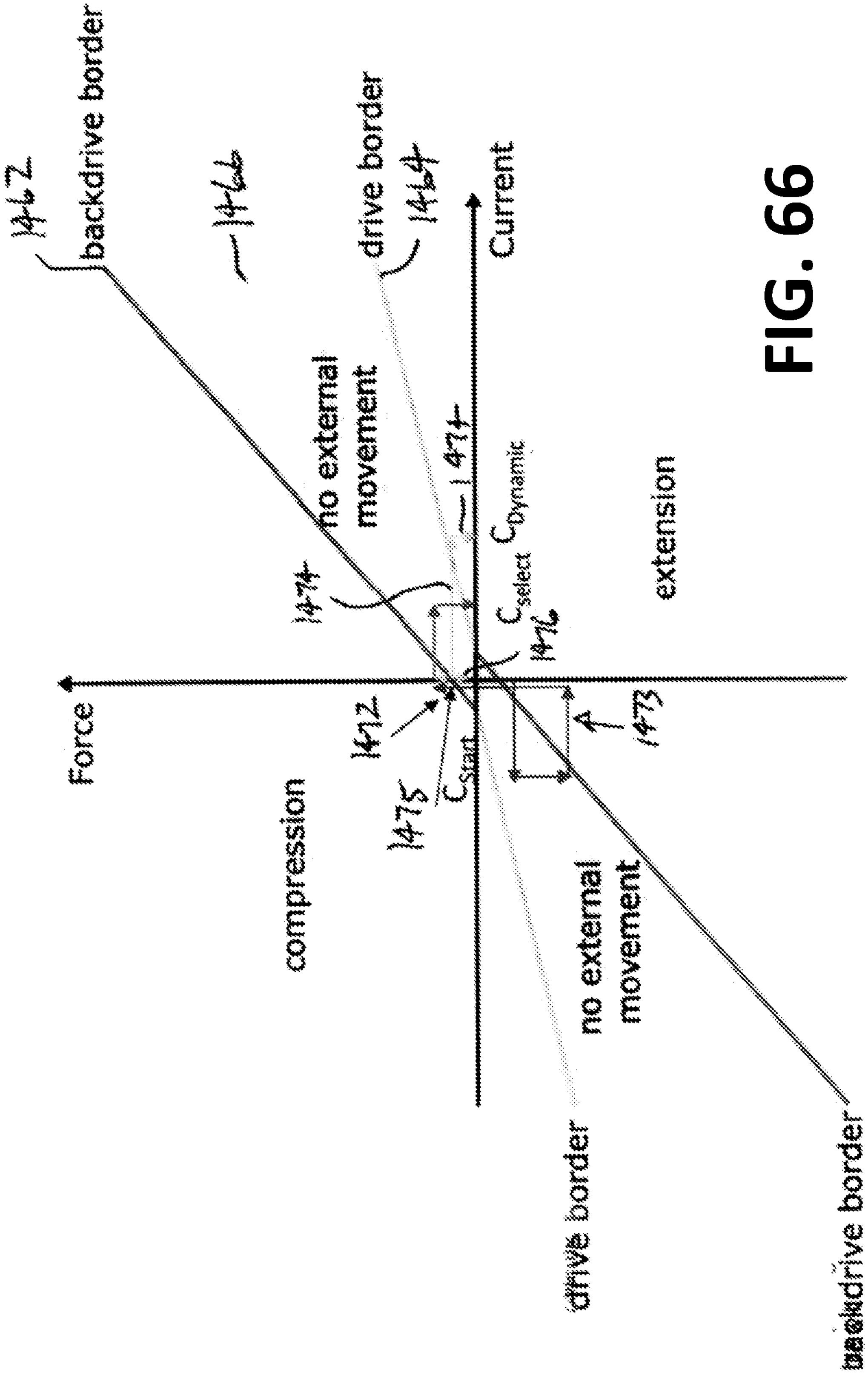
Figure 67:
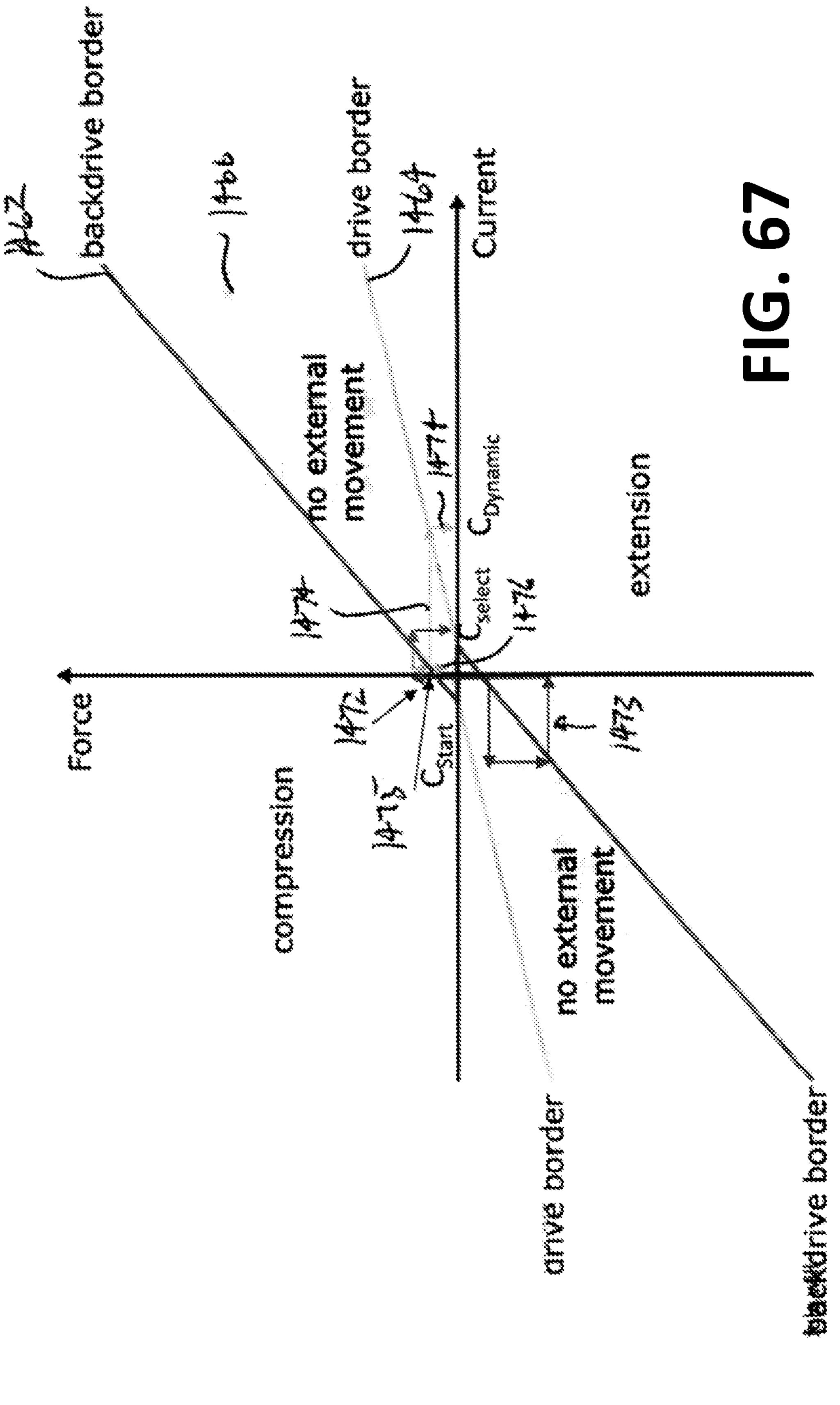

In FIGS. 66 and 67, the door 12 is not moving, instead there is a slight incline acting to move door 12 to open position. Again, the door 12 is assumed to be in a locked state during a hold open state. When motion of the door 12 is detected towards the open position (after motion of the actuator 22, 122, 622 is detected), for example as a result of a user 75 moving the door 12, the haptic control algorithm 302 is activated to calculate a compensation force $F_{haptic}$ for assisting with the motion of the door 12 by the user 75. Illustratively, the compensation force $F_{haptic}$ jumps to a +ve value (indicated at 1472) from its −ve hold open force (shown as arrows marked 1473) after the actuator 22, 122, 622 is moved to the forward drive border 1464 with an extension zone indicated as 1474.

Initially, the value of the output current $I_{output}$ must be selected by the system compensation module 308 to not only provide a force assist, but overcome the locking properties of the actuator 22, 122, 622 (due to friction, etc.) to produce the output force $F_{output}$. The current $I_{output}$ required to move the door 12 in the extension direction will be determined by the system compensation module 308, which will now be a positive current $I_{output}$ to drive the door 12 in the open direction.

Once motion starts, the compensation force $F_{haptic}$ will be recalculated (shown by arrow at 1475) and the system compensation module 308 may determine that a lower current $I_{output}$ is required (shown as arrows the arrows marked 1476) since static friction may have been overcome e.g., $C_{Dynamic}$ compensation force $F_{haptic}$ may constantly vary along the Y axis, while the system compensation module 308 will determine the required current $I_{output}$ based on the varying compensation force $F_{haptic}$.

Figure 68:
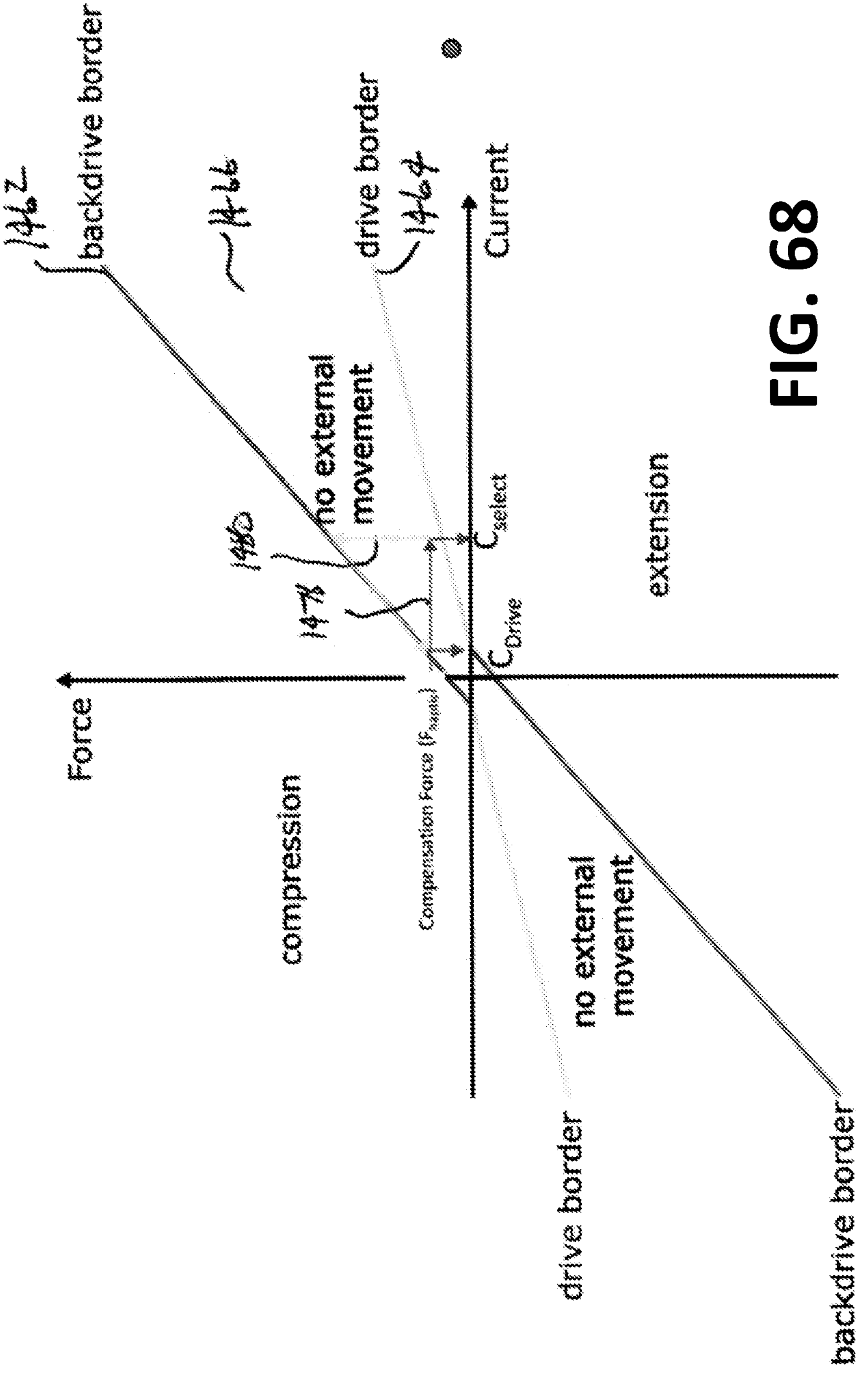

In FIG. 68, the door 12 is moved towards closed position (towards backdrive border 1462). So, the door 12 is not in motion (hold open position. The haptic control algorithm 302 calculates a hold open force required (line indicated as 1478). Prior to the haptic control algorithm 302 calculating an assisting force to the motion of the door 12, a user 75 manually moving the door 12 must move the actuator 22, 122, 622 into motion. In particular, the user 75 must apply a force to move the actuator 22, 122, 622 to the backdrive border 1462 or forward drive border 1464 before the haptic control algorithm 302 will recalculate the force compensation $F_{haptic}$. In this specific example, the user 75 moves the actuator 22, 122, 622 towards the backdrive border 1462 (indicated as 1480). Since the user 75 applies a force to move the door 12, once the door 12 is set into motion at the backdrive border 1462, the compensation force $F_{haptic}$ is momentarily the same as before movement is detected and a current Cdrive will be supplied to the motor 36 to move the door 12 in the compression direction.

Figure 69:
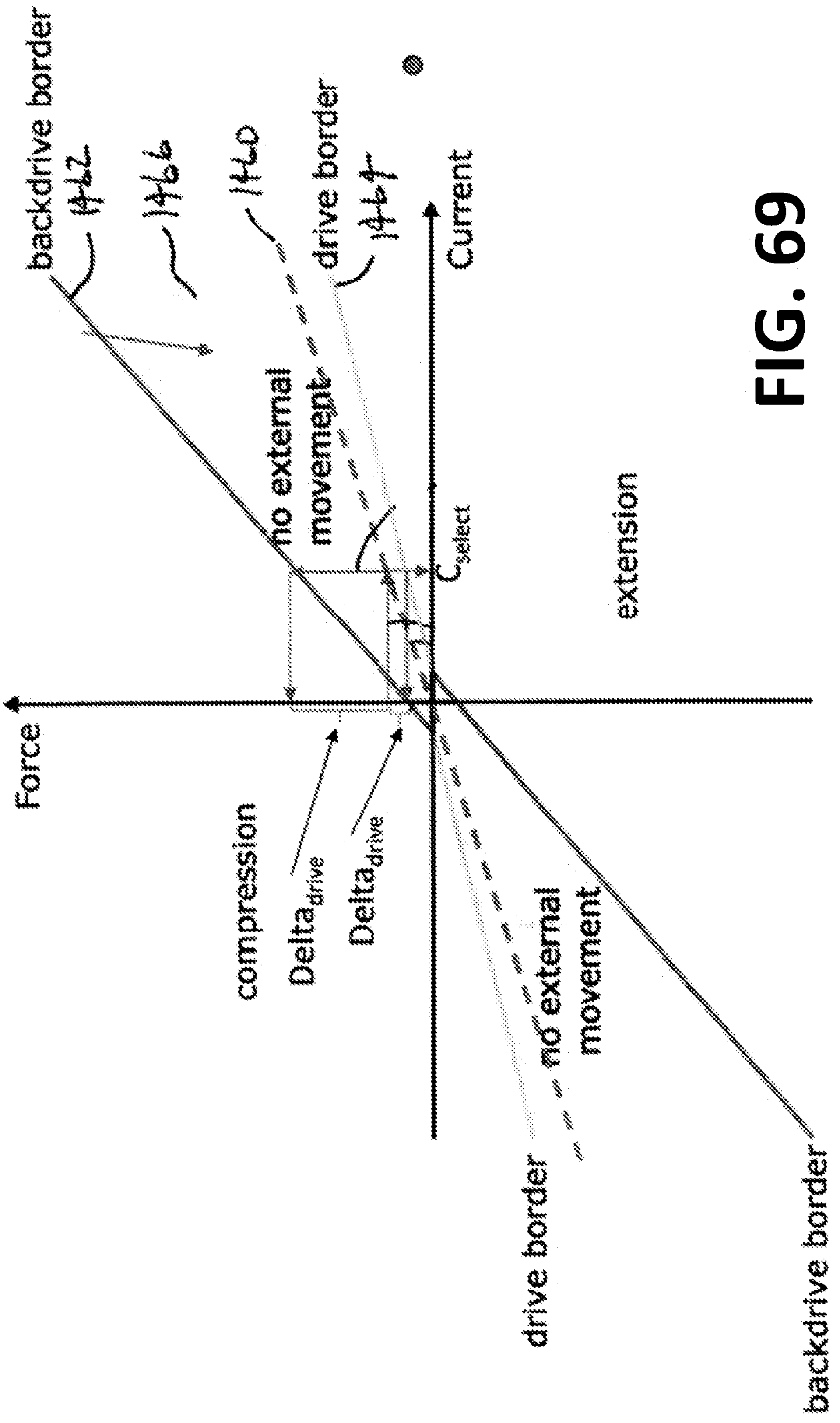

In FIG. 69, the door 12 is not moving (before balancing) and a slight incline is acting to move door 12 to closed position. Without any balancing function activated in the system compensation module 308, the current $I_{output}$ selected $C_{select}$ would bias the actuator 22, 122, 622 closer its forward drive border 1464 benefitting from the inherent locking state of the actuator 22, 122, 622. The amount of force a user 75 would have to apply to actuator 22, 122, 622 to cause the actuator 22, 122, 622 to move to the forward drive border 1464 before the haptic control algorithm 302 is activated is shown as $Delta_{drive}$. The amount of force a user 75 would have to apply to the actuator 22, 122, 622 to cause the actuator 22, 122, 622 to move at the backdrive border 1462 before the haptic control algorithm 302 is activated is shown as $Delta_{backdrive}$. Therefore the user 75 will experience different resistances before the haptic control algorithm 302 is activated depending on the direction of motion (in the backdrive direction 1424 compared to the forward drive direction 1422) when the actuator 22, 122, 622 is stationary. So, the shaded zone 1466 is unique to each actuator 22, 122, 622. A wider shaded band or zone 1466 indicates larger inefficiencies of the actuator 22, 122, 622, and a lower quality actuator 22, 122, 622 (e.g., more friction between gears), but may be desirable to physically implement a hold open force. However, this would increase the force needed to move the actuator 22, 122, 622 towards the backdrive border 1462. A narrow shaded zone 1466 indicates improved efficiency of the actuator 22, 122, 622, and a higher quality actuator 22, 122, 622 (e.g. less friction between gears), however at the disadvantage of losing inherent hold open locking leading to increase hold open current. The actuator 22, 122, 622 may be selected so that the shaded zone 1466 provides a balance between cost, hold open locking quality of the actuator 22, 122, 622, and hold open current. A wider shaded zone 1466 may allow selection of a lower cost geartrain 38, 140 and the drawbacks of having wider shaded zone 1466 may be compensated for by the methods described herein.

FIG. 70 shows balancing on (transitioning out of the shaded zone 1466 from one door direction to another). Again, the door 12 is not moving, there is a slight incline acting to move door 12 to closed position/compression. With the balancing function now activated in the system compensation module 308, the current $I_{output}$ selected $C_{select}$ is based on the same compensation force $F_{haptic}$ that would bias the actuator 22, 122, 622 towards a mid point in the shaded zone 1466 (towards the backdrive border 1462 in this example and represented by the dashed line indicated as 1482) between the forward drive border 1464 and the backdrive border 1462 such that the $Delta_{drive}$ $Delta_{backdrive}$ are equal. In other words, the actuator 22, 122, 622 may be balanced in one direction, the direction that would require more force for the user 75 to move the actuator 22, 122, 622 to the backdrive border 1462. Illustratively the current $I_{output}$ selected $C_{select}$ is lower (represented by the arrow 1484) since the backdrive resistance assists in holding the actuator 22, 122, 622 against motion. As a result, the force needed to move the actuator 22, 122, 622 to either border to activate the haptic control algorithm 302 is equal. As a result, the user 75 will experience the resistance until the actuator 22, 122, 622 is moved independent of the direction of motion (in the backdrive direction 1424 and to the drive direction) when the actuator 22, 122, 622 is stationary.

Figure 71:
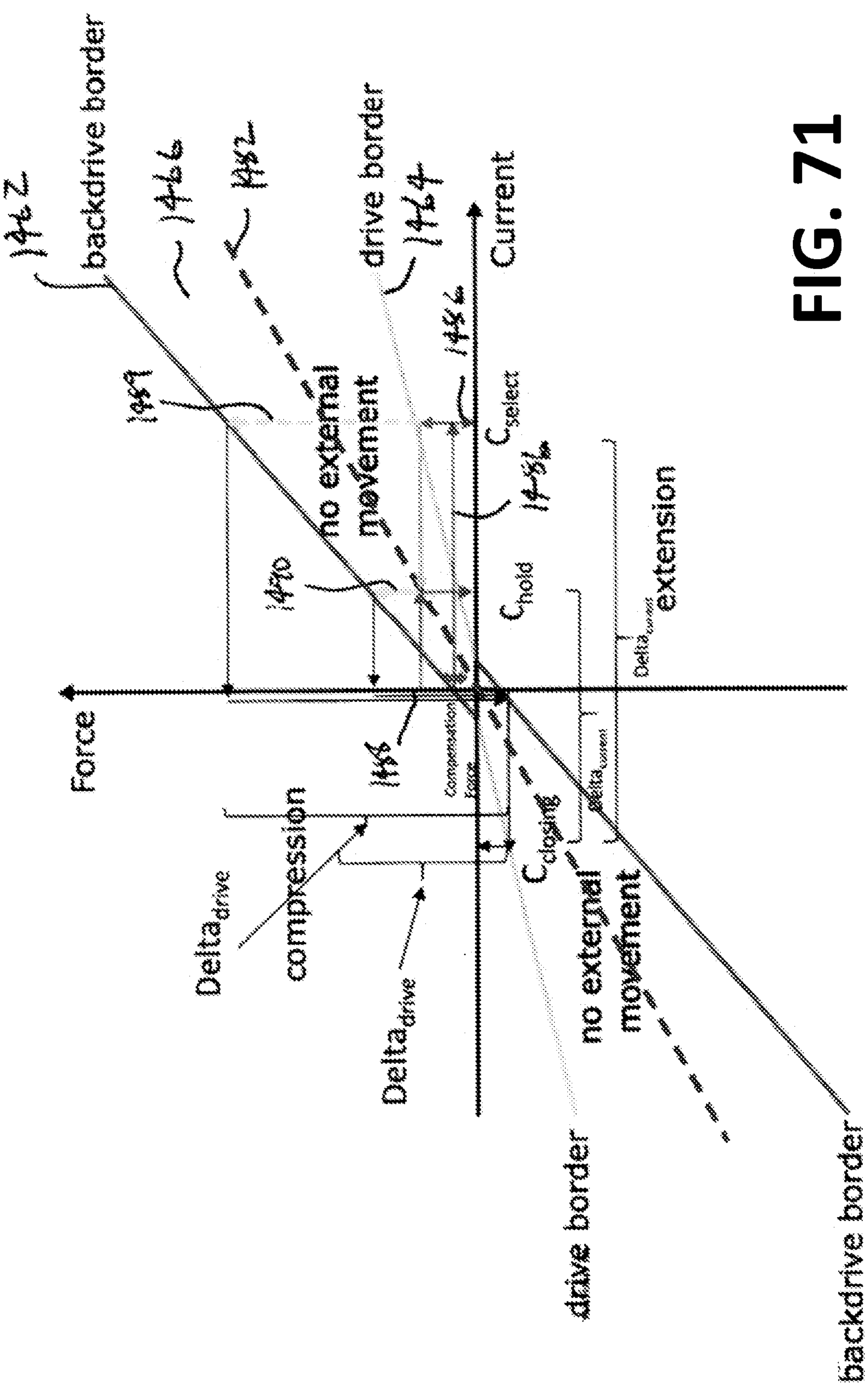

FIG. 71 shows a transitioning into the shaded zone 1466 from one direction of the door 12 to another. So, the door 12 is moving in an extension direction towards the door open position. It is assumed that the door 12 is already set into motion from operational example discussed above, the haptic control algorithm 302 is calculating a compensation force $F_{haptic}$ required to move the motion of the door 12 towards the open position to assist the user 75 moving the door 12. The current $I_{output}$ selected $C_{select}$ is determined by the system compensation module 308. (arrows indicated as 1486). Now the user 75 desires to reverse the motion of the door 12 from the open direction to a closing direction, illustrated by the arrow marked 1488 towards the forward drive border 1464. Once the user 75 has moved the actuator 22, 122, 622 into the shaded zone 1466, no motion is detected by the hall sensor 144, 182, and thus the haptic control algorithm 302 does not detect motion and will calculate a hold open force assuming the door 12 is to be held in position. The system compensation module 308 will select a current $C_{hold}$ such to balance the actuator 22, 122, 622. Since the current $C_{hold}$ is selected with balancing on, such that the actuator 22, 122, 622 is balanced mid-way between the backdrive border 1462 and forward drive border 1464, the user's continued motion of the actuator 22, 122, 622 towards the backdrive border 1462/and compress direction/closed door position will only require a force shown by the line indicated as 1490 towards the backdrive border 1462 since the actuator 22, 122, 622 has been biased towards the backdrive border 1462 in its balancing mode. The force required by the user now (arrow indicated as 1490) is less than the force otherwise required (dashed arrow indicated as 1489) to move the actuator 22, 122, 622 through the shaded zone 1466 without the balancing function of the system compensation module 308.

As a result, once the haptic control algorithm 302 detects motion in the compression direction, the haptic control algorithm 302 determines a negative compensation force $F_{haptic}$ is to be applied, and the system compensation module

308 determines a negative current $I_{output}$ to be selected $C_{closing}$ to assist with compression of the actuator 22, 122, 622. The $Delta_{current}$ jumps from a balanced actuator 22, 122, 622 applying a $C_{hold}$ to the $C_{closing}$ actuator 22, 122, 622 which is less than the $Delta_{current}$ jumps from an unbalanced actuator 22, 122, 622 applying a $C_{select}$ to the actuator 22, 122, 622 to the $C_{closing}$. This reduces the sensation of a current jump between a +ve drive current and a −ve drive current, reducing the sensation to the user 75 for providing a seamless transition to the user 75 through the shaded zone 1466.

FIG. 72 illustrates steps of a method of controlling a power-assisted vehicle door 12 of a vehicle 10 with an actuator 22, 122, 622 (i.e., a system compensation method). The method includes the step of 1500 determining an output force $F_{output}$ of the actuator 22, 122, 622 to compensate for external forces affecting the motion of the door 12. Specifically, such a step 1500 can include 1502 calculating the compensation force $F_{haptic}$ the actuator 22, 122, 622 is to be controlled to output to assist the user 75 with moving the door 12. The next step of the method is 1504 adjusting the output force $F_{output}$ to compensate for internal forces affecting the motion of the actuator 22, 122, 622. In more detail, this step 1504 can include 1506 adjusting the compensation force $F_{haptic}$ to compensate for variations in the output force $F_{output}$ of the actuator 22, 122, 622 causing a deviation from the match of the compensation force $F_{haptic}$. The method continues with the step of 1508 operating an electric motor 36 of the actuator 22, 122, 622 using the adjusted output force $F_{output}$. In more detail, such a step 1508 can include 1510 controlling the actuator 22, 122, 622 to apply the adjusted compensation force $F_{haptic}$ to the door 12, such that the output force $F_{output}$ matches the compensation force $F_{haptic}$.

According to an aspect, the method may further include including sensing a motion of the actuator 22, 122, 622 in one of a drive direction or a backdrive direction 1424, and when no motion is detected, adjusting the output force $F_{output}$ to compensate for internal forces affecting the motion actuator 22, 122, 622 without causing motion of the actuator 22, 122, 622. According to another aspect, the method can further include selecting a current $I_{output}$ to supply to the electric motor 36 when no motion is detected, wherein the supplied current $I_{output}$ causes the actuator 22, 122, 622 to operate in a balanced state. According to yet another aspect, when the actuator 22, 122, 622 is operated in the balanced state, the force required to move the actuator 22, 122, 622 in the backdrive direction 1424 is substantially similar to the force required to move the drive direction.

FIG. 73 illustrates steps of a method of compensating the actuator 22, 122, 622 304 (i.e., a drive unit compensation method). The method includes the step of 1600 determining a locked state (no-motion) of the actuator 22, 122, 622 having an output and an input. The method also includes the step of 1602 determining a compensation force $F_{haptic}$ applied by a motor 36 to the input of the actuator 22, 122, 622 to bias the actuator 22, 122, 622 during the locked start, such that a force on the output required to move the actuator 22, 122, 622 in one direction is substantially same backdrive force on the input required to move the actuator 22, 122, 622 in one direction.

The term "controller" as used in this application is comprehensive of any computer, processor, microchip processor, integrated circuit, or any other element(s), whether singly or in multiple parts, capable of carrying programming for performing the functions specified in the claims and this written description. The controller, which also be at least one controller, may be a single such element which is resident on a printed circuit board with the other elements the door motion controlling system. It may, alternatively, reside remotely from the other elements of door motion controlling system. For example, but without limitation, the at least one controller may take the form of programming in the onboard computer of a vehicle, such as Body Control Module ("BCM") comprising the partial portions or entire portions of the door motion controlling system. The controller may also reside in multiple locations or comprise multiple components within the vehicle, including within a vehicle door. For instance, and without limitation, it is contemplated that certain aspects of the controller, such as, by way of non-limiting example, determining a target output torque, may be carried out by a first microprocessor, circuit, etc. which is disposed part of a centralized vehicle or door control system, while other aspects, such as (again by way of non-limiting example) modifying a target current to compensate for irregularities of the power actuator, may be carried out by a second microprocessor, circuit, etc. (such as, for instance, the integrated microprocessor of the power actuator assembly the access system is included).

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects. In either of such forms, all may generally be referred to herein as a "circuit," "module", "unit" or "system." Furthermore, the present disclosure may take the form of a computer program product on a computer-usable storage medium or memory system having computer-usable program code embodied in the medium and constructed as a software product.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations through execution of instructions of the present disclosure may be written in an object oriented programming language such as Java, Python, C++ or the like. The computer program code for carrying out operations of the present disclosure may also be written in conventional procedural programming languages, such as the "C" programming language or similar programming languages. The program code may execute entirely on the one computing device, partly on one computing device, as a stand-alone software package, partly on one local computing device and partly on a remote computing device or entirely on the remote computing device. In the latter scenario, the remote computing device may be connected to the local computing device through a local area network/a wide area network/the Internet, such as via ethernet connection as one example.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions, electronic circuits, hardware, software, or a combination of these, in accordance with non-limiting examples. Computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks. Computer program instructions may be embodied as a computer program or a computer code in a programming language, such as source code, or compiled code.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or a micro processing device or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

Clearly, changes may be made to what is described and illustrated herein without, however, departing from the scope defined in the accompanying claims. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power door actuation system for a door of a vehicle that is moveable relative to a vehicle body about a hinge axis between a closed position and a fully-open position, the power door actuation system comprising:

a housing mounted to one of the door or the vehicle body;

an actuator mounted within the housing, the actuator comprising:

an electric motor supported by the housing, the electric motor having a motor output;

a geartrain supported by the housing and having a geartrain input coupled to the motor output for receiving a motor force from the electric motor and further having a geartrain output, the geartrain moveable in a forward drive direction and in a backdrive direction, and an actuation member coupled to the geartrain output and configured for extension and retraction relative to the housing in response actuation by the geartrain output, wherein the actuation member is coupled to the other one of the door and the vehicle body; and wherein the electric motor is configured to apply a force on the geartrain while in a door hold state and current is being applied to the electric motor to operate the geartrain in a balanced state such that when the geartrain is in the balanced state, a force applied to the geartrain by a user manually moving the door out of the door hold state to cause the geartrain to be driven in the forward drive direction is approximately equal to a force applied to the geartrain to cause the geartrain to be driven in the backdrive direction.

2. The power door actuation system of claim 1, wherein an efficiency of the geartrain driven in the forward drive direction is greater than the efficiency of the geartrain driven in the backdrive direction.

3. The power door actuation system of claim 1, wherein the force applied on the geartrain by the electric motor while the current is supplied to the electric motor is sufficient to operate the geartrain in the balanced state without causing the door to move.

4. The power door actuation system of claim 1, further comprising a controller for controlling the electric motor, wherein the controller is configured to adjust the current supplied to the electric motor to operate the actuator in the balanced state.

5. The power door actuation system of claim 4, further comprising a sensor coupled to the controller and configured to sense motion of one of the geartrain input and the electric motor.

6. The power door actuation system of claim 5, wherein when the controller detects no motion of the geartrain input, the controller adjusts the current supplied to the actuator without causing motion of the actuator.

7. The power door actuation system of claim 4, wherein the controller adjusts the current when the actuator is operating in the balanced state such that a force applied to the geartrain output to forward drive the geartrain and to back drive the geartrain are substantially the same.

8. The power door actuation system of claim 4, wherein the controller is adapted to control the electric motor to compensate for external forces affecting motion of the door.

9. The power door actuation system of claim 4, wherein the actuation member is a spindle drive mechanism including a leadscrew and a lead nut in threaded engagement with the leadscrew such that rotation of one of the leadscrew and the lead nut causes pivoting of the door.

10. A power door actuation system for a door of a vehicle that is moveable relative to a vehicle body about a hinge axis between a closed position and a fully-open position, the power door actuation system comprising:

a housing mounted to the door;

an actuator mounted within the housing, the actuator comprising:

an electric motor supported by the housing, the electric motor configured to output a motor force, a geartrain supported by the housing and having a geartrain input coupled to an output of the electric motor for receiving the motor force and a geartrain output for applying an output force to the door, and an extendible member coupled to the geartrain output and configured for extension and retraction relative to the housing in response actuation by the geartrain output for moving the door relative to the vehicle body; and wherein the power door actuation system is configured to determine the output force to compensate for external forces affecting motion of the door, adjust the output force determined to an adjusted output force to compensate for internal forces affecting different operation of the actuator depending on a direction of the motion of the door, and control the electric motor to move the door at the adjusted output force, the internal forces are internal to the actuator and the external forces are external to the actuator.

11. The power door actuation system of claim 10, wherein the internal forces affecting operation of the actuator are related to at least one of an efficiency of the geartrain, and a moment arm of a connection of the geartrain to the door.

12. The power door actuation system of claim 10, wherein the geartrain is moveable in a forward drive direction and in a backdrive direction, wherein the adjusted output force is selected such that an input force applied to the geartrain output by the door to move the geartrain in the forward drive direction is approximately equal to the input force required to move the geartrain in the backdrive direction.

13. The power door actuation system of claim 12, wherein the output force determined is adjusted when the actuator is not in motion.

14. The power door actuation system of claim 12, wherein the actuator is adapted to supply a current to the electric motor, wherein the current is selected to operate the electric motor such that the adjusted output force is applied to the door by the geartrain output.

15. The power door actuation system of claim 12, wherein the actuator is adapted to supply a current to the electric motor, wherein the current is selected such that an input force applied to the geartrain output by the door to move the geartrain in the forward drive direction is approximately equal to the input force required to move the geartrain in the backdrive direction.

16. The power door actuation system of claim 1, wherein the actuator is provided without a clutch.

* * * * *